US007508342B2

(12) United States Patent
Nelson

(10) Patent No.: US 7,508,342 B2

(45) Date of Patent: Mar. 24, 2009

(54) SATELLITE ANTENNA POSITIONING SYSTEM

(75) Inventor: Larry A Nelson, Seattle, WA (US)

(73) Assignee: The Boeing Company, Chicago, IL (US)

(*) Notice: Subject to any disclaimer, the term of this patent is extended or adjusted under 35 U.S.C. 154(b) by 267 days.

(21) Appl. No.: 11/283,583

(22) Filed: Nov. 18, 2005

(65) Prior Publication Data

US 2007/0115173 A1 May 24, 2007

(51) Int. Cl.
*H01Q 3/00* (2006.01)
*H04B 7/185* (2006.01)

(52) U.S. Cl. .................................... 342/359; 370/316

(58) Field of Classification Search ................. 342/359, 342/757; 370/316, 537; 343/713, 715
See application file for complete search history.

(56) References Cited

U.S. PATENT DOCUMENTS 3,560,975 A * 2/1971 Manuali ..................... 342/356
4,694,773 A 9/1987 Sparkes et al.
5,835,855 A * 11/1998 Burns ...................... 455/277.1
5,946,603 A * 8/1999 Ibanez-Meier et al. ..... 455/13.1
6,169,881 B1 * 1/2001 Astrom et al. ............ 455/12.1
6,243,046 B1 * 6/2001 Aoki ......................... 343/765
6,741,933 B1 * 5/2004 Glass ........................ 701/213
2004/0155830 A1 * 8/2004 Petersson .................... 343/775
2006/0119509 A1 * 6/2006 Wang et al. ................. 342/359
2006/0284765 A1 * 12/2006 Bernhardt et al. ...... 342/357.09

* cited by examiner

*Primary Examiner*—Thomas H Tarcza
*Assistant Examiner*—Harry Liu
(74) *Attorney, Agent, or Firm*—Harness, Dickey & Pierce, P.L.C.

(57) ABSTRACT

A system and method for automatically positioning an antenna aperture on a mobile platform in a manner to avoid blockages created by other components/subsystems on the mobile platform between the line of sight of the antenna aperture and a satellite and to avoid interference with other systems that share the mobile platform. In one embodiment, one or more linear support elements are moved by one or more corresponding motors to allow the antenna aperture to be re-positioned between a plurality of different positions. Methods for creating and using a blockage database are also disclosed.

9 Claims, 17 Drawing Sheets

PRIOR
ART

FIG 2
PRIOR ART
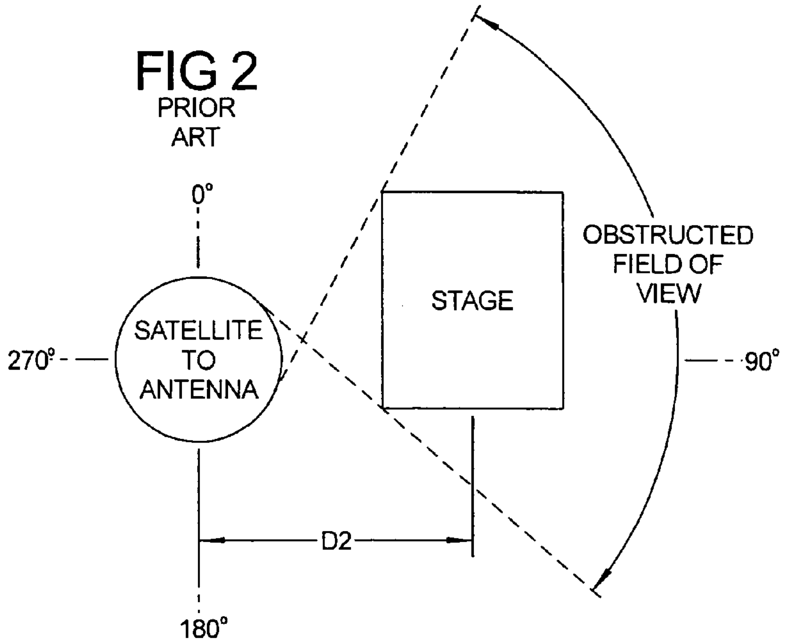
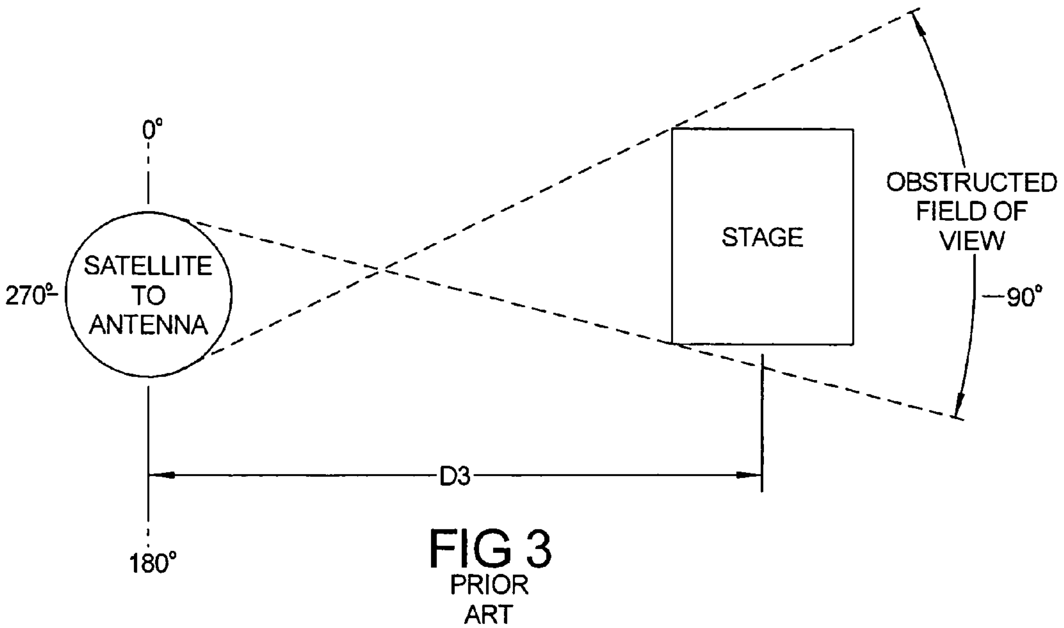
FIG 3
PRIOR ART

PRIOR
ART

FIG 5
PRIOR ART
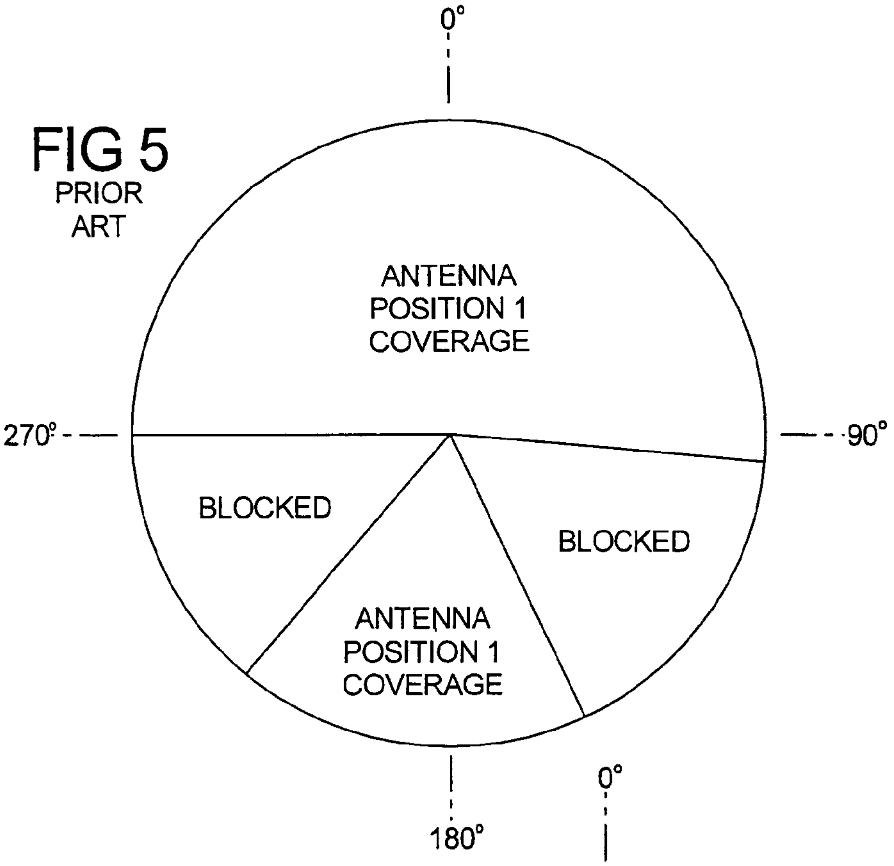
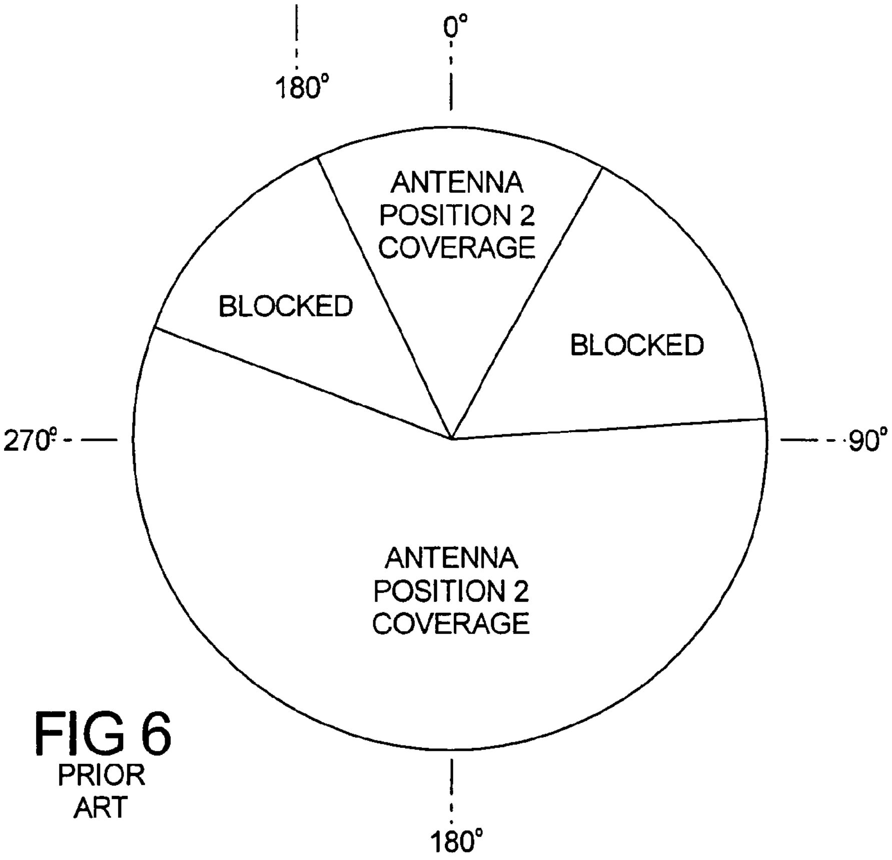
FIG 6
PRIOR ART

FIG 17
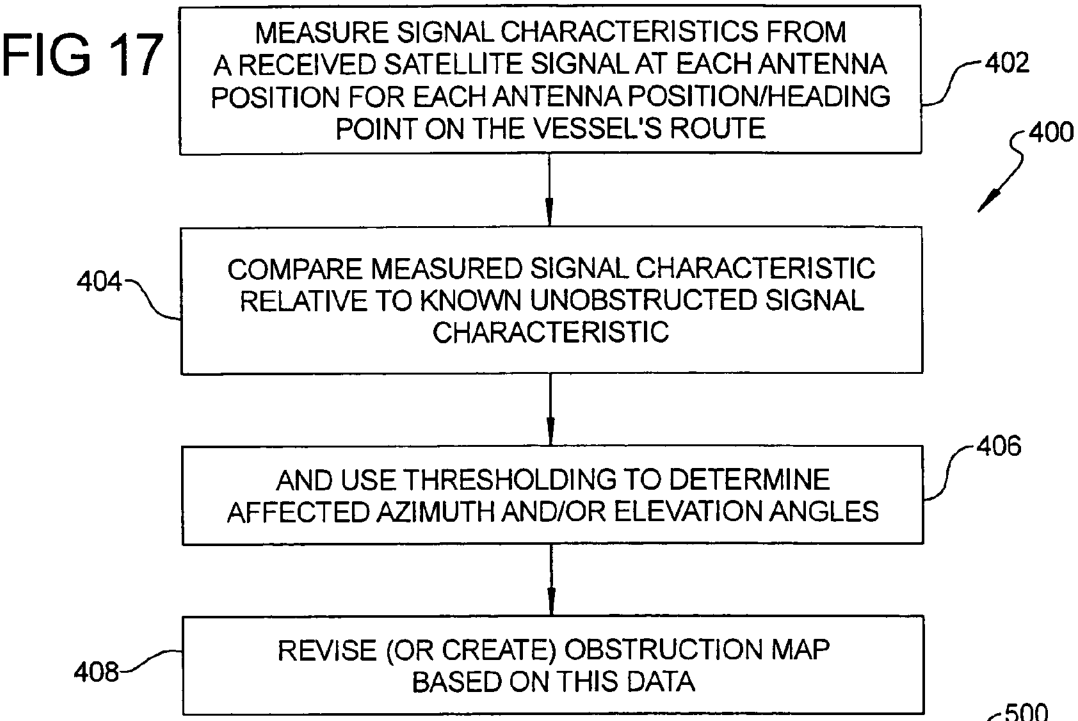
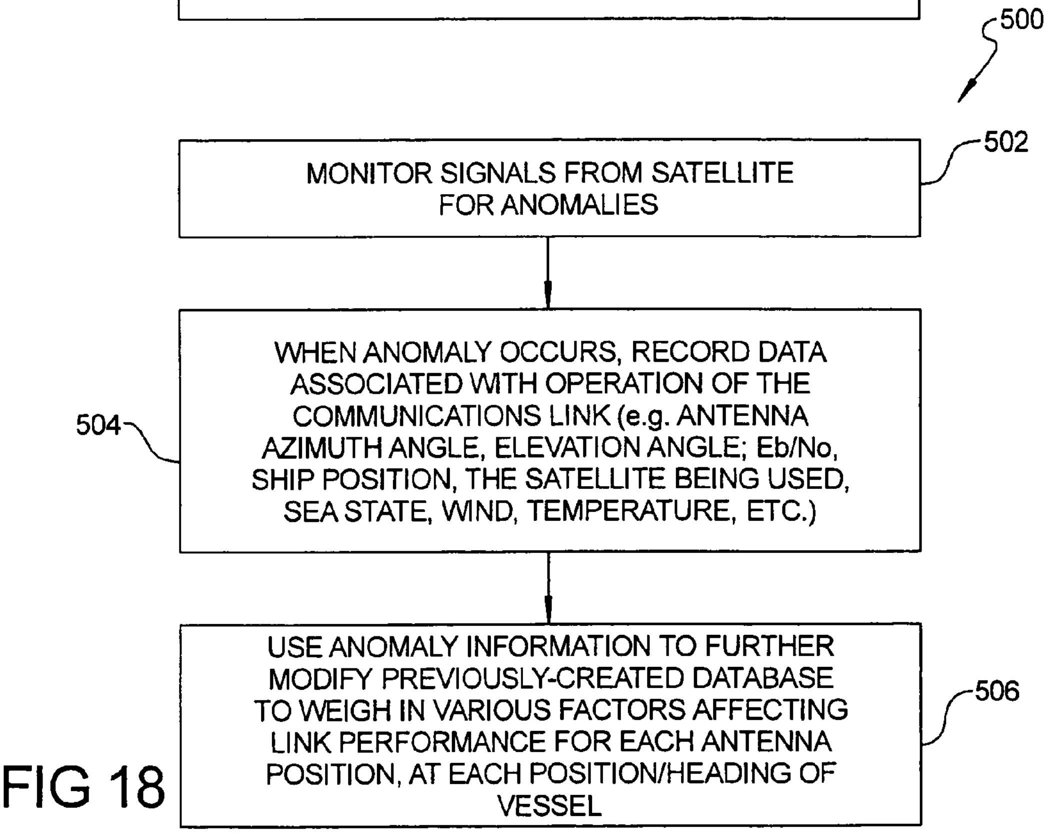
FIG 18

SATELLITE ANTENNA POSITIONING SYSTEM

FIELD OF THE INVENTION

The present invention relates to satellite communication systems, and more particularly to a positioning system and method for a satellite antenna that detects when the line of sight between the antenna and a target satellite is being at least partially blocked by some external structure, and moves the antenna to a new position that mitigates the effect of the blockage to thus maintain closure of the communication link with the satellite. The present invention is also directed to various methods for creating blockage databases that may be used in predicting when blockages are occurring and also to select a new antenna position that avoids or mitigates the blockage.

BACKGROUND OF THE INVENTION

There is increasing interest in implementing broadband communication systems on various forms of mobile platforms, for example, maritime vessels. With a broadband satellite communication system that has an antenna mounted on a maritime vessel (for example, a tanker, freighter, passenger ferry, etc.), the antenna is used to help form a communications link with a space-based satellite in geosynchronous orbit. The antenna forms part of a communications terminal that is carried by the vessel.

With such systems, maintaining closure of the communications link between the antenna and the satellite depends upon an unobstructed and uninterrupted line of sight between the vessel-mounted antenna and the satellite. However, this requirement for an unobstructed line of sight between the vessel antenna and the satellite is rarely completely satisfied for any vessel installation. This is because of intermittent obstruction of the line-of-sight path by other portions of the vessel as the vessel travels. This problem is compounded by the number of antennas and tower-mounted components that are typically used on maritime vessels. Such obstructions may be caused by various fixed objects (for example, a tower or wall) that interferes with the line-of-sight path to the satellite. Intermittent line-of-sight obstruction can occur when the vessel rolls into the view of the antenna because the antenna is space stabilized, whereas the vessel is not. In this instance the obstruction would be temporary.

Obstruction with the line of sight can be partial or complete. In FIG. 1, a front view of a vessel indicates that the broadband satellite antenna may experience at least partial blockage by the Inmarsat C antenna supporting structure, the Inmarsat B antenna, or other components (not shown), such as a radar antenna or various other components supported above the vessel's bridge. The degree of blockage caused by any one of the above structures with the line of sight will depend upon numerous factors, including the location and/or heading of the vessel, the pitch, roll or yaw of the vessel, and the azimuth and elevation pointing angles being used to point the broadband antenna at the satellite. Depending upon the route of the vessel, one or more of the above-described structures may periodically partially or completely interfere with the line of sight between the broadband antenna and an orbiting satellite.

FIG. 2 presents a simplified diagram of the obstructed field in the azimuth plane caused by a given obstruction, for example, the stage of the vessel in FIG. 1. FIG. 3 illustrates how the degree of the obstructed field of view in FIG. 2 is significantly reduced simply by increasing the distance D3>D2 separating the broadband antenna and the obstructing component.

When several potentially obstructing objects are factored in, the broadband antenna may suffer varying degrees of blockage depending on its position. This is illustrated in FIGS. 4-6. FIG. 4 illustrates an azimuth view for the areas of blockage of a single broadband antenna for two different positions. FIG. 5 illustrates a azimuth coverage diagram indicating the areas of coverage and blockage for position 1. FIG. 6 illustrates the areas of azimuth coverage and blockage for position 2.

One method that could be employed to eliminate the line-of-sight blockages is by locating the broadband antenna well above the highest point on the vessel. However, this is not always possible. Moreover, locating the broadband antenna at the highest point of the vessel may cause the broadband antenna itself to interfere with the line of sight of other antennas or lights on the vessel (for example, radar antennas or the Inmarsat B antenna) that may be performing critical navigation and/or mission functions.

Accordingly, it would be highly desirable to provide a means for moving the broadband antenna between two or more positions when it is determined that a line of sight between the antenna and a satellite in communication with the antenna is being partially blocked, so as to affect the quality of the communications link between the antenna and the satellite.

It would also be highly desirable if such a system can be used to predict when partial or complete blockages will be (or are) occurring, and to determine which one of two or more different antenna positions will provide optimum performance for the broadband antenna (and minimize blockage of other antennas aboard the same vessel). Such a system and method would also enable greater flexibility with regard to the installation of other antennas or components on the vessel, the positions of which would otherwise have to be carefully considered for blockage by the satellite antenna with regard to the routes that the vessel is expected to travel. Such a system and method would also eliminate the need for multiple antennas located at different positions on the vessel to achieve continuous closure of the communications link in view of the blockages that are likely to occur during travel of the vessel, or even while the vessel is stationary at anchor or at a port. It should be noted that blockages can arise in port due to external structures (e.g., a bridge or a building, or even an airplane) that are not part of the vessel's on-board blockage structures. These blockages may also be addressed by the present invention.

SUMMARY OF THE INVENTION

The present invention is directed to an antenna positioning system and method. In one implementation the system and method involves moving an antenna supported on a mobile platform between two or more positions as needed to eliminate or mitigate the adverse effects of obstructions caused by various other components located on (or relative to) the mobile platform that interfere with the line of sight between the antenna and a space-based communications device, for example, a geosynchronous satellite. In one preferred form the system includes an antenna aperture that is positioned on a support structure. The support structure enables the antenna aperture to be moved between at least two positions. A motive device is used with the support structure to move the antenna as needed. A processor controls the motive device and also accesses a blockage data base having information on blockages caused by various structures on the vessel. Information in the database is used for selecting between the various antenna positions, as needed, to optimize the communications link between the antenna and the satellite.

In one preferred embodiment the processing system receives information on the heading and position of the vessel. The position information relates to latitude and longitude information denoting the position of the vessel at a given time. The database includes information pertaining to the various blockages in the line of sight between the antenna and various components on the vessel, for various azimuth and elevation pointing angles of the antenna.

In one preferred embodiment the support structure comprises a platform on which the antenna is mounted, and an elongated member for supporting the platform for linear movement between two or more positions. In an alternative preferred form the support structure includes a first element that is rotationally coupled to a second element. The second element is fixedly secured to the vessel. The first element moves rotationally, in an orbital fashion, around the second element to permit the antenna to be positioned at two or more positions about a circular arc. Various alternative implementations are disclosed that provide selective positioning of the antenna in 2 or 3 dimensions.

The present invention also involves various preferred methodologies for creating the blockage database. In one preferred methodology, the installation of the antenna on the mobile platform is analyzed to determine obstructions with a line-of-sight path between the antenna aperture and an orbiting satellite for each position/heading of the mobile platform along a given route, for each of a plurality of different antenna positions that the antenna may be moved to. Merit rankings are assigned to each antenna position that corresponds to a degree of obstruction with the line of sight between the antenna aperture and the satellite. Various other factors may be taken into consideration, such as any roll, pitch and yaw motions that the mobile platform is experiencing or may experience, as well as the distance between the antenna aperture and any other object/system on the mobile platform that is causing a partial or complete obstruction at each antenna position. This information is used to create a database that provides a merit ranking (i.e. features) for each of the plurality of antenna positions.

Alternative preferred methodologies in creating the blockage database involve using image processing to determine where blockages exist on the mobile platform, and/or performance anomaly monitoring to determine blockages based on signals received by the antenna aperture while the mobile platform travels along a given route.

BRIEF DESCRIPTION OF THE DRAWINGS

The present invention will become more fully understood from the detailed description and the accompanying drawings, wherein:

FIG. 2 is a diagram illustrating the blockage zone caused by an obstruction at a first distance from the broadband antenna;

FIG. 3 is a diagram illustrating the reduction of degree of blockage caused by the obstruction of FIG. 2 when the distance separating the obstruction and the broadband antenna is increased;

FIG. 5 is a diagram of the coverage areas and blockage areas of the first antenna position indicated in FIG. 4;

FIG. 6 is a diagram of the coverage areas and blockage areas of the second antenna position of FIG. 4;

FIGS. 9-13 are diagrams illustrating how movement of the antenna to various positions is able to reduce or alter the blockage zones caused by the obstructions;

FIG. 9 shows the obstruction angles as viewed in the azimuth plane by the antenna in position 1;

FIG. 10 shows the position of the antenna and three obstructions in the azimuth plane, as in FIG. 9, and also presents the antenna and obstructions from a side view to illustrate the height of each obstruction as well as the height of the antenna in position 1;

FIG. 12 shows the obstruction angles as viewed by the antenna in position 2 (note that the other potential positions are shown only for reference);

FIG. 13 shows the obstruction angles for the antenna in position 3 (note that the other potential positions are shown only for reference);

FIG. 17 is a flowchart of one preferred method of using selected measurement mapping of signals received by the antenna to map blockage zones for the antenna, pursuant to creating the blockage database; and FIG. 18 is a flowchart of one preferred method of using anomalies in the signals received by the antenna to revise existing mapping of blockages, pursuant to revising the blockage database.

DETAILED DESCRIPTION OF THE PREFERRED EMBODIMENTS

The following description of the preferred embodiment(s) is merely exemplary in nature and is in no way intended to limit the invention, its application, or uses.

Figure 7:
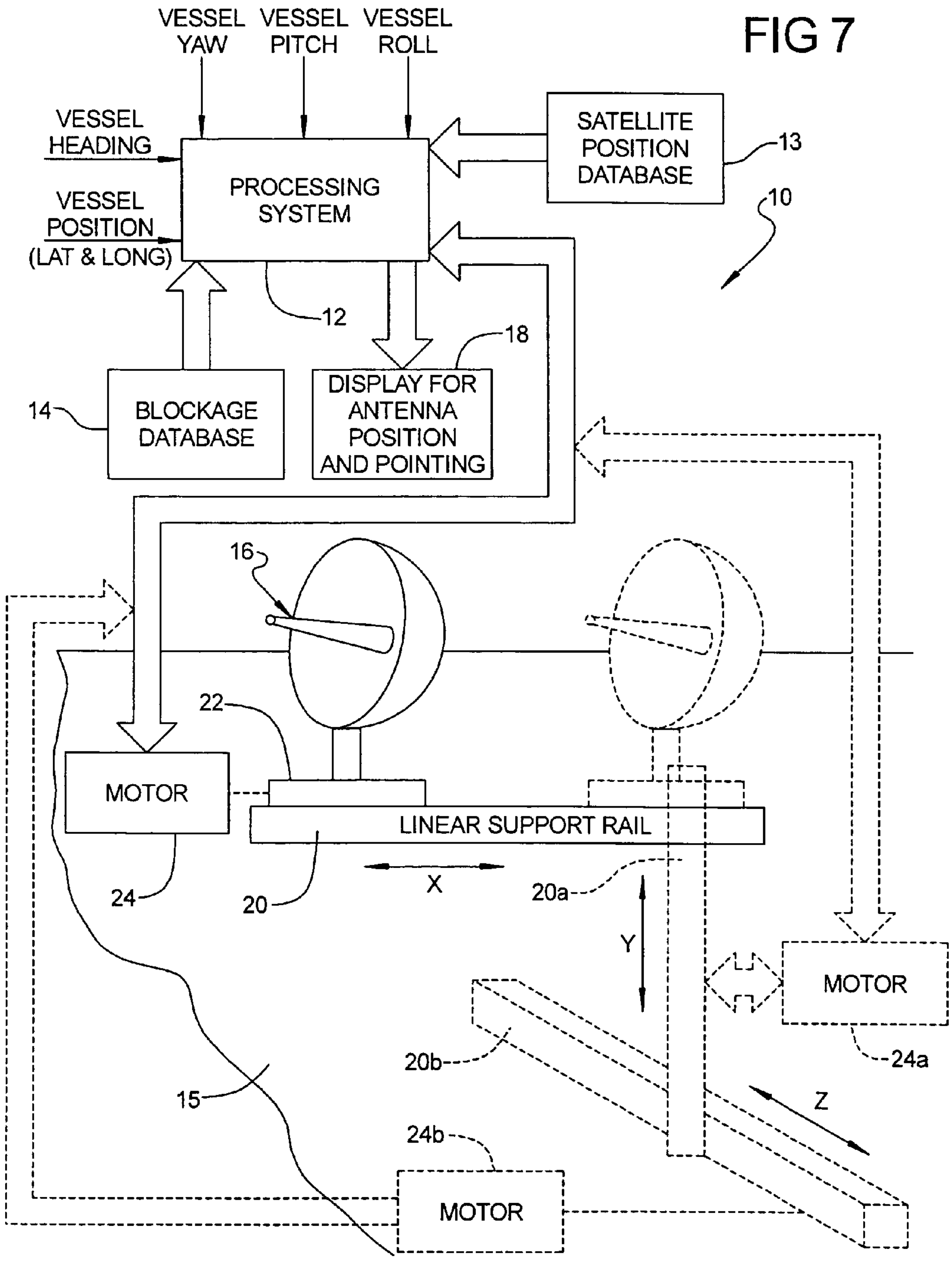
FIG. 7 is a simplified block diagram of a preferred embodiment of the present invention that makes use of a linearly moveable antenna.

Referring to FIG. 7, there is shown an antenna positioning system 10 in accordance with a preferred embodiment of the present invention. The system 10 may be located on any form of mobile platform (such as a ship, bus, train, etc.), but is expected to find particular utility in maritime applications involving various forms of sea-going vessels merely as one exemplary implementation, the following discussion will simply reference a vessel as the mobile platform on which the system 10 is employed.

The system 10 generally includes a processing system 12 that is in communication with a blockage database 14 and a satellite position database 13. In this example, the processing system 12 is located on a vessel 15 and receives information on the vessel 15 heading and the vessel position (latitude and longitude). The processing system 12 uses this information when accessing the database 14 to determine a position for an antenna 16 located on the vessel 15. The selected position is one that minimizes or eliminates the adverse affects of line-of-sight blockages between the antenna 16 and a space-based (or high altitude) communications device (e.g., satellite or stratolite) that the antenna 16 is being pointed at, by other towers/devices/structures associated with the vessel 15. The processing system 12 is optionally in communication with a display 18 that displays for an operator the present position of the antenna 16, as well as its azimuth and elevation pointing angles. While the antenna 16 may be a "broadband" antenna, it will be appreciated that the present invention could be implemented in connection with virtually any form of antenna or component that requires line-of-sight access to a remotely-located device. Thus, the present invention is not limited to use with only systems involving a radio frequency (RF) link with a transponded satellite. The present invention could be employed, for example, with optical systems as well, where maintaining a clear line of sight is important in maintaining closure of a communications link.

It is an important feature of the present invention that the antenna 16 is mounted on a support structure, in this example a support rail 20, that allows the antenna 16 to be moved between at least two positions, and more preferably between more than two positions. The various positions available are selected as needed to mitigate the affects of partial or complete line-of-sight blockages with other devices/structures on the vessel 15 as the antenna 16 is pointed to track the satellite while the vessel travels. The antenna 16 is preferably supported on a platform or other suitable mounting structure 22 that can be moved linearly along the support rail 20 by an electric motor 24 or other motive device. Suitable alternatives to an electric motor may involve hydraulic or pneumatic drive positioning systems. Virtually any device capable of moving the antenna 16 in response to control signals from the processing system 12 could be implemented.

In operation, as the vessel on which the system 10 is carried travels along a route, or even when it is docked and not moving, the heading and position information fed to the processing system 12 enables the processing system to retrieve information from the blockage database 14 relating to what partial or complete line-of-sight blockages may be present at a given time. The processing system 12 preferably receives new vessel heading and position information periodically (for example, every 1 minutes to 15 minutes) so that the position of the antenna 16 can be updated/changed if needed to mitigate the affects of a line-of-sight blockage on the communications link with the orbiting (i.e., serving) satellite.

The blockage database 14 will be discussed in greater detail in the following paragraphs, but the information provided in the database 14 takes into account line-of-sight blockages or partial blockages from various elements/structures on the vessel 15, and may even take into account if a given position of the antenna 16 itself, at any given vessel heading and/or position, will cause line-of-sight blockages with other antennas, support structures or components that require a line-of-sight view to the same (or a different) remote device, such as a different satellite. The processing system 12 considers such blockages in selecting a position for the antenna 16 so that the antenna 16, itself, has a sufficiently clear line-of-sight to maintain closure of a communications link with the satellite with which it communicates, as well as a position that does not interfere with the operation of other devices mounted in the vicinity of the antenna 16.

If an electric motor 24 is used, the motor may enable positioning of the antenna 16 at any point along the linear support rail 20, or at designated, predetermined points therealong. The electric motor 24 may take any suitable form, but in one implementation comprises a conventional DC motor. The dashed line representation of the antenna 16 represents a second position for the antenna.

Optionally, a second linear support rail 20*a* could be used to provide adjustable positioning in a plane perpendicular to the plane in which the support rail 20 is positioned. An additional motor 24*a* could be used to adjustably position the support rail 20 along support rail 20*a* to provide adjustable positioning along two distinct axes and thus avoid blockage by changing the vertical positioning of the antenna 16. Furthermore, still another support element 20*b* and associated motor 24*b* could be used to provide adjustable positioning movement of the antenna 16 along a third axis. Thus, by using support elements 20, 20*a* and 20*b*, and their respective motors 24, 24*a* and 24*b*, movement along X, Y and Z axes can be achieved.

Figure 1:
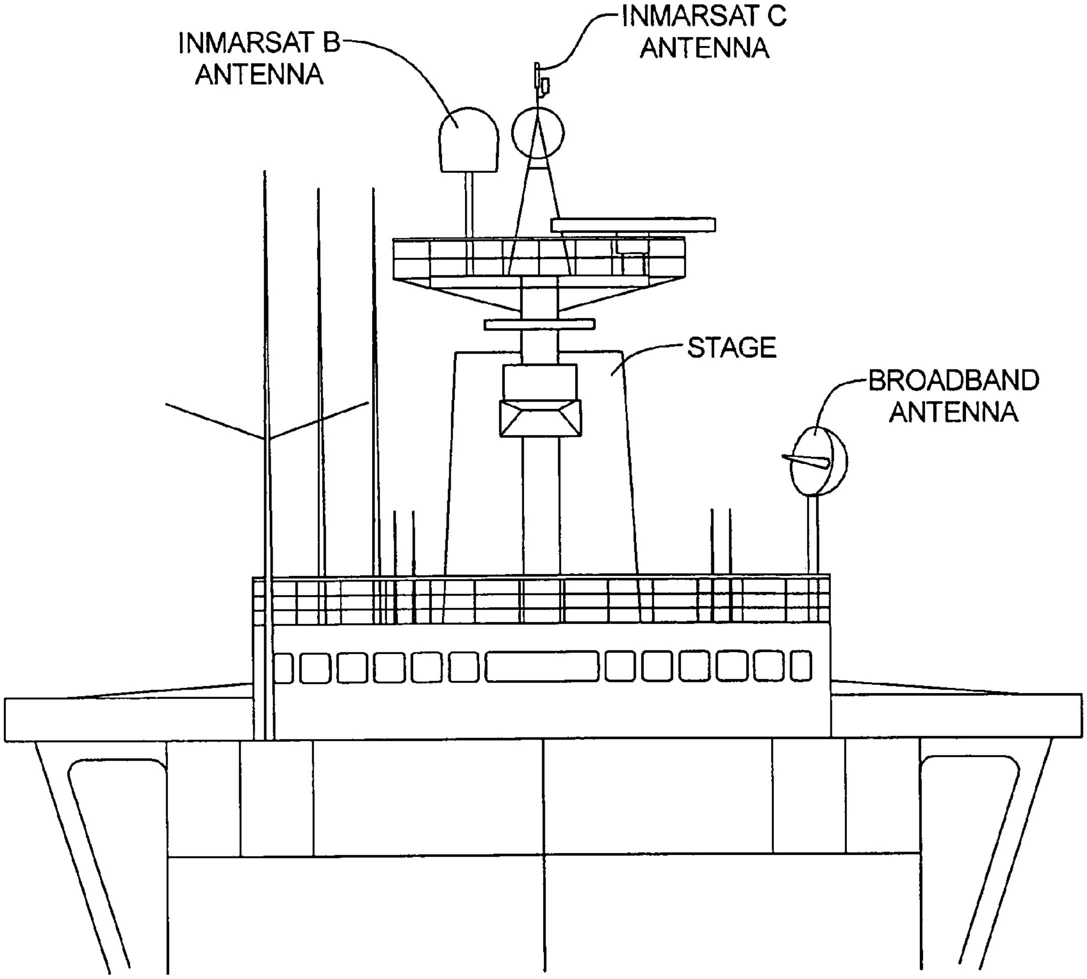
FIG. 1 is a simplified front view of a prior art mounting configuration for a broadband antenna on a maritime vessel that illustrates how various other components mounted near the broadband antenna may cause blockage with a line of sight between the broadband antenna and a space-based orbiting satellite.
Figure 4:
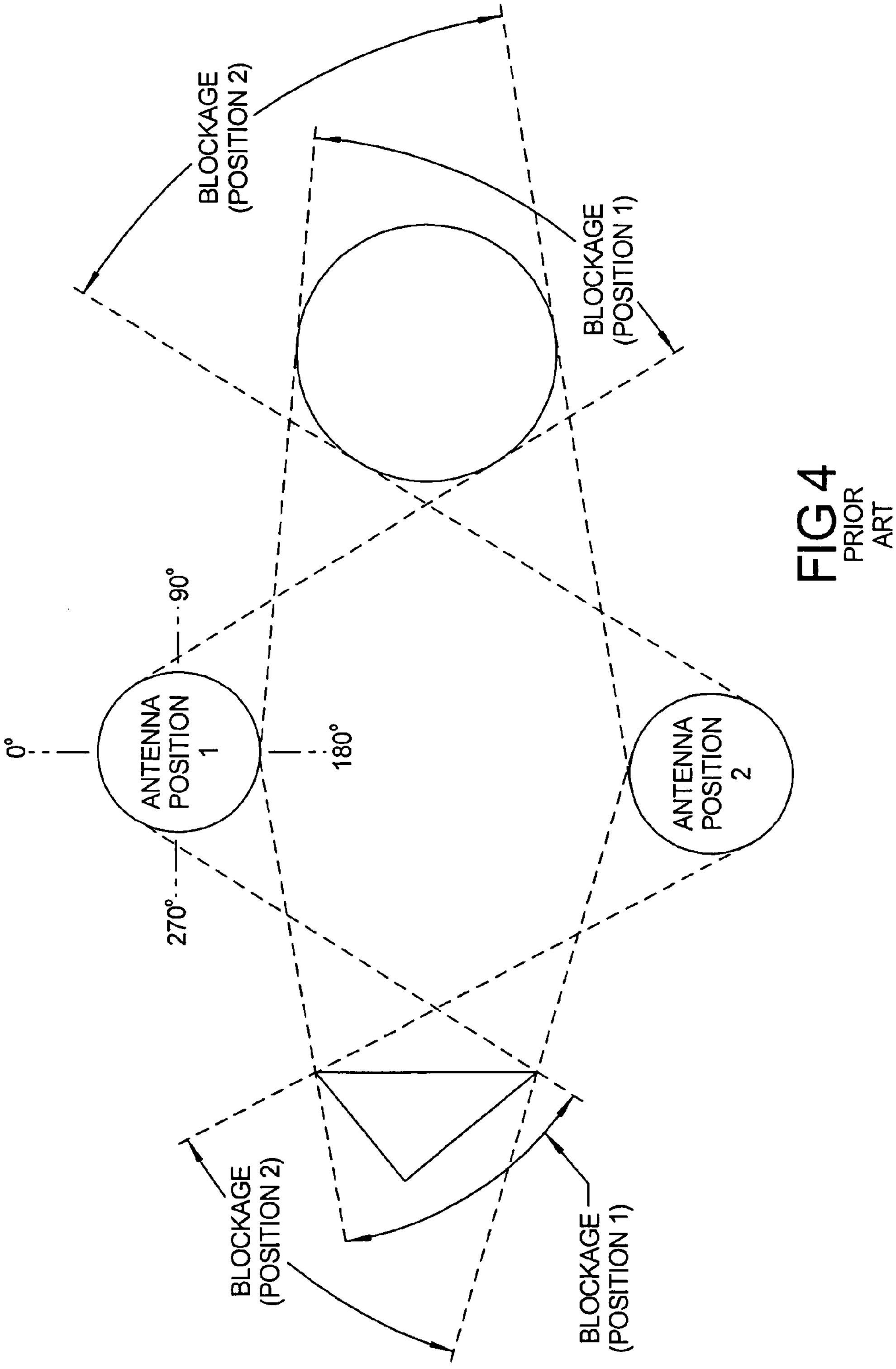
FIG. 4 is a diagram illustrating how the blockage zones caused by two different obstructions in the elevation plane change when the broadband antenna is located at two different positions.
Figure 8:
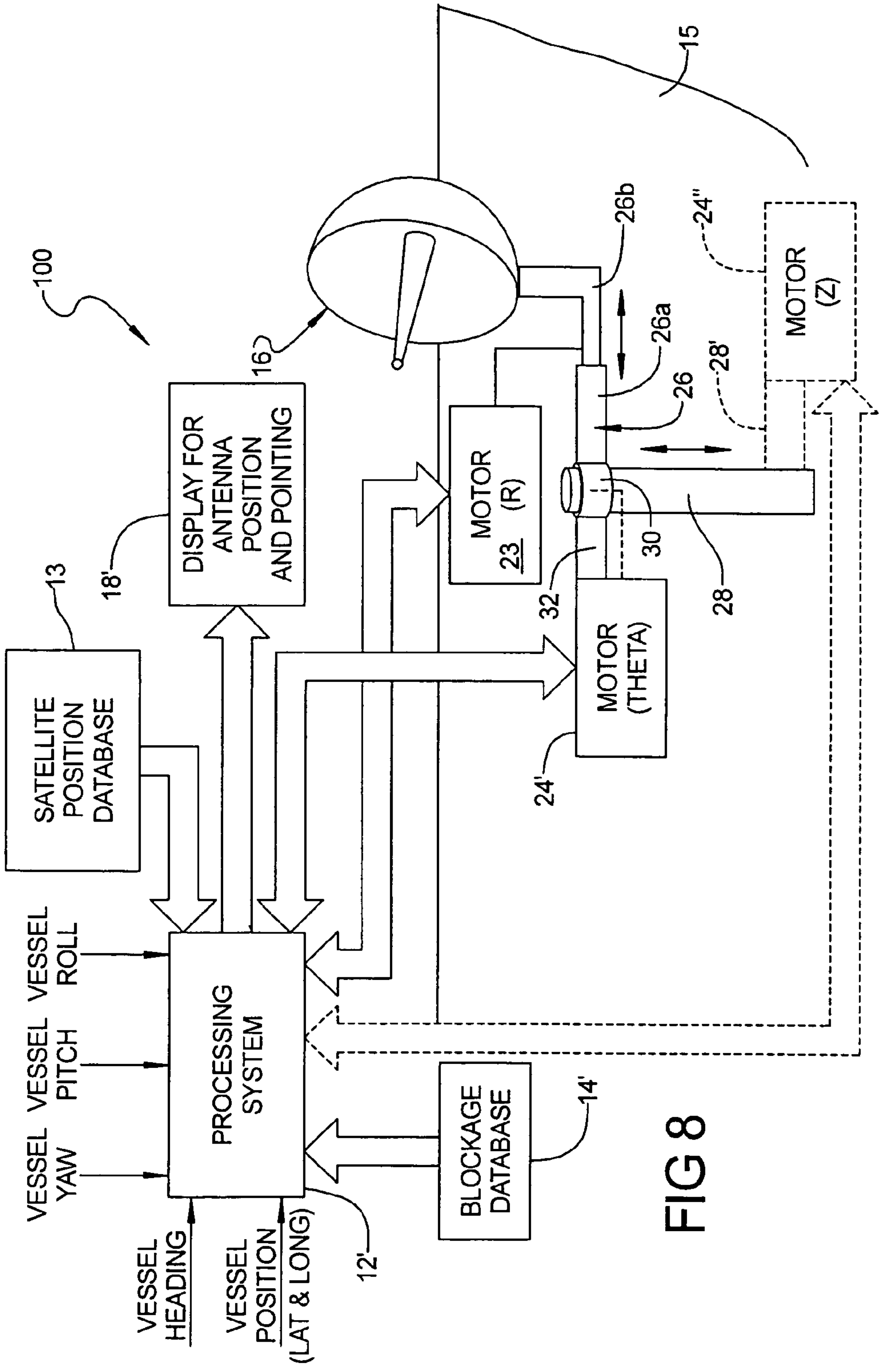
FIG. 8 is a simplified block diagram of an alternative preferred embodiment of the present invention making use of an orbitally positionable antenna.

Referring to FIG. 8, another simplified block diagram of an antenna positioning system 100 is illustrated. System 100 is identical to system 10 with the exception that the antenna 16 is supported for orbital motion between a plurality of positions, rather than motion along a linear path. Components in common with those described in FIG. 4 are denoted with the same reference number, plus a prime (') designation. With this embodiment, the support structure for the antenna 16 is formed by a first support element 26 and a second support element 28. First support element 26 includes a first portion 26*a* and a telescopically-extending section 26*b*. A motor 23 is used to telescopically extend section 26*b* to thus vary the length of the first support element 26.

The first support element 26 also includes a sleeve 30 that is supported by the second support element 28. The sleeve 30 is driven rotationally about the second support element 28 by a suitable gear box or gear reduction unit 32 operably associated with the motor 24'. Again, other alternative means for providing rotational movement to the first support element 26 could be supplied, such as hydraulic or pneumatic devices that are operatively coupled to the first support element 26 to urge it rotationally about a predetermined arc. Since the first support element 26 can move rotationally about the second support element 28, the antenna 16 is provided with an orbital path of movement relative to second support element 28. In an alternative implementation, an additional support element 28' and motor 24" are used to provide elevational positioning movement for the antenna 16 by elevationally positioning the support element 28.

Constructing a Blockage Database

A blockage database contains features associated with particular antenna positions that (1) interfere with clear line of sight along particular azimuth or elevation, or (2) features that exhibit interference caused by the antenna with other vessel systems (such as blockage of navigation light paths, or radar transmission path blockage or blockage to other communication systems transmission paths), or (3) blockages that depend upon sea state (i.e. vessel motion). In general, features are created and associated with numeric values that can be ordered to facilitate a decision process.

Referring now to Appendix 1 and FIGS. 9-14, a detailed example of one exemplary blockage database 14 containing features that may be used to select suitable antenna positions will be described. The database of Appendix 1 contains antenna positions, coverages (azimuths and elevations) and characteristics (e.g., attenuation, phase disturbance, interference with other vessel-mounted subsystems, etc.) for the antenna 16. Each column corresponds to a feature that can be used by the decision tree (either separately or in concert with other features) to make a decision on antenna position. Once the processing system 16 has determined the vessel's position, its heading, and the relative azimuth and elevation angles required to direct the antenna 16 toward a particular satellite, the blockage database of Appendix 1 is used to create a feature vector which, taken together with vessel heading, antenna relative azimuth, and antenna elevation form an input vector to a decision tree.

Figure 9:
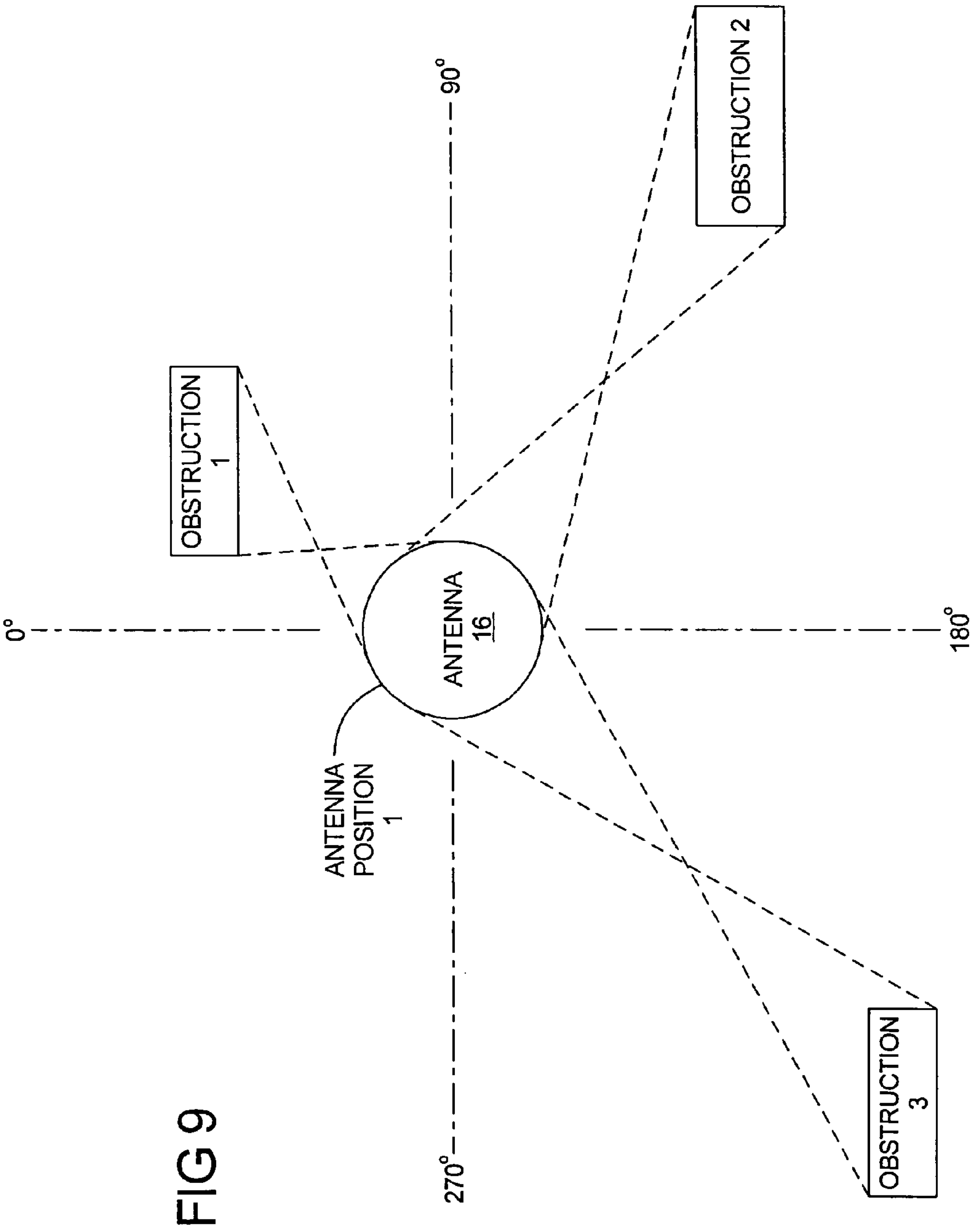
Figure 10:
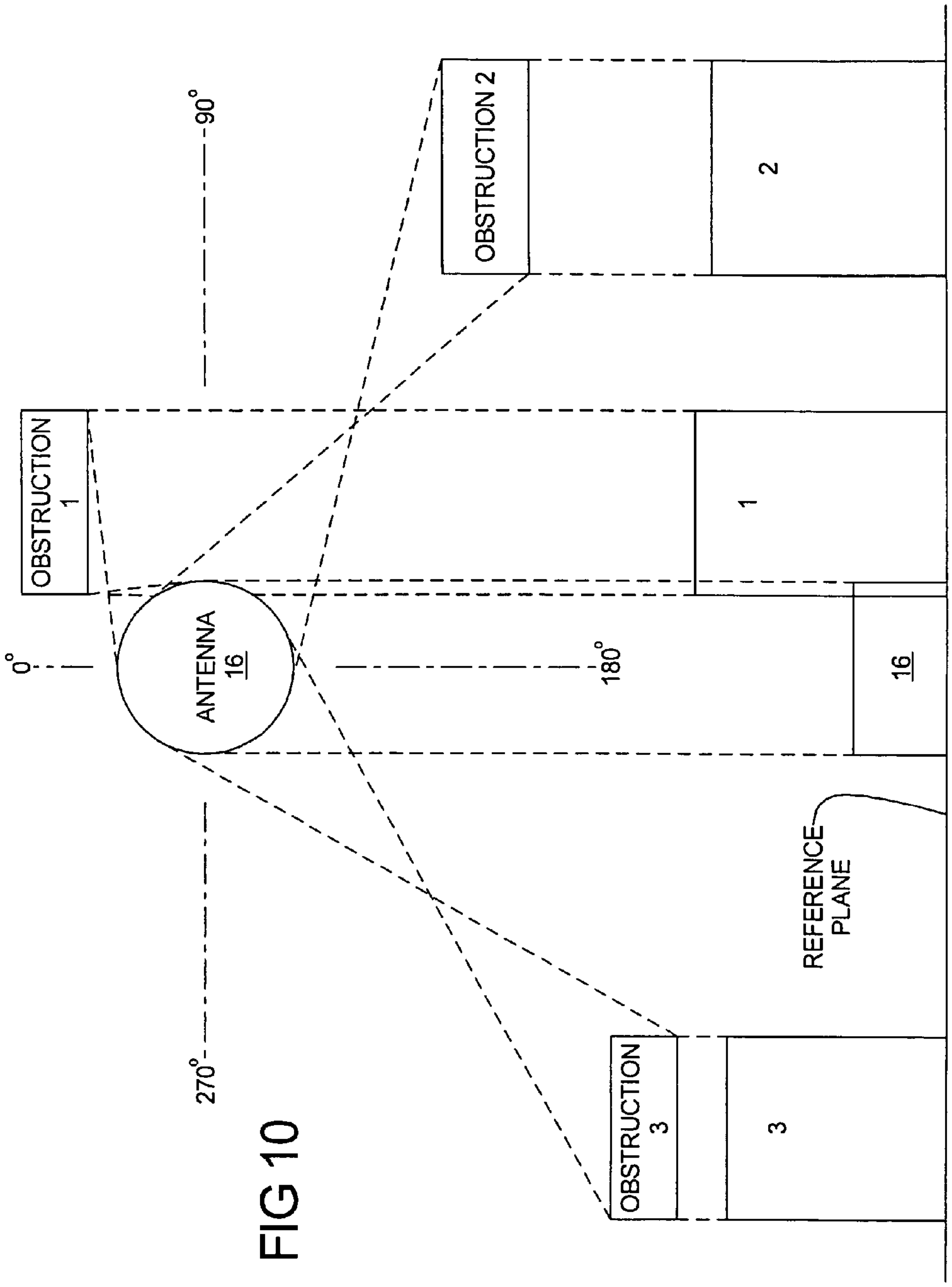
Figure 11A:
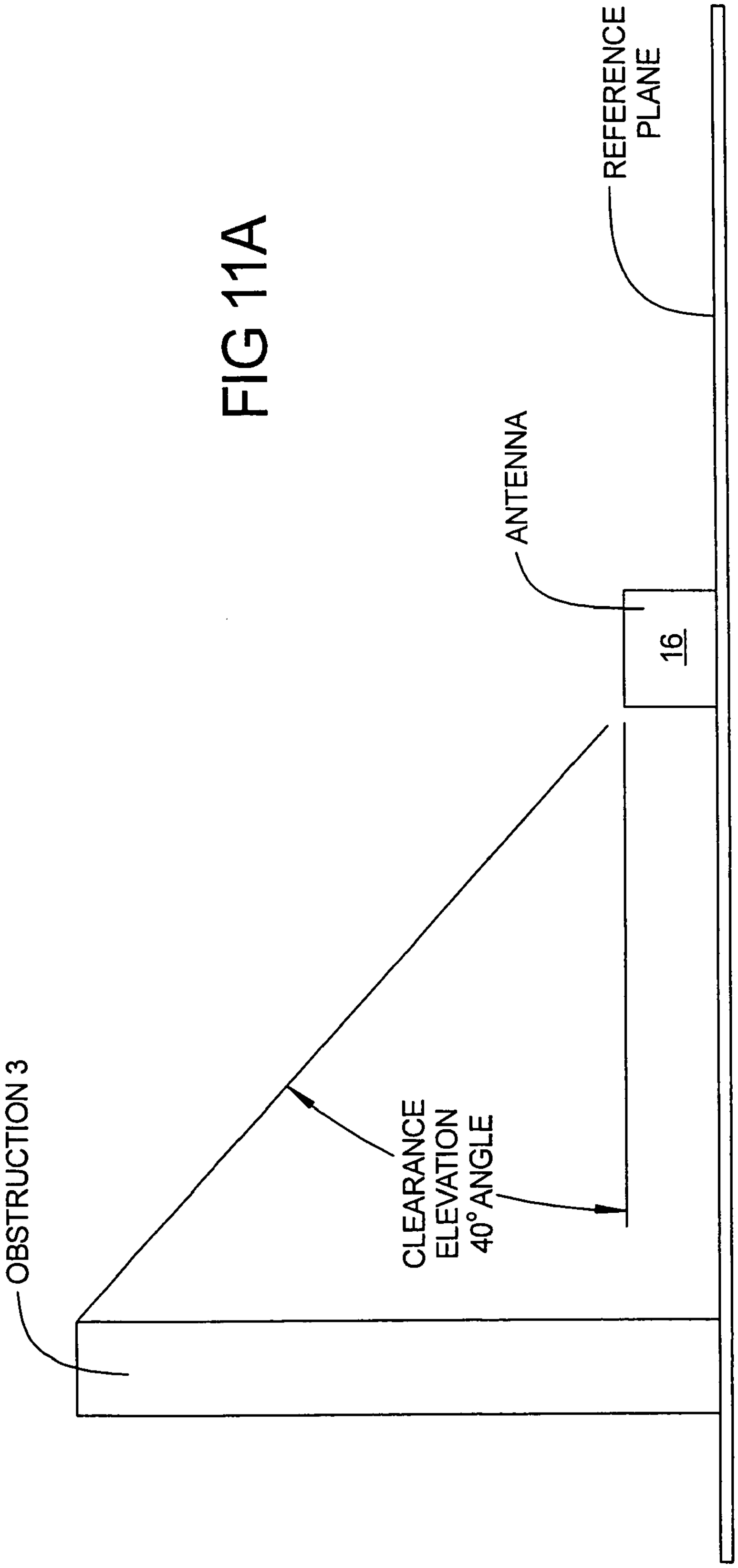
FIG. 11*a* is a side viewing showing the elevation relation between the antenna in position 1 and obstruction 3.
Figure 11B:
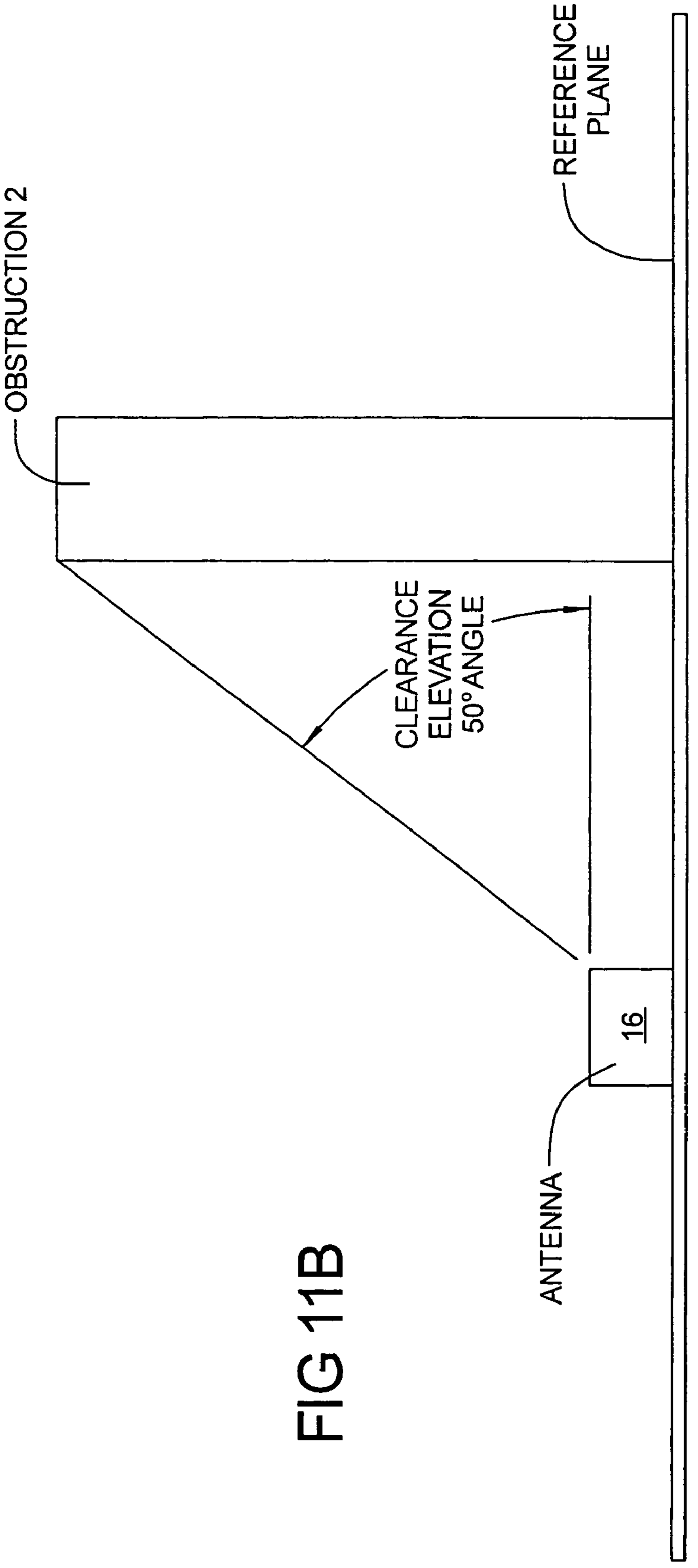
FIG. 11*b* is a side viewing showing the elevation relation between the antenna in position 1 and obstruction 2.
Figure 11C:
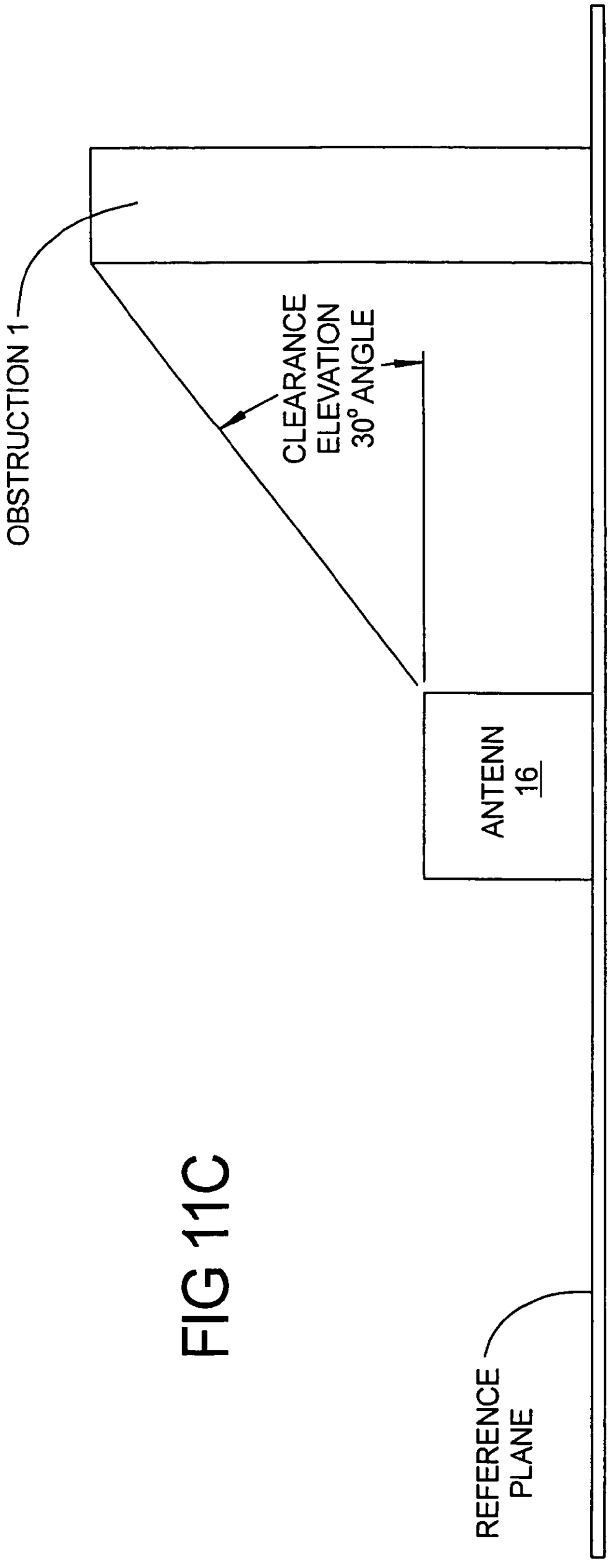
FIG. 11*c* is a side viewing showing the elevation relation between the antenna in position 1 and obstruction 1.

Appendix 1 corresponds to the blockages illustrated diagrammatically in FIG. 9 (relative to antenna position 1). FIG. 9 shows the antenna 16 having "obstruction 1" near 23°, "obstruction 2" near 113°, and "obstruction 3" near 222°. FIG. 10 illustrates the three obstructions and the antenna 16 in the azimuth plane, and the rectangles labeled "1," "2" and "3" indicate the heights of the three obstructions relative to the height of the antenna, when viewed from a side view. The dashed lines from each of "obstruction 1," "obstruction 2" and "obstruction 3" correlate the azimuth representation of each specific obstruction with its side view representation. FIGS. 11*a*-11*c* illustrate separate side views of the obstacles 3, 2 and 1, respectively.

From Appendix 1, it will be noted that the roll and pitch sensitivity at 0° elevation is pronounced due to the proximity of the elevation scan angle relative to the water surface. However, it is actually less sensitive in regions where there is blockage, because roll and pitch do not necessarily cause a change in the amount of the obstruction. Referring now to FIG. 10, FIG. 11*a*, FIG. 11*b*, FIG. 11*c* and Appendix 1, the exemplary data illustrated therein shows that near 30° elevation, obstruction 3 (at about 222° azimuth) begins to only partially obstruct the view of the antenna 16. At 40° elevation (FIG. 11*a*), the obstruction caused by obstruction 3 is ended, but there is pitch sensitivity and some roll sensitivity. At approximately 50° elevation, the antenna 16 looks over obstruction 2 (at about 120° azimuth) (FIG. 11*b*). At 60° elevation (at about 35° azimuth), the antenna 16 beam clears all obstacles. At about 30° elevation, the antenna 16 beam looks over obstruction 1 (at about 40° azimuth).

Figure 12:
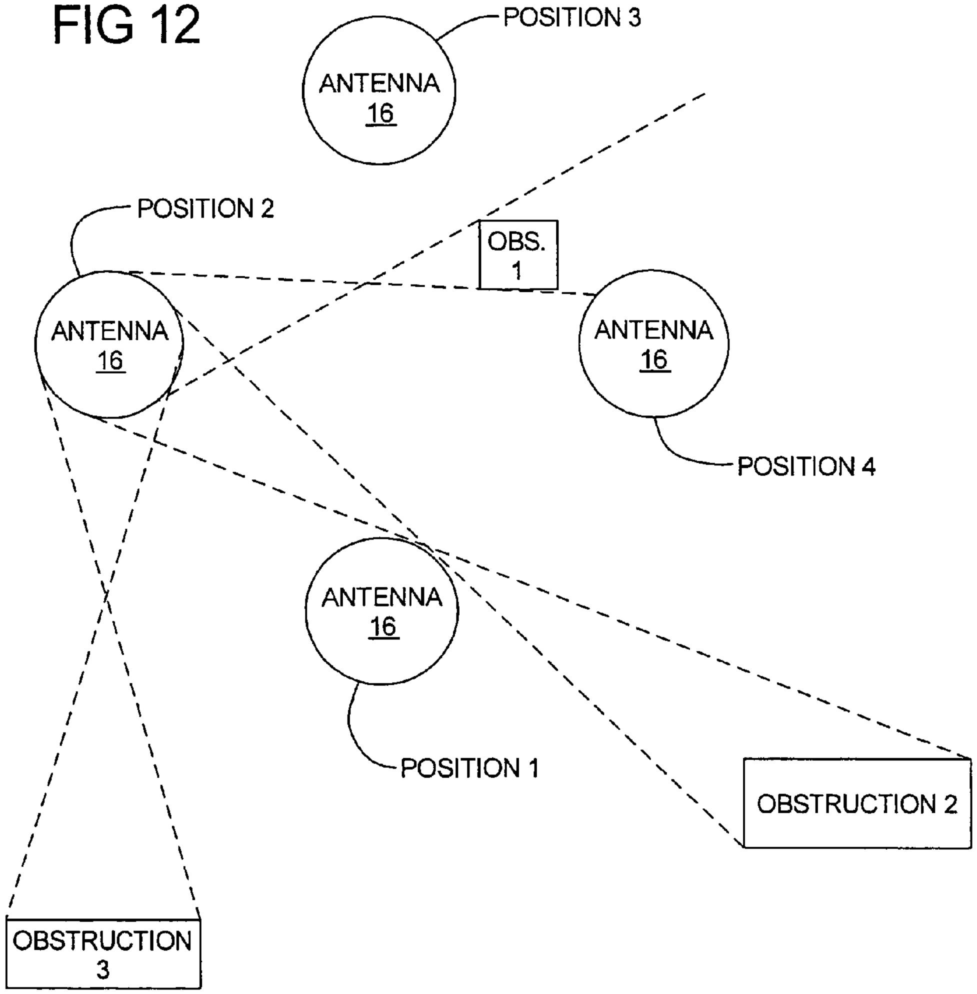
Figure 13:
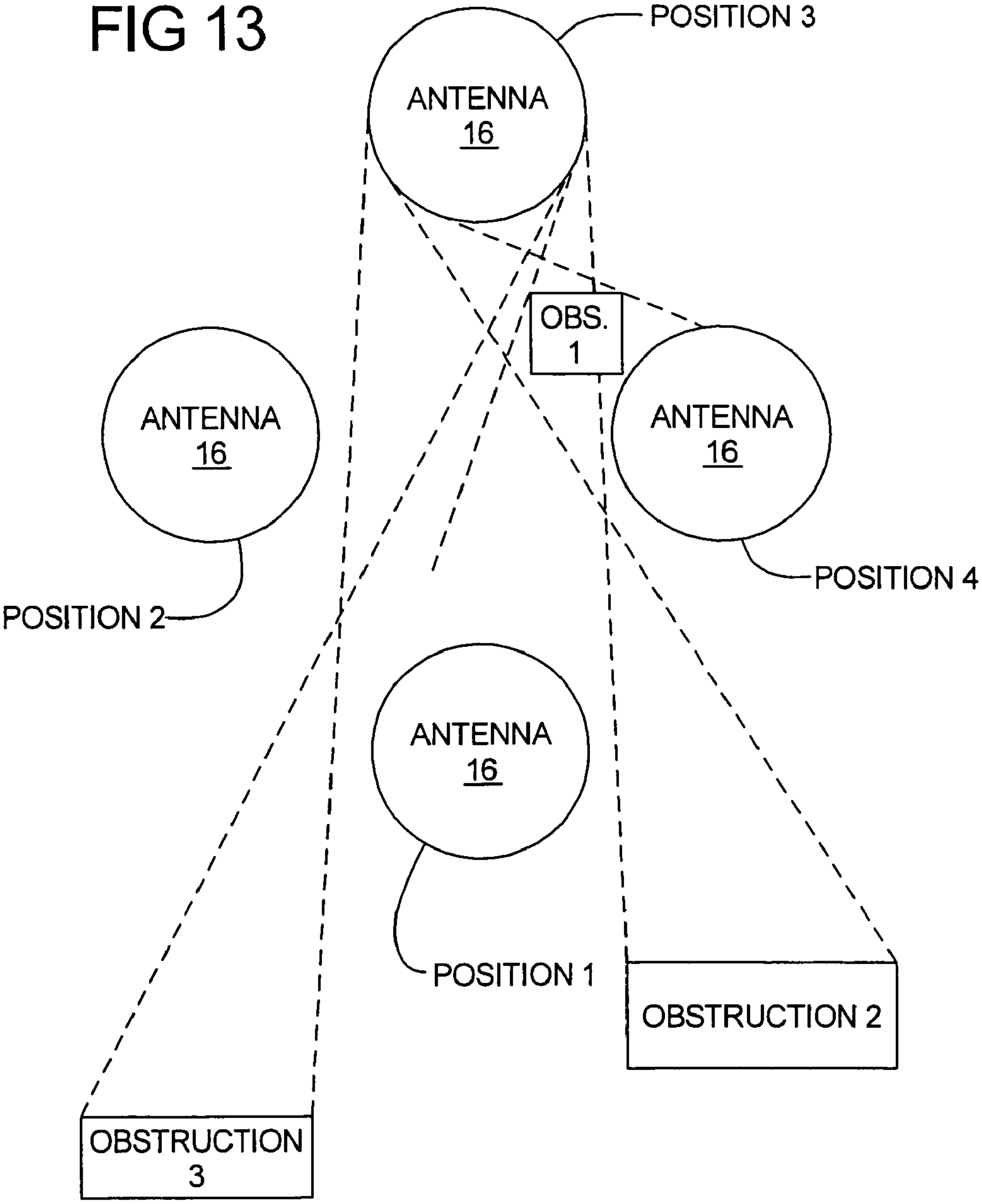
Figure 14:
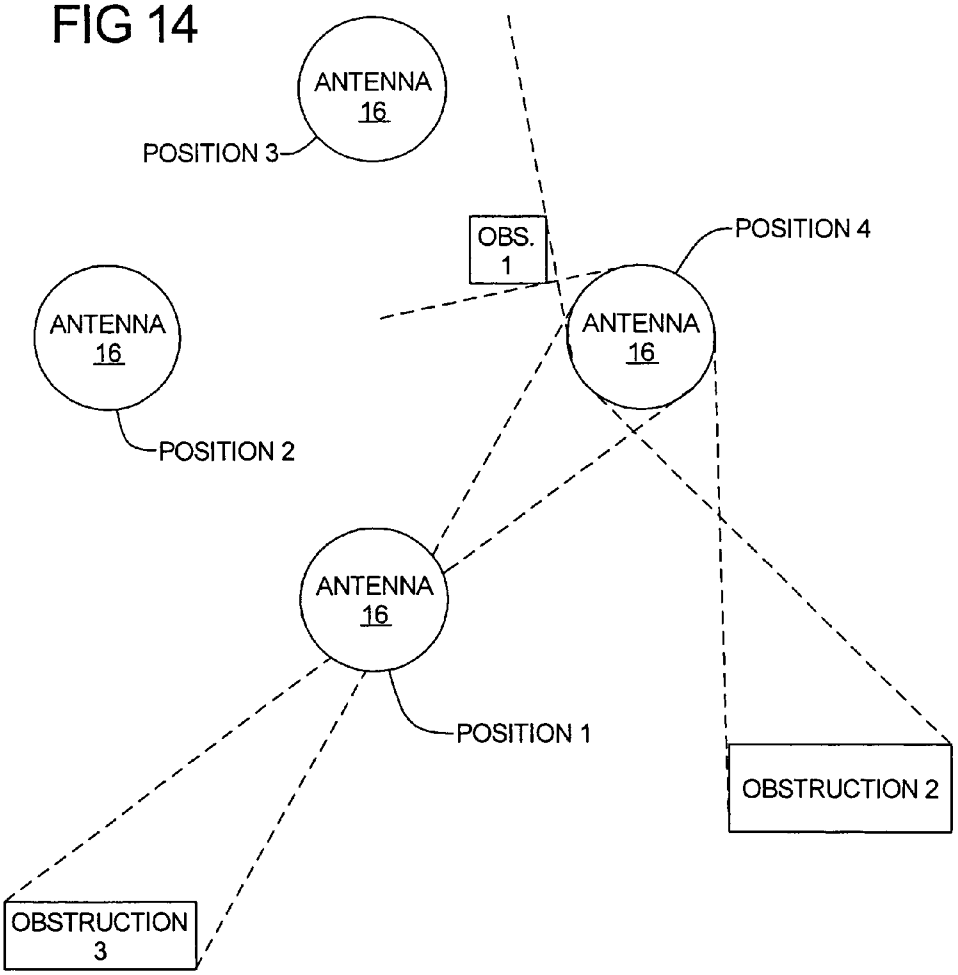
FIG. 14 is shows the obstruction angles for the antenna in position 4 (note that the other potential positions are shown only for reference)

For every possible position that the antenna can be commanded to, a database similar to that illustrated in Appendix 1 is created. Thus, if three antenna positions are available for use, then three databases similar to that illustrated in Appendix 1 are created. For example, assume that there are only four antenna positions from which to choose and, to further simplify the explanation, assume that each of these positions is at the same z (height) position. An example of the four illustrative positions would be as given in FIGS. 11, 12, 13, and 14. FIG. 11 is position 1. FIG. 11 shows a side view of the relative height of each obstruction compared to the base of the antenna 16, combined with a top view of the obstruction locations. FIG. 11*a* illustrates the elevation angle required for the antenna 16 to look over obstacle 3. FIG. 11*b* illustrates a side view of the elevation angle needed to look over obstacle 2. FIG. 11*c* illustrates a side view of the elevation angle needed to look over obstacle 1. FIG. 12 shows a top view (i.e., in the azimuth plane) of the spatial relations between the antenna in position 2 and the obstructions. FIG. 13 shows a top view of the spatial relations between the antenna 16 in position 3 and the obstructions. FIG. 14 shows a top view of the spatial relations between the antenna 16 in position 4 and the obstructions. Each illustrative position of the antenna 16 would have a different obstruction map (i.e., a map such as illustrated in Appendix 1).

Example Usage of Blockage Database

The task of selecting between multiple alternative positions for the antenna can be accomplished with a hierarchical decision system such as a decision tree. Almost all decision trees are binary decision trees where each non-terminal node branches out to two descendant nodes. Without loss of generality, we will use binary decision tree classifiers in the description of the preferred embodiments of this invention. Other types of decision trees or other types of parametric or non-parametric decision methods could be used. A decision tree consists of at least one non-terminal node and at least as many terminal nodes as the number of decision outcomes to be decided. In this example each position of the antenna would be associated with one or more decision outcomes. Each outcome is associated with at least one terminal node and the non-terminal nodes represent various collections of mixed outcomes. The root node represents the entire connection of outcomes into which a new sample may be decided.

Figure 15:
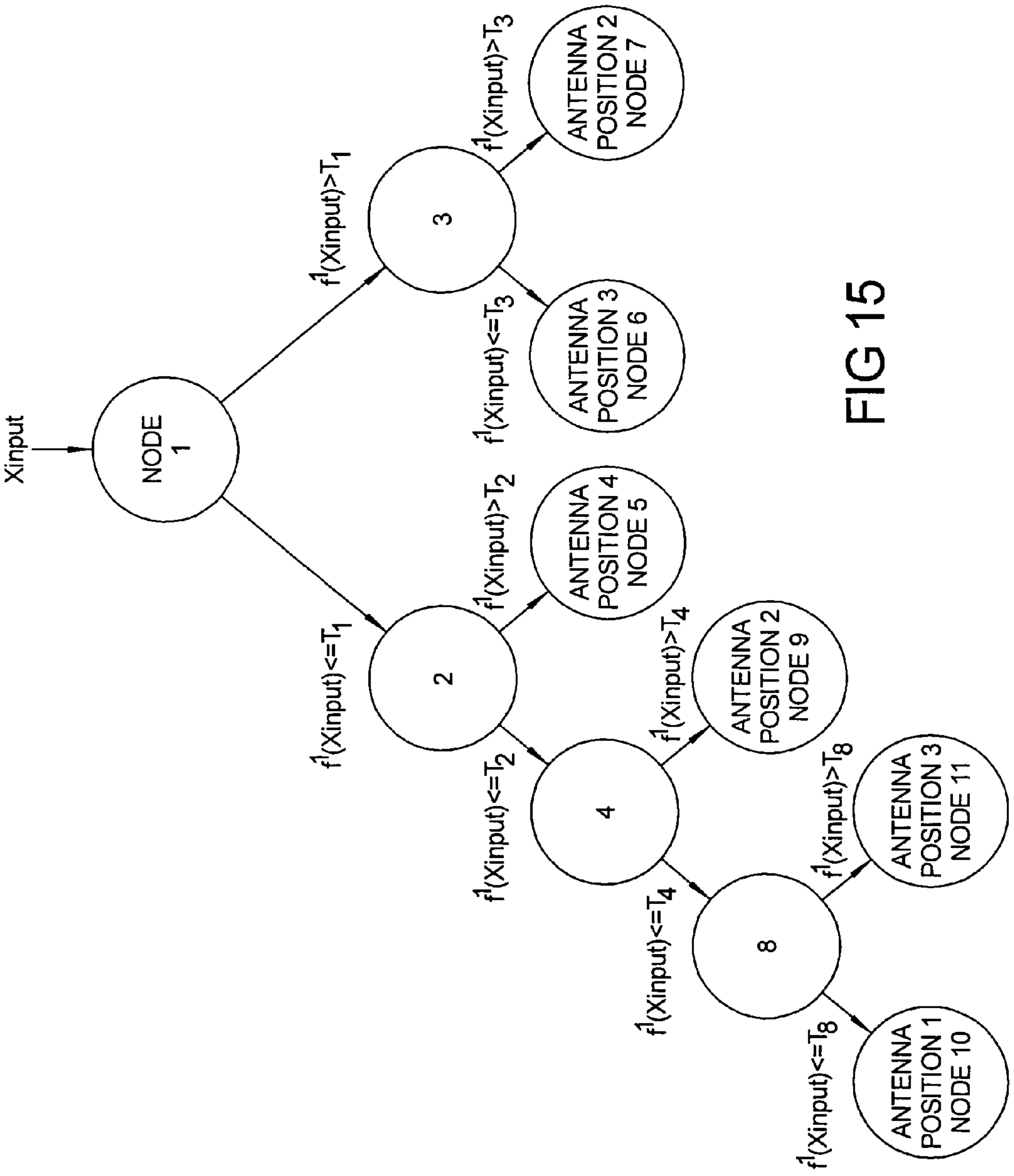
FIG. 15 is an exemplary binary decision tree for determining antenna position from an input condition.

FIG. 15 shows a typical binary decision tree classifier. There is a decision rule associated with each non-terminal node to determine the descendant path for a sample at the node, until a terminal node is reached. The decision outcomes of this decision tree classifier are antenna positions that can be selected based upon an input data vector $X_{input}$.

In operation, a new set of conditions $X_{input}$ is associated with a positioning decision. $X_{input}$ is a vector having the same feature set as was used to train the classifier. Using our Approach 1 example having the features used to train a classifier, we can use the trained classifier by inputting a vector $X_{input}$ that describes a set of features that reflect the conditions at the time an antenna position is to be determined. In this example, $X_{input}$ is a 6-dimensional vector (satellite elevation angle, satellite relative azimuth, attenuation, carrier phase disruption, roll rating, and pitch rating) that describes the instant set of conditions upon which the best antenna position would be based. Some of the features would be known, such as satellite elevation angle and relative azimuth, and some might be estimated. For example, acceptable attenuation might be influenced by rain intensity; and acceptable carrier phase disruption might be a parameter that changes depending upon (in this example) rain intensity also.

To make a decision, the instant set of conditions $X_{input}$ is used to enter the decision tree at the root node and the decision rule associated with the root node is applied to $X_{input}$ to determine the descendant path that the sample will follow. This process is repeated until a terminal node is reached. Every terminal node has an antenna position associated with it. The commonly used decision rule at each non-terminal node is a thresholding of a discrimination function value at the node. If the node's discrimination function value is less than or equal to a threshold value, the left child is taken; otherwise, the right child is taken for the descendant path. Feature thresholding is the simplest yet most easily understood discrimination function. It selects the feature and uses its value for a threshold. Other discrimination functions such as Fisher linear decision function, Bayes linear decision function, Bayes quadratic decision function and other single stage decision rules can also be used.

Constructing a Decision Tree

A binary decision tree can be constructed automatically by a divide and conquer procedure. Training samples are created from knowledge of the features for a vessel (i.e. the blockage database). A broad set of training samples is selected to completely characterize the installation characteristics. All training samples are used to construct the root node. Each subsequent node is trained by a subset of the training samples.

The decision tree construction procedure is as follows.

1. For a given node n with associated training sample set $U^n$, sort the samples in an ascending order according to their discrimination function values, i.e. $f(X_k^n) \leqq f(X_{k+1}^n)$. In the case of a single feature thresholding method, the sorting is performed for each of the features that are available for the tree construction procedure so that both feature and threshold value selection can be accomplished simultaneously.

2. A set of candidate thresholds $T^n$ is defined by:

$$T^n = \left\{ \frac{f(X_k^n) + f(X_{k+1}^n)}{2} \right\} | Position^{k+1} \neq Position^k |.$$

3. For each partition at a candidate threshold, calculate the following parameters:

a. the weighted number of position p samples assigned to LEFT, $N_{Lp}$, and the weighted number of position p samples assigned to RIGHT, $N_{Rp}$, where $$N_{Lp} = \sum_{i \in Position\_p\_in\_LEFT} \omega_i^p \text{ and } N_{Lp} = \sum_{j \in Position\_p\_in\_RIGHT} \omega_i^p, \text{ and } \omega_i^p$$

is the weighting factor for sample i belonging to position p; and b. the total weighted number of samples assigned to LEFT and RIGHT by the partition are $$N_L = \sum_{p \in LEFT} N_{Lp} \text{ and } N_R = \sum_{p \in RIGHT} N_{Rp}.$$

Evaluation functions to be used for the partition selection at node n include Purity (Entropy):

$$PR_n = \sum_{p \in all\_Position\_in\_n} (N_{Lp} \ln P_{Lp} + N_{Rp} \ln P_{Rp})$$

where $$P_{Lp} = \frac{N_{Lp}}{N_L} \text{ and } P_{Rp} = \frac{N_{Rp}}{N_R}.$$

Purity has the maximum value when the training samples are completely separated in LEFT and RIGHT. Other criteria that could be used for the evaluation function include the probability of correct position classification.

4. Select the partition for node n as the one that maximizes the evaluation function.

5. Check the following stopping criteria (OR conditions):

a. the maximum allowable level L of the tree (or a user specified limit) is reached. Where $L = \log_2 N - 1$ and N is the total number of training samples.

b. $\chi^2 \leqq$ limit_value where $$\chi^2 = \sum_{p \in all\_Position\_in\_n} \left( N_{Lp} \ln P_{Lp} + N_{Rp} \ln P_{Rp} - N_p^n \ln \frac{N_p^n}{N^n} \right)$$

$N_p^n$ is the weighted number of samples of position p at node n.

$N^n$ is the total weighted number of samples at node n.

c. $N^n$ is smaller than an allowable limit.

d. Type I error>limit. Where type I error is the probability that a sample whose true position is in LEFT yet is classified as in RIGHT position.

e. Type II error>limit. Where type II error is the probability that a sample whose true position is in RIGHT yet it is classified as in LEFT position.

6. If none of the stopping criteria is met, assign node n as a non-terminal node and use the step 4 selected partition for this node.

7. If at least one of the stopping criteria is met, assign node n as a terminal node, and assign the most probable position from its associated training samples Methodologies For Creating Blockage Databases Now to FIGS. 16-18, various preferred methods for creating the database of Appendix 1 are illustrated.

Imaging Method of Mapping Obstructions

The geometry of installation of the antenna 16 on the vessel 15 is used to determine obstructions with the line-of-sight path between the antenna and the serving satellite for each position/heading of the vessel along its predetermined route, for each one of the selectable antenna positions. This operation involves manually (i.e., by analysis of geometric relations) determining where partial and complete blockages exist when the antenna is pointed at each of its azimuth/elevation pointing angles.

Figure 16:
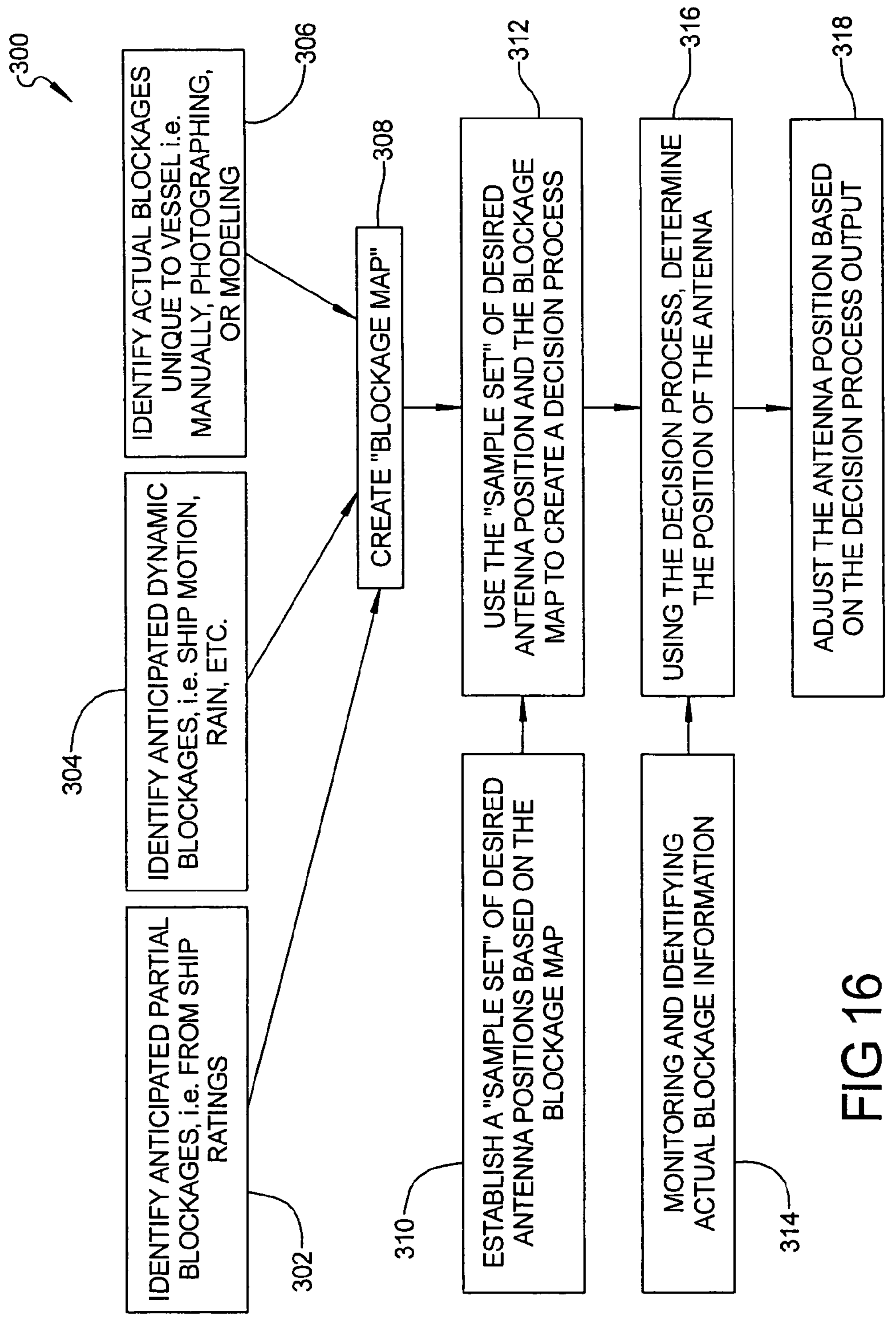
FIG. 16 is a flowchart illustrating an exemplary process for creating the decision tree of FIG. 15, and using the decision tree to determine a new position for the antenna.

FIG. 16 illustrates a method 300 for creating a blockage database (i.e., map) of obstructions that the antenna 16 will experience. This method involves imaging and then mapping the obstructions. The map of obstructions is created entirely in vessel-based coordinates; put differently, creating the map does not depend upon the route of the vessel or the position of the satellite with which the antenna 16 is communicating. Referring to FIG. 16, a flowchart 300 illustrates one example of an implementation of the present invention. Initially, at operation 302, all partial blockages are identified from various components/structures on the vessel 15 (i.e., railings guy wires, etc.). At operation 304 the anticipated blockages caused by dynamic factors such as roll, pitch, yaw, rain, etc. are determined. The roll, pitch and yaw may be combined as a single factor and termed “sea-state”. Rain and any other weather related variables may also be combined in a single “weather” factor. Next, at operation 306, actual blockages unique to the vessel 15 are determined by any suitable method, such as manual/visual inspection, photographing, computer modeling of the vessel, etc. The results obtained at operations 302-306 are used to create a “blockage map” that is used to form the blockage database 14.

At operation 310, a “sample set” of antenna positions (for example five different positions), are established based on the blockage map created at operation 308. The sample set of antenna positions represent a plurality of different locations on the vessel 15 that the antenna 16 may be moved to, and which positions are expected to provide the maximum chance of obtaining at least a partial line of sight path to the serving satellite regardless of vessel heading, sea-state conditions, weather conditions or other variables that could affect the line of sight path to the serving satellite. At operation 312, the sample set of desired antenna positions and the blockage map are used to create a binary decision process (i.e., binary decision tree) from which individual antenna positions can be selected based on various factors affecting the vessel 15 (i.e., sea-state, weather, etc.).

At operation 314, during operation of the vessel 15, monitoring and identification of actual (complete or partial) blockage occurrences takes place on a periodic basis, for example every five minutes during travel of the vessel. At operation 316, using the decision process created at operation 312, a determination is made as to the position of the antenna 16. By this it is meant whether the present position of the antenna is effective to maintain the link with the serving satellite, or whether a different antenna position is required to maintain the link. At operation 318, the antenna is repositioned if needed based on the outcome of the decision process created at operation 312. Preferably, the position of the antenna position is not changed unless a predetermined minimum threshold value representing a minimum acceptable line-of-sight path to the serving satellite is achieved. If such a minimum threshold is not met, then the antenna 16 is repositioned at the position determined at operation 316.

Measurement Mapping of Obstructions

Referring to FIG. 17, an alternative method 400 for creating the blockage database 14 by a measurement mapping technique is illustrated. This method involves measuring signal characteristics from a received satellite signal at each one of the various commandable antenna positions, for each vessel 15 position/heading along the vessel's route, as indicated in operation 402. At operation 404, the measured signal characteristic at operation 402 is compared with a known, unobstructed signal characteristic, at each position/heading point for the vessel on the vessel's route. Such a reference can be created by turning the vessel in a circle. The highest amplitude signal would be interpreted as an unobstructed signal. At operation 404, thresholding is used to determine the effected azimuth and/or elevation angles for which an obstruction exists, for each antenna position, for each position/heading point for the vessel 15 on the vessel's route, as indicated at operation 406. At operation 408, the obstruction map is populated with the information obtained at operation 406. This method is particularly appropriate for revising existing blockage database entries, which revision might be required to correct errors in an existing database. Such errors might for example be created by alterations that are made to the vessel configuration (as, for example, by moving a crane positioned on the vessel after the original blockage map was created).

Performance Anomaly Mapping of Obstructions

In FIG. 18, a performance anomaly mapping methodology 500 is disclosed for creating the blockage database. Essentially, this methodology creates a map of obstructions by analyzing various performance anomalies of signals being received by the vessel-mounted antenna. Initially, at operation 502, signals from the serving satellite, which are received by the antenna 16 on the vessel 15 are monitored. At operation 504, when an anomaly occurs, specific data associated with the operation of the communications link (e.g., antenna azimuth pointing angle, elevation pointing angle; Eb/No (energy per bit/noise spectral density) value of the received signal from the satellite; vessel position; specific satellite being used; state of the sea; wind; temperature; etc.) are all recorded by a suitable computer or processor. At operation 506, the anomaly information is used to create a map of blockages at various vessel position/heading positions, for each different antenna position to which the antenna may be commanded. This method is particularly useful for mapping obstructions that are not clear as to their extent of interference. For example, a network of guy wires or struts may only partially obstruct the signal path and the actual interference extent is not immediately apparent. Such impairment would be more clearly and completely defined by the actual characterization of the signal path used in this method.

The system 10 thus removes the requirement of an operator on-board the vessel 15 having to understand (and monitor) the relative position of the vessel and the look angles to the serving satellite to ensure that the antenna 16 is moved as needed to maintain closure of the communications link with the satellite. An ancillary benefit is that a smaller number of satellites may be needed to serve the vessel 15 on any given route, since controlled positioning of the antenna 16 sufficiently reduces or eliminates blockages that would otherwise require the vessel 15 to switch from one satellite to a different satellite (such as when using an Inmarsat satellite) with which line-of-sight access is possible. The system 10 further simplifies installation of an antenna because more antenna positions are typically available for use than would otherwise be the case with a fixed-position antenna. This is because a fixed position antenna is more limited in its mounting locations because of the need to minimize expected blockage zones that would be encountered during travel of the vessel.

While various preferred embodiments have been described, those skilled in the art will recognize modifications or variations that might be made without departing from the inventive concept. The examples illustrate the invention and are not intended to limit it. Therefore, the description and claims should be interpreted liberally with only such limitation as is necessary in view of the pertinent prior art.

APPENDIX 1

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1 | 0 | 0 | 0.4 | 1 | 3 | 2 |
| 2 | 0 | 1 | 0.4 | 1 | 3 | 2 |
| 3 | 0 | 2 | 0.4 | 1 | 3 | 2 |
| 4 | 0 | 3 | 0.4 | 1 | 3 | 2 |
| 5 | 0 | 4 | 0.4 | 1 | 3 | 2 |
| 6 | 0 | 5 | 0.4 | 3 | 3 | 2 |
| 7 | 0 | 6 | 0.4 | 5 | 3 | 2 |
| 8 | 0 | 7 | 0.4 | 7 | 3 | 2 |
| 9 | 0 | 8 | 0.4 | 10 | 3 | 2 |
| 10 | 0 | 9 | 0.5 | 10 | 3 | 2 |
| 11 | 0 | 10 | 0.7 | 10 | 3 | 2 |
| 12 | 0 | 11 | 1 | 10 | 3 | 2 |
| 13 | 0 | 12 | 2 | 10 | 3 | 2 |
| 14 | 0 | 13 | 5 | 7 | 3 | 2 |
| 15 | 0 | 14 | 7 | 7 | 3 | 2 |
| 16 | 0 | 15 | 10 | 9 | 1 | 1 |
| 17 | 0 | 16 | 15 | 10 | 1 | 1 |
| 18 | 0 | 17 | 15 | 10 | 1 | 1 |
| 19 | 0 | 18 | 15 | 10 | 1 | 1 |
| 20 | 0 | 19 | 15 | 10 | 1 | 1 |
| 21 | 0 | 20 | 15 | 10 | 1 | 1 |
| 22 | 0 | 21 | 15 | 10 | 1 | 1 |
| 23 | 0 | 22 | 15 | 10 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 24 | 0 | 23 | 15 | 10 | 1 | 1 |
| 25 | 0 | 24 | 15 | 10 | 1 | 1 |
| 26 | 0 | 25 | 15 | 10 | 1 | 1 |
| 27 | 0 | 26 | 15 | 10 | 1 | 1 |
| 28 | 0 | 27 | 15 | 10 | 1 | 1 |
| 29 | 0 | 28 | 15 | 10 | 1 | 1 |
| 30 | 0 | 29 | 15 | 10 | 1 | 1 |
| 31 | 0 | 30 | 15 | 10 | 1 | 1 |
| 32 | 0 | 31 | 15 | 10 | 1 | 1 |
| 33 | 0 | 32 | 15 | 10 | 1 | 1 |
| 34 | 0 | 33 | 15 | 10 | 1 | 1 |
| 35 | 0 | 34 | 10 | 10 | 1 | 1 |
| 36 | 0 | 35 | 7 | 10 | 1 | 1 |
| 37 | 0 | 36 | 5 | 7 | 1 | 1 |
| 38 | 0 | 37 | 2 | 3 | 3 | 2 |
| 39 | 0 | 38 | 1 | 1 | 3 | 2 |
| 40 | 0 | 39 | 0.4 | 1 | 3 | 2 |
| 41 | 0 | 40 | 0.4 | 1 | 3 | 2 |
| 42 | 0 | 41 | 0.4 | 1 | 3 | 2 |
| 43 | 0 | 42 | 0.4 | 1 | 3 | 2 |
| 44 | 0 | 43 | 0.4 | 1 | 3 | 2 |
| 45 | 0 | 44 | 0.4 | 1 | 3 | 2 |
| 46 | 0 | 45 | 0.4 | 1 | 3 | 2 |
| 47 | 0 | 46 | 0.4 | 1 | 3 | 2 |
| 48 | 0 | 47 | 0.4 | 1 | 3 | 2 |
| 49 | 0 | 48 | 0.4 | 1 | 3 | 2 |
| 50 | 0 | 49 | 0.4 | 1 | 3 | 2 |
| 51 | 0 | 50 | 0.4 | 1 | 3 | 2 |
| 52 | 0 | 51 | 0.4 | 1 | 3 | 2 |
| 53 | 0 | 52 | 0.4 | 1 | 3 | 2 |
| 54 | 0 | 53 | 0.4 | 1 | 3 | 2 |
| 55 | 0 | 54 | 0.4 | 1 | 3 | 2 |
| 56 | 0 | 55 | 0.4 | 1 | 3 | 2 |
| 57 | 0 | 56 | 0.4 | 1 | 3 | 2 |
| 58 | 0 | 57 | 0.4 | 1 | 3 | 2 |
| 59 | 0 | 58 | 0.4 | 1 | 3 | 2 |
| 60 | 0 | 59 | 0.4 | 1 | 3 | 2 |
| 61 | 0 | 60 | 0.4 | 1 | 3 | 2 |
| 62 | 0 | 61 | 0.4 | 1 | 3 | 2 |
| 63 | 0 | 62 | 0.4 | 1 | 3 | 2 |
| 64 | 0 | 63 | 0.4 | 1 | 3 | 2 |
| 65 | 0 | 64 | 0.4 | 1 | 3 | 2 |
| 66 | 0 | 65 | 0.4 | 1 | 3 | 2 |
| 67 | 0 | 66 | 0.4 | 1 | 3 | 2 |
| 68 | 0 | 67 | 0.4 | 1 | 3 | 2 |
| 69 | 0 | 68 | 0.4 | 1 | 3 | 2 |
| 70 | 0 | 69 | 0.4 | 1 | 3 | 2 |
| 71 | 0 | 70 | 0.4 | 1 | 3 | 2 |
| 72 | 0 | 71 | 0.4 | 1 | 3 | 2 |
| 73 | 0 | 72 | 0.4 | 1 | 3 | 2 |
| 74 | 0 | 73 | 0.4 | 1 | 3 | 2 |
| 75 | 0 | 74 | 0.4 | 1 | 3 | 2 |
| 76 | 0 | 75 | 0.4 | 1 | 3 | 2 |
| 77 | 0 | 76 | 0.4 | 1 | 3 | 2 |
| 78 | 0 | 77 | 0.4 | 1 | 3 | 2 |
| 79 | 0 | 78 | 0.4 | 1 | 3 | 2 |
| 80 | 0 | 79 | 0.4 | 1 | 3 | 2 |
| 81 | 0 | 80 | 0.4 | 1 | 3 | 2 |
| 82 | 0 | 81 | 0.4 | 1 | 3 | 2 |
| 83 | 0 | 82 | 0.4 | 1 | 3 | 2 |
| 84 | 0 | 83 | 0.4 | 1 | 3 | 2 |
| 85 | 0 | 84 | 0.4 | 1 | 3 | 2 |
| 86 | 0 | 85 | 0.4 | 1 | 3 | 2 |
| 87 | 0 | 86 | 0.4 | 1 | 3 | 2 |
| 88 | 0 | 87 | 0.4 | 1 | 3 | 2 |
| 89 | 0 | 88 | 0.4 | 1 | 3 | 2 |
| 90 | 0 | 89 | 0.4 | 1 | 3 | 2 |
| 91 | 0 | 90 | 0.4 | 1 | 3 | 2 |
| 92 | 0 | 91 | 0.4 | 1 | 3 | 2 |
| 93 | 0 | 92 | 0.4 | 1 | 3 | 2 |
| 94 | 0 | 93 | 0.4 | 1 | 3 | 2 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 95 | 0 | 94 | 0.4 | 1 | 3 | 2 |
| 96 | 0 | 95 | 0.4 | 1 | 3 | 2 |
| 97 | 0 | 96 | 0.4 | 1 | 3 | 2 |
| 98 | 0 | 97 | 0.4 | 1 | 3 | 2 |
| 99 | 0 | 98 | 0.4 | 1 | 3 | 2 |
| 100 | 0 | 99 | 0.4 | 1 | 3 | 2 |
| 101 | 0 | 100 | 1 | 3 | 3 | 2 |
| 102 | 0 | 101 | 1.3 | 5 | 3 | 2 |
| 103 | 0 | 102 | 1.7 | 5 | 3 | 2 |
| 104 | 0 | 103 | 2 | 5 | 3 | 2 |
| 105 | 0 | 104 | 2.5 | 5 | 3 | 2 |
| 106 | 0 | 105 | 2.5 | 9 | 3 | 2 |
| 107 | 0 | 106 | 2.5 | 9 | 3 | 2 |
| 108 | 0 | 107 | 3 | 9 | 3 | 2 |
| 109 | 0 | 108 | 3 | 9 | 3 | 2 |
| 110 | 0 | 109 | 3 | 10 | 3 | 2 |
| 111 | 0 | 110 | 3 | 10 | 3 | 2 |
| 112 | 0 | 111 | 5 | 10 | 3 | 2 |
| 113 | 0 | 112 | 5 | 10 | 3 | 2 |
| 114 | 0 | 113 | 3 | 10 | 3 | 2 |
| 115 | 0 | 114 | 3 | 10 | 3 | 2 |
| 116 | 0 | 115 | 3 | 10 | 3 | 2 |
| 117 | 0 | 116 | 3 | 10 | 3 | 2 |
| 118 | 0 | 117 | 3 | 9 | 3 | 2 |
| 119 | 0 | 118 | 3 | 9 | 3 | 2 |
| 120 | 0 | 119 | 3 | 9 | 3 | 2 |
| 121 | 0 | 120 | 2 | 7 | 3 | 2 |
| 122 | 0 | 121 | 2 | 5 | 3 | 2 |
| 123 | 0 | 122 | 2 | 4 | 3 | 2 |
| 124 | 0 | 123 | 0.4 | 4 | 3 | 2 |
| 125 | 0 | 124 | 0.4 | 3 | 3 | 2 |
| 126 | 0 | 125 | 0.4 | 2 | 3 | 2 |
| 127 | 0 | 126 | 0.4 | 1 | 3 | 2 |
| 128 | 0 | 127 | 0.4 | 1 | 3 | 2 |
| 129 | 0 | 128 | 0.4 | 1 | 3 | 2 |
| 130 | 0 | 129 | 0.4 | 1 | 3 | 2 |
| 131 | 0 | 130 | 0.4 | 1 | 3 | 2 |
| 132 | 0 | 131 | 0.4 | 1 | 3 | 2 |
| 133 | 0 | 132 | 0.4 | 1 | 3 | 2 |
| 134 | 0 | 133 | 0.4 | 1 | 3 | 2 |
| 135 | 0 | 134 | 0.4 | 1 | 3 | 2 |
| 136 | 0 | 135 | 0.4 | 1 | 3 | 2 |
| 137 | 0 | 136 | 0.4 | 1 | 3 | 2 |
| 138 | 0 | 137 | 0.4 | 1 | 3 | 2 |
| 139 | 0 | 138 | 0.4 | 1 | 3 | 2 |
| 140 | 0 | 139 | 0.4 | 1 | 3 | 2 |
| 141 | 0 | 140 | 0.4 | 1 | 3 | 2 |
| 142 | 0 | 141 | 0.4 | 1 | 3 | 2 |
| 143 | 0 | 142 | 0.4 | 1 | 3 | 2 |
| 144 | 0 | 143 | 0.4 | 1 | 3 | 2 |
| 145 | 0 | 144 | 0.4 | 1 | 3 | 2 |
| 146 | 0 | 145 | 0.4 | 1 | 3 | 2 |
| 147 | 0 | 146 | 0.4 | 1 | 3 | 2 |
| 148 | 0 | 147 | 0.4 | 1 | 3 | 2 |
| 149 | 0 | 148 | 0.4 | 1 | 3 | 2 |
| 150 | 0 | 149 | 0.4 | 1 | 3 | 2 |
| 151 | 0 | 150 | 0.4 | 1 | 3 | 2 |
| 152 | 0 | 151 | 0.4 | 1 | 3 | 2 |
| 153 | 0 | 152 | 0.4 | 1 | 3 | 2 |
| 154 | 0 | 153 | 0.4 | 1 | 3 | 2 |
| 155 | 0 | 154 | 0.4 | 1 | 3 | 2 |
| 156 | 0 | 155 | 0.4 | 1 | 3 | 2 |
| 157 | 0 | 156 | 0.4 | 1 | 3 | 2 |
| 158 | 0 | 157 | 0.4 | 1 | 3 | 2 |
| 159 | 0 | 158 | 0.4 | 1 | 3 | 2 |
| 160 | 0 | 159 | 0.4 | 1 | 3 | 2 |
| 161 | 0 | 160 | 0.4 | 1 | 3 | 2 |
| 162 | 0 | 161 | 0.4 | 1 | 3 | 2 |
| 163 | 0 | 162 | 0.4 | 1 | 3 | 2 |
| 164 | 0 | 163 | 0.4 | 1 | 3 | 2 |
| 165 | 0 | 164 | 0.4 | 1 | 3 | 2 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 166 | 0 | 165 | 0.4 | 1 | 3 | 2 |
| 167 | 0 | 166 | 0.4 | 1 | 3 | 2 |
| 168 | 0 | 167 | 0.4 | 1 | 3 | 2 |
| 169 | 0 | 168 | 0.4 | 1 | 3 | 2 |
| 170 | 0 | 169 | 0.4 | 1 | 3 | 2 |
| 171 | 0 | 170 | 0.4 | 1 | 3 | 2 |
| 172 | 0 | 171 | 0.4 | 1 | 3 | 2 |
| 173 | 0 | 172 | 0.4 | 1 | 3 | 2 |
| 174 | 0 | 173 | 0.4 | 1 | 3 | 2 |
| 175 | 0 | 174 | 0.4 | 1 | 3 | 2 |
| 176 | 0 | 175 | 0.4 | 1 | 3 | 2 |
| 177 | 0 | 176 | 0.4 | 1 | 3 | 2 |
| 178 | 0 | 177 | 0.4 | 1 | 3 | 2 |
| 179 | 0 | 178 | 0.4 | 1 | 3 | 2 |
| 180 | 0 | 179 | 0.4 | 1 | 3 | 2 |
| 181 | 0 | 180 | 0.4 | 1 | 3 | 2 |
| 182 | 0 | 181 | 0.4 | 1 | 3 | 2 |
| 183 | 0 | 182 | 0.4 | 1 | 3 | 2 |
| 184 | 0 | 183 | 0.4 | 1 | 3 | 2 |
| 185 | 0 | 184 | 0.4 | 1 | 3 | 2 |
| 186 | 0 | 185 | 0.4 | 1 | 3 | 2 |
| 187 | 0 | 186 | 0.4 | 1 | 3 | 2 |
| 188 | 0 | 187 | 0.4 | 1 | 3 | 2 |
| 189 | 0 | 188 | 0.4 | 1 | 3 | 2 |
| 190 | 0 | 189 | 0.4 | 1 | 3 | 2 |
| 191 | 0 | 190 | 0.4 | 1 | 3 | 2 |
| 192 | 0 | 191 | 0.4 | 1 | 3 | 2 |
| 193 | 0 | 192 | 0.4 | 1 | 3 | 2 |
| 194 | 0 | 193 | 0.4 | 1 | 3 | 2 |
| 195 | 0 | 194 | 0.4 | 1 | 3 | 2 |
| 196 | 0 | 195 | 0.4 | 1 | 3 | 2 |
| 197 | 0 | 196 | 0.4 | 1 | 3 | 2 |
| 198 | 0 | 197 | 0.4 | 1 | 3 | 2 |
| 199 | 0 | 198 | 0.4 | 1 | 3 | 2 |
| 200 | 0 | 199 | 0.4 | 1 | 3 | 2 |
| 201 | 0 | 200 | 0.4 | 1 | 3 | 2 |
| 202 | 0 | 201 | 0.4 | 1 | 3 | 2 |
| 203 | 0 | 202 | 0.4 | 1 | 3 | 2 |
| 204 | 0 | 203 | 0.4 | 1 | 3 | 2 |
| 205 | 0 | 204 | 0.4 | 1 | 3 | 2 |
| 206 | 0 | 205 | 0.4 | 1 | 3 | 2 |
| 207 | 0 | 206 | 0.4 | 1 | 3 | 2 |
| 208 | 0 | 207 | 0.4 | 1 | 3 | 2 |
| 209 | 0 | 208 | 0.4 | 1 | 3 | 2 |
| 210 | 0 | 209 | 0.4 | 1 | 3 | 2 |
| 211 | 0 | 210 | 0.4 | 1 | 3 | 2 |
| 212 | 0 | 211 | 0.4 | 1 | 3 | 2 |
| 213 | 0 | 212 | 0.4 | 1 | 3 | 2 |
| 214 | 0 | 213 | 0.4 | 1 | 3 | 2 |
| 215 | 0 | 214 | 0.4 | 1 | 3 | 2 |
| 216 | 0 | 215 | 0.4 | 2 | 3 | 2 |
| 217 | 0 | 216 | 1 | 3 | 3 | 2 |
| 218 | 0 | 217 | 3 | 5 | 3 | 2 |
| 219 | 0 | 218 | 4 | 5 | 3 | 2 |
| 220 | 0 | 219 | 7 | 7 | 3 | 2 |
| 221 | 0 | 220 | 7 | 7 | 3 | 2 |
| 222 | 0 | 221 | 9 | 7 | 3 | 2 |
| 223 | 0 | 222 | 9 | 7 | 3 | 2 |
| 224 | 0 | 223 | 9 | 7 | 3 | 2 |
| 225 | 0 | 224 | 9 | 7 | 3 | 2 |
| 226 | 0 | 225 | 9 | 7 | 3 | 2 |
| 227 | 0 | 226 | 9 | 7 | 3 | 2 |
| 228 | 0 | 227 | 7 | 7 | 3 | 2 |
| 229 | 0 | 228 | 6 | 5 | 3 | 2 |
| 230 | 0 | 229 | 6 | 4 | 3 | 2 |
| 231 | 0 | 230 | 5 | 3 | 3 | 2 |
| 232 | 0 | 231 | 4 | 2 | 3 | 2 |
| 233 | 0 | 232 | 2 | 1 | 3 | 2 |
| 234 | 0 | 233 | 1 | 1 | 3 | 2 |
| 235 | 0 | 234 | 0.4 | 1 | 3 | 2 |
| 236 | 0 | 235 | 0.4 | 1 | 3 | 2 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 237 | 0 | 236 | 0.4 | 1 | 3 | 2 |
| 238 | 0 | 237 | 0.4 | 1 | 3 | 2 |
| 239 | 0 | 238 | 0.4 | 1 | 3 | 2 |
| 240 | 0 | 239 | 0.4 | 1 | 3 | 2 |
| 241 | 0 | 240 | 0.4 | 1 | 3 | 2 |
| 242 | 0 | 241 | 0.4 | 1 | 3 | 2 |
| 243 | 0 | 242 | 0.4 | 1 | 3 | 2 |
| 244 | 0 | 243 | 0.4 | 1 | 3 | 2 |
| 245 | 0 | 244 | 0.4 | 1 | 3 | 2 |
| 246 | 0 | 245 | 0.4 | 1 | 3 | 2 |
| 247 | 0 | 246 | 0.4 | 1 | 3 | 2 |
| 248 | 0 | 247 | 0.4 | 1 | 3 | 2 |
| 249 | 0 | 248 | 0.4 | 1 | 3 | 2 |
| 250 | 0 | 249 | 0.4 | 1 | 3 | 2 |
| 251 | 0 | 250 | 0.4 | 1 | 3 | 2 |
| 252 | 0 | 251 | 0.4 | 1 | 3 | 2 |
| 253 | 0 | 252 | 0.4 | 1 | 3 | 2 |
| 254 | 0 | 253 | 0.4 | 1 | 3 | 2 |
| 255 | 0 | 254 | 0.4 | 1 | 3 | 2 |
| 256 | 0 | 255 | 0.4 | 1 | 3 | 2 |
| 257 | 0 | 256 | 0.4 | 1 | 3 | 2 |
| 258 | 0 | 257 | 0.4 | 1 | 3 | 2 |
| 259 | 0 | 258 | 0.4 | 1 | 3 | 2 |
| 260 | 0 | 259 | 0.4 | 1 | 3 | 2 |
| 261 | 0 | 260 | 0.4 | 1 | 3 | 2 |
| 262 | 0 | 261 | 0.4 | 1 | 3 | 2 |
| 263 | 0 | 262 | 0.4 | 1 | 3 | 2 |
| 264 | 0 | 263 | 0.4 | 1 | 3 | 2 |
| 265 | 0 | 264 | 0.4 | 1 | 3 | 2 |
| 266 | 0 | 265 | 0.4 | 1 | 3 | 2 |
| 267 | 0 | 266 | 0.4 | 1 | 3 | 2 |
| 268 | 0 | 267 | 0.4 | 1 | 3 | 2 |
| 269 | 0 | 268 | 0.4 | 1 | 3 | 2 |
| 270 | 0 | 269 | 0.4 | 1 | 3 | 2 |
| 271 | 0 | 270 | 0.4 | 1 | 3 | 2 |
| 272 | 0 | 271 | 0.4 | 1 | 3 | 2 |
| 273 | 0 | 272 | 0.4 | 1 | 3 | 2 |
| 274 | 0 | 273 | 0.4 | 1 | 3 | 2 |
| 275 | 0 | 274 | 0.4 | 1 | 3 | 2 |
| 276 | 0 | 275 | 0.4 | 1 | 3 | 2 |
| 277 | 0 | 276 | 0.4 | 1 | 3 | 2 |
| 278 | 0 | 277 | 0.4 | 1 | 3 | 2 |
| 279 | 0 | 278 | 0.4 | 1 | 3 | 2 |
| 280 | 0 | 279 | 0.4 | 1 | 3 | 2 |
| 281 | 0 | 280 | 0.4 | 1 | 3 | 2 |
| 282 | 0 | 281 | 0.4 | 1 | 3 | 2 |
| 283 | 0 | 282 | 0.4 | 1 | 3 | 2 |
| 284 | 0 | 283 | 0.4 | 1 | 3 | 2 |
| 285 | 0 | 284 | 0.4 | 1 | 3 | 2 |
| 286 | 0 | 285 | 0.4 | 1 | 3 | 2 |
| 287 | 0 | 286 | 0.4 | 1 | 3 | 2 |
| 288 | 0 | 287 | 0.4 | 1 | 3 | 2 |
| 289 | 0 | 288 | 0.4 | 1 | 3 | 2 |
| 290 | 0 | 289 | 0.4 | 1 | 3 | 2 |
| 291 | 0 | 290 | 0.4 | 1 | 3 | 2 |
| 292 | 0 | 291 | 0.4 | 1 | 3 | 2 |
| 293 | 0 | 292 | 0.4 | 1 | 3 | 2 |
| 294 | 0 | 293 | 0.4 | 1 | 3 | 2 |
| 295 | 0 | 294 | 0.4 | 1 | 3 | 2 |
| 296 | 0 | 295 | 0.4 | 1 | 3 | 2 |
| 297 | 0 | 296 | 0.4 | 1 | 3 | 2 |
| 298 | 0 | 297 | 0.4 | 1 | 3 | 2 |
| 299 | 0 | 298 | 0.4 | 1 | 3 | 2 |
| 300 | 0 | 299 | 0.4 | 1 | 3 | 2 |
| 301 | 0 | 300 | 0.4 | 1 | 3 | 2 |
| 302 | 0 | 301 | 0.4 | 1 | 3 | 2 |
| 303 | 0 | 302 | 0.4 | 1 | 3 | 2 |
| 304 | 0 | 303 | 0.4 | 1 | 3 | 2 |
| 305 | 0 | 304 | 0.4 | 1 | 3 | 2 |
| 306 | 0 | 305 | 0.4 | 1 | 3 | 2 |
| 307 | 0 | 306 | 0.4 | 1 | 3 | 2 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 308 | 0 | 307 | 0.4 | 1 | 3 | 2 |
| 309 | 0 | 308 | 0.4 | 1 | 3 | 2 |
| 310 | 0 | 309 | 0.4 | 1 | 3 | 2 |
| 311 | 0 | 310 | 0.4 | 1 | 3 | 2 |
| 312 | 0 | 311 | 0.4 | 1 | 3 | 2 |
| 313 | 0 | 312 | 0.4 | 1 | 3 | 2 |
| 314 | 0 | 313 | 0.4 | 1 | 3 | 2 |
| 315 | 0 | 314 | 0.4 | 1 | 3 | 2 |
| 316 | 0 | 315 | 0.4 | 1 | 3 | 2 |
| 317 | 0 | 316 | 0.4 | 1 | 3 | 2 |
| 318 | 0 | 317 | 0.4 | 1 | 3 | 2 |
| 319 | 0 | 318 | 0.4 | 1 | 3 | 2 |
| 320 | 0 | 319 | 0.4 | 1 | 3 | 2 |
| 321 | 0 | 320 | 0.4 | 1 | 3 | 2 |
| 322 | 0 | 321 | 0.4 | 1 | 3 | 2 |
| 323 | 0 | 322 | 0.4 | 1 | 3 | 2 |
| 324 | 0 | 323 | 0.4 | 1 | 3 | 2 |
| 325 | 0 | 324 | 0.4 | 1 | 3 | 2 |
| 326 | 0 | 325 | 0.4 | 1 | 3 | 2 |
| 327 | 0 | 326 | 0.4 | 1 | 3 | 2 |
| 328 | 0 | 327 | 0.4 | 1 | 3 | 2 |
| 329 | 0 | 328 | 0.4 | 1 | 3 | 2 |
| 330 | 0 | 329 | 0.4 | 1 | 3 | 2 |
| 331 | 0 | 330 | 0.4 | 1 | 3 | 2 |
| 332 | 0 | 331 | 0.4 | 1 | 3 | 2 |
| 333 | 0 | 332 | 0.4 | 1 | 3 | 2 |
| 334 | 0 | 333 | 0.4 | 1 | 3 | 2 |
| 335 | 0 | 334 | 0.4 | 1 | 3 | 2 |
| 336 | 0 | 335 | 0.4 | 1 | 3 | 2 |
| 337 | 0 | 336 | 0.4 | 1 | 3 | 2 |
| 338 | 0 | 337 | 0.4 | 1 | 3 | 2 |
| 339 | 0 | 338 | 0.4 | 1 | 3 | 2 |
| 340 | 0 | 339 | 0.4 | 1 | 3 | 2 |
| 341 | 0 | 340 | 0.4 | 1 | 3 | 2 |
| 342 | 0 | 341 | 0.4 | 1 | 3 | 2 |
| 343 | 0 | 342 | 0.4 | 1 | 3 | 2 |
| 344 | 0 | 343 | 0.4 | 1 | 3 | 2 |
| 345 | 0 | 344 | 0.4 | 1 | 3 | 2 |
| 346 | 0 | 345 | 0.4 | 1 | 3 | 2 |
| 347 | 0 | 346 | 0.4 | 1 | 3 | 2 |
| 348 | 0 | 347 | 0.4 | 1 | 3 | 2 |
| 349 | 0 | 348 | 0.4 | 1 | 3 | 2 |
| 350 | 0 | 349 | 0.4 | 1 | 3 | 2 |
| 351 | 0 | 350 | 0.4 | 1 | 3 | 2 |
| 352 | 0 | 351 | 0.4 | 1 | 3 | 2 |
| 353 | 0 | 352 | 0.4 | 1 | 3 | 2 |
| 354 | 0 | 353 | 0.4 | 1 | 3 | 2 |
| 355 | 0 | 354 | 0.4 | 1 | 3 | 2 |
| 356 | 0 | 355 | 0.4 | 1 | 3 | 2 |
| 357 | 0 | 356 | 0.4 | 1 | 3 | 2 |
| 358 | 0 | 357 | 0.4 | 1 | 3 | 2 |
| 359 | 0 | 358 | 0.4 | 1 | 3 | 2 |
| 360 | 0 | 359 | 0.4 | 1 | 3 | 2 |
| 361 | 10 | 0 | 0.4 | 1 | 1 | 1 |
| 362 | 10 | 1 | 0.4 | 1 | 1 | 1 |
| 363 | 10 | 2 | 0.4 | 1 | 1 | 1 |
| 364 | 10 | 3 | 0.4 | 1 | 1 | 1 |
| 365 | 10 | 4 | 0.4 | 1 | 1 | 1 |
| 366 | 10 | 5 | 0.4 | 1 | 1 | 1 |
| 367 | 10 | 6 | 0.4 | 3 | 1 | 1 |
| 368 | 10 | 7 | 0.4 | 5 | 1 | 1 |
| 369 | 10 | 8 | 0.4 | 7 | 1 | 1 |
| 370 | 10 | 9 | 0.4 | 10 | 1 | 1 |
| 371 | 10 | 10 | 0.5 | 10 | 1 | 1 |
| 372 | 10 | 11 | 0.7 | 10 | 1 | 1 |
| 373 | 10 | 12 | 1 | 10 | 1 | 1 |
| 374 | 10 | 13 | 2 | 10 | 1 | 1 |
| 375 | 10 | 14 | 5 | 7 | 1 | 1 |
| 376 | 10 | 15 | 7 | 7 | 1 | 1 |
| 377 | 10 | 16 | 10 | 9 | 1 | 1 |
| 378 | 10 | 17 | 15 | 10 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 379 | 10 | 18 | 15 | 10 | 1 | 1 |
| 380 | 10 | 19 | 15 | 10 | 1 | 1 |
| 381 | 10 | 20 | 15 | 10 | 1 | 1 |
| 382 | 10 | 21 | 15 | 10 | 1 | 1 |
| 383 | 10 | 22 | 15 | 10 | 1 | 1 |
| 384 | 10 | 23 | 15 | 10 | 1 | 1 |
| 385 | 10 | 24 | 15 | 10 | 1 | 1 |
| 386 | 10 | 25 | 15 | 10 | 1 | 1 |
| 387 | 10 | 26 | 15 | 10 | 1 | 1 |
| 388 | 10 | 27 | 15 | 10 | 1 | 1 |
| 389 | 10 | 28 | 15 | 10 | 1 | 1 |
| 390 | 10 | 29 | 15 | 10 | 1 | 1 |
| 391 | 10 | 30 | 15 | 10 | 1 | 1 |
| 392 | 10 | 31 | 15 | 10 | 1 | 1 |
| 393 | 10 | 32 | 15 | 10 | 1 | 1 |
| 394 | 10 | 33 | 15 | 10 | 1 | 1 |
| 395 | 10 | 34 | 15 | 10 | 1 | 1 |
| 396 | 10 | 35 | 10 | 10 | 1 | 1 |
| 397 | 10 | 36 | 7 | 10 | 1 | 1 |
| 398 | 10 | 37 | 5 | 7 | 1 | 1 |
| 399 | 10 | 38 | 2 | 3 | 1 | 1 |
| 400 | 10 | 39 | 1 | 1 | 1 | 1 |
| 401 | 10 | 40 | 0.4 | 1 | 1 | 1 |
| 402 | 10 | 41 | 0.4 | 1 | 1 | 1 |
| 403 | 10 | 42 | 0.4 | 1 | 1 | 1 |
| 404 | 10 | 43 | 0.4 | 1 | 1 | 1 |
| 405 | 10 | 44 | 0.4 | 1 | 1 | 1 |
| 406 | 10 | 45 | 0.4 | 1 | 1 | 1 |
| 407 | 10 | 46 | 0.4 | 1 | 1 | 1 |
| 408 | 10 | 47 | 0.4 | 1 | 1 | 1 |
| 409 | 10 | 48 | 0.4 | 1 | 1 | 1 |
| 410 | 10 | 49 | 0.4 | 1 | 1 | 1 |
| 411 | 10 | 50 | 0.4 | 1 | 1 | 1 |
| 412 | 10 | 51 | 0.4 | 1 | 1 | 1 |
| 413 | 10 | 52 | 0.4 | 1 | 1 | 1 |
| 414 | 10 | 53 | 0.4 | 1 | 1 | 1 |
| 415 | 10 | 54 | 0.4 | 1 | 1 | 1 |
| 416 | 10 | 55 | 0.4 | 1 | 1 | 1 |
| 417 | 10 | 56 | 0.4 | 1 | 1 | 1 |
| 418 | 10 | 57 | 0.4 | 1 | 1 | 1 |
| 419 | 10 | 58 | 0.4 | 1 | 1 | 1 |
| 420 | 10 | 59 | 0.4 | 1 | 1 | 1 |
| 421 | 10 | 60 | 0.4 | 1 | 1 | 1 |
| 422 | 10 | 61 | 0.4 | 1 | 1 | 1 |
| 423 | 10 | 62 | 0.4 | 1 | 1 | 1 |
| 424 | 10 | 63 | 0.4 | 1 | 1 | 1 |
| 425 | 10 | 64 | 0.4 | 1 | 1 | 1 |
| 426 | 10 | 65 | 0.4 | 1 | 1 | 1 |
| 427 | 10 | 66 | 0.4 | 1 | 1 | 1 |
| 428 | 10 | 67 | 0.4 | 1 | 1 | 1 |
| 429 | 10 | 68 | 0.4 | 1 | 1 | 1 |
| 430 | 10 | 69 | 0.4 | 1 | 1 | 1 |
| 431 | 10 | 70 | 0.4 | 1 | 1 | 1 |
| 432 | 10 | 71 | 0.4 | 1 | 1 | 1 |
| 433 | 10 | 72 | 0.4 | 1 | 1 | 1 |
| 434 | 10 | 73 | 0.4 | 1 | 1 | 1 |
| 435 | 10 | 74 | 0.4 | 1 | 1 | 1 |
| 436 | 10 | 75 | 0.4 | 1 | 1 | 1 |
| 437 | 10 | 76 | 0.4 | 1 | 1 | 1 |
| 438 | 10 | 77 | 0.4 | 1 | 1 | 1 |
| 439 | 10 | 78 | 0.4 | 1 | 1 | 1 |
| 440 | 10 | 79 | 0.4 | 1 | 1 | 1 |
| 441 | 10 | 80 | 0.4 | 1 | 1 | 1 |
| 442 | 10 | 81 | 0.4 | 1 | 1 | 1 |
| 443 | 10 | 82 | 0.4 | 1 | 1 | 1 |
| 444 | 10 | 83 | 0.4 | 1 | 1 | 1 |
| 445 | 10 | 84 | 0.4 | 1 | 1 | 1 |
| 446 | 10 | 85 | 0.4 | 1 | 1 | 1 |
| 447 | 10 | 86 | 0.4 | 1 | 1 | 1 |
| 448 | 10 | 87 | 0.4 | 1 | 1 | 1 |
| 449 | 10 | 88 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 450 | 10 | 89 | 0.4 | 1 | 1 | 1 |
| 451 | 10 | 90 | 0.4 | 1 | 1 | 1 |
| 452 | 10 | 91 | 0.4 | 1 | 1 | 1 |
| 453 | 10 | 92 | 0.4 | 1 | 1 | 1 |
| 454 | 10 | 93 | 0.4 | 1 | 1 | 1 |
| 455 | 10 | 94 | 0.4 | 1 | 1 | 1 |
| 456 | 10 | 95 | 0.4 | 1 | 1 | 1 |
| 457 | 10 | 96 | 0.4 | 1 | 1 | 1 |
| 458 | 10 | 97 | 0.4 | 1 | 1 | 1 |
| 459 | 10 | 98 | 0.4 | 1 | 1 | 1 |
| 460 | 10 | 99 | 0.4 | 1 | 1 | 1 |
| 461 | 10 | 100 | 0.4 | 1 | 3 | 2 |
| 462 | 10 | 101 | 1 | 3 | 3 | 2 |
| 463 | 10 | 102 | 1.3 | 5 | 3 | 2 |
| 464 | 10 | 103 | 1.7 | 5 | 4 | 2 |
| 465 | 10 | 104 | 2 | 5 | 4 | 2 |
| 466 | 10 | 105 | 2.5 | 5 | 4 | 2 |
| 467 | 10 | 106 | 2.5 | 9 | 4 | 2 |
| 468 | 10 | 107 | 2.5 | 9 | 6 | 2 |
| 469 | 10 | 108 | 3 | 9 | 6 | 2 |
| 470 | 10 | 109 | 3 | 9 | 6 | 2 |
| 471 | 10 | 110 | 3 | 10 | 6 | 3 |
| 472 | 10 | 111 | 3 | 10 | 6 | 3 |
| 473 | 10 | 112 | 5 | 10 | 6 | 3 |
| 474 | 10 | 113 | 5 | 10 | 6 | 3 |
| 475 | 10 | 114 | 3 | 10 | 6 | 3 |
| 476 | 10 | 115 | 3 | 10 | 6 | 3 |
| 477 | 10 | 116 | 3 | 10 | 6 | 3 |
| 478 | 10 | 117 | 3 | 10 | 6 | 3 |
| 479 | 10 | 118 | 3 | 9 | 6 | 2 |
| 480 | 10 | 119 | 3 | 9 | 6 | 2 |
| 481 | 10 | 120 | 3 | 9 | 6 | 2 |
| 482 | 10 | 121 | 2 | 7 | 5 | 2 |
| 483 | 10 | 122 | 2 | 5 | 4 | 2 |
| 484 | 10 | 123 | 2 | 4 | 3 | 2 |
| 485 | 10 | 124 | 0.4 | 4 | 3 | 2 |
| 486 | 10 | 125 | 0.4 | 3 | 3 | 2 |
| 487 | 10 | 126 | 0.4 | 2 | 3 | 2 |
| 488 | 10 | 127 | 0.4 | 1 | 1 | 1 |
| 489 | 10 | 128 | 0.4 | 1 | 1 | 1 |
| 490 | 10 | 129 | 0.4 | 1 | 1 | 1 |
| 491 | 10 | 130 | 0.4 | 1 | 1 | 1 |
| 492 | 10 | 131 | 0.4 | 1 | 1 | 1 |
| 493 | 10 | 132 | 0.4 | 1 | 1 | 1 |
| 494 | 10 | 133 | 0.4 | 1 | 1 | 1 |
| 495 | 10 | 134 | 0.4 | 1 | 1 | 1 |
| 496 | 10 | 135 | 0.4 | 1 | 1 | 1 |
| 497 | 10 | 136 | 0.4 | 1 | 1 | 1 |
| 498 | 10 | 137 | 0.4 | 1 | 1 | 1 |
| 499 | 10 | 138 | 0.4 | 1 | 1 | 1 |
| 500 | 10 | 139 | 0.4 | 1 | 1 | 1 |
| 501 | 10 | 140 | 0.4 | 1 | 1 | 1 |
| 502 | 10 | 141 | 0.4 | 1 | 1 | 1 |
| 503 | 10 | 142 | 0.4 | 1 | 1 | 1 |
| 504 | 10 | 143 | 0.4 | 1 | 1 | 1 |
| 505 | 10 | 144 | 0.4 | 1 | 1 | 1 |
| 506 | 10 | 145 | 0.4 | 1 | 1 | 1 |
| 507 | 10 | 146 | 0.4 | 1 | 1 | 1 |
| 508 | 10 | 147 | 0.4 | 1 | 1 | 1 |
| 509 | 10 | 148 | 0.4 | 1 | 1 | 1 |
| 510 | 10 | 149 | 0.4 | 1 | 1 | 1 |
| 511 | 10 | 150 | 0.4 | 1 | 1 | 1 |
| 512 | 10 | 151 | 0.4 | 1 | 1 | 1 |
| 513 | 10 | 152 | 0.4 | 1 | 1 | 1 |
| 514 | 10 | 153 | 0.4 | 1 | 1 | 1 |
| 515 | 10 | 154 | 0.4 | 1 | 1 | 1 |
| 516 | 10 | 155 | 0.4 | 1 | 1 | 1 |
| 517 | 10 | 156 | 0.4 | 1 | 1 | 1 |
| 518 | 10 | 157 | 0.4 | 1 | 1 | 1 |
| 519 | 10 | 158 | 0.4 | 1 | 1 | 1 |
| 520 | 10 | 159 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 521 | 10 | 160 | 0.4 | 1 | 1 | 1 |
| 522 | 10 | 161 | 0.4 | 1 | 1 | 1 |
| 523 | 10 | 162 | 0.4 | 1 | 1 | 1 |
| 524 | 10 | 163 | 0.4 | 1 | 1 | 1 |
| 525 | 10 | 164 | 0.4 | 1 | 1 | 1 |
| 526 | 10 | 165 | 0.4 | 1 | 1 | 1 |
| 527 | 10 | 166 | 0.4 | 1 | 1 | 1 |
| 528 | 10 | 167 | 0.4 | 1 | 1 | 1 |
| 529 | 10 | 168 | 0.4 | 1 | 1 | 1 |
| 530 | 10 | 169 | 0.4 | 1 | 1 | 1 |
| 531 | 10 | 170 | 0.4 | 1 | 1 | 1 |
| 532 | 10 | 171 | 0.4 | 1 | 1 | 1 |
| 533 | 10 | 172 | 0.4 | 1 | 1 | 1 |
| 534 | 10 | 173 | 0.4 | 1 | 1 | 1 |
| 535 | 10 | 174 | 0.4 | 1 | 1 | 1 |
| 536 | 10 | 175 | 0.4 | 1 | 1 | 1 |
| 537 | 10 | 176 | 0.4 | 1 | 1 | 1 |
| 538 | 10 | 177 | 0.4 | 1 | 1 | 1 |
| 539 | 10 | 178 | 0.4 | 1 | 1 | 1 |
| 540 | 10 | 179 | 0.4 | 1 | 1 | 1 |
| 541 | 10 | 180 | 0.4 | 1 | 1 | 1 |
| 542 | 10 | 181 | 0.4 | 1 | 1 | 1 |
| 543 | 10 | 182 | 0.4 | 1 | 1 | 1 |
| 544 | 10 | 183 | 0.4 | 1 | 1 | 1 |
| 545 | 10 | 184 | 0.4 | 1 | 1 | 1 |
| 546 | 10 | 185 | 0.4 | 1 | 1 | 1 |
| 547 | 10 | 186 | 0.4 | 1 | 1 | 1 |
| 548 | 10 | 187 | 0.4 | 1 | 1 | 1 |
| 549 | 10 | 188 | 0.4 | 1 | 1 | 1 |
| 550 | 10 | 189 | 0.4 | 1 | 1 | 1 |
| 551 | 10 | 190 | 0.4 | 1 | 1 | 1 |
| 552 | 10 | 191 | 0.4 | 1 | 1 | 1 |
| 553 | 10 | 192 | 0.4 | 1 | 1 | 1 |
| 554 | 10 | 193 | 0.4 | 1 | 1 | 1 |
| 555 | 10 | 194 | 0.4 | 1 | 1 | 1 |
| 556 | 10 | 195 | 0.4 | 1 | 1 | 1 |
| 557 | 10 | 196 | 0.4 | 1 | 1 | 1 |
| 558 | 10 | 197 | 0.4 | 1 | 1 | 1 |
| 559 | 10 | 198 | 0.4 | 1 | 1 | 1 |
| 560 | 10 | 199 | 0.4 | 1 | 1 | 1 |
| 561 | 10 | 200 | 0.4 | 1 | 1 | 1 |
| 562 | 10 | 201 | 0.4 | 1 | 1 | 1 |
| 563 | 10 | 202 | 0.4 | 1 | 1 | 1 |
| 564 | 10 | 203 | 0.4 | 1 | 1 | 1 |
| 565 | 10 | 204 | 0.4 | 1 | 1 | 1 |
| 566 | 10 | 205 | 0.4 | 1 | 1 | 1 |
| 567 | 10 | 206 | 0.4 | 1 | 1 | 1 |
| 568 | 10 | 207 | 0.4 | 1 | 1 | 1 |
| 569 | 10 | 208 | 0.4 | 1 | 1 | 1 |
| 570 | 10 | 209 | 0.4 | 1 | 1 | 1 |
| 571 | 10 | 210 | 0.4 | 1 | 1 | 1 |
| 572 | 10 | 211 | 0.4 | 1 | 1 | 1 |
| 573 | 10 | 212 | 0.4 | 1 | 1 | 1 |
| 574 | 10 | 213 | 0.4 | 1 | 1 | 1 |
| 575 | 10 | 214 | 0.4 | 1 | 1 | 1 |
| 576 | 10 | 215 | 0.4 | 1 | 1 | 1 |
| 577 | 10 | 216 | 0.4 | 2 | 2 | 3 |
| 578 | 10 | 217 | 1 | 3 | 3 | 4 |
| 579 | 10 | 218 | 3 | 5 | 4 | 6 |
| 580 | 10 | 219 | 4 | 5 | 4 | 6 |
| 581 | 10 | 220 | 7 | 7 | 4 | 6 |
| 582 | 10 | 221 | 7 | 7 | 4 | 6 |
| 583 | 10 | 222 | 9 | 7 | 4 | 6 |
| 584 | 10 | 223 | 9 | 7 | 4 | 6 |
| 585 | 10 | 224 | 9 | 7 | 4 | 6 |
| 586 | 10 | 225 | 9 | 7 | 4 | 6 |
| 587 | 10 | 226 | 9 | 7 | 4 | 6 |
| 588 | 10 | 227 | 9 | 7 | 4 | 6 |
| 589 | 10 | 228 | 7 | 7 | 3 | 4 |
| 590 | 10 | 229 | 6 | 5 | 3 | 4 |
| 591 | 10 | 230 | 6 | 4 | 3 | 4 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 592 | 10 | 231 | 5 | 3 | 3 | 4 |
| 593 | 10 | 232 | 4 | 2 | 2 | 3 |
| 594 | 10 | 233 | 2 | 1 | 2 | 2 |
| 595 | 10 | 234 | 1 | 1 | 2 | 2 |
| 596 | 10 | 235 | 0.4 | 1 | 1 | 1 |
| 597 | 10 | 236 | 0.4 | 1 | 1 | 1 |
| 598 | 10 | 237 | 0.4 | 1 | 1 | 1 |
| 599 | 10 | 238 | 0.4 | 1 | 1 | 1 |
| 600 | 10 | 239 | 0.4 | 1 | 1 | 1 |
| 601 | 10 | 240 | 0.4 | 1 | 1 | 1 |
| 602 | 10 | 241 | 0.4 | 1 | 1 | 1 |
| 603 | 10 | 242 | 0.4 | 1 | 1 | 1 |
| 604 | 10 | 243 | 0.4 | 1 | 1 | 1 |
| 605 | 10 | 244 | 0.4 | 1 | 1 | 1 |
| 606 | 10 | 245 | 0.4 | 1 | 1 | 1 |
| 607 | 10 | 246 | 0.4 | 1 | 1 | 1 |
| 608 | 10 | 247 | 0.4 | 1 | 1 | 1 |
| 609 | 10 | 248 | 0.4 | 1 | 1 | 1 |
| 610 | 10 | 249 | 0.4 | 1 | 1 | 1 |
| 611 | 10 | 250 | 0.4 | 1 | 1 | 1 |
| 612 | 10 | 251 | 0.4 | 1 | 1 | 1 |
| 613 | 10 | 252 | 0.4 | 1 | 1 | 1 |
| 614 | 10 | 253 | 0.4 | 1 | 1 | 1 |
| 615 | 10 | 254 | 0.4 | 1 | 1 | 1 |
| 616 | 10 | 255 | 0.4 | 1 | 1 | 1 |
| 617 | 10 | 256 | 0.4 | 1 | 1 | 1 |
| 618 | 10 | 257 | 0.4 | 1 | 1 | 1 |
| 619 | 10 | 258 | 0.4 | 1 | 1 | 1 |
| 620 | 10 | 259 | 0.4 | 1 | 1 | 1 |
| 621 | 10 | 260 | 0.4 | 1 | 1 | 1 |
| 622 | 10 | 261 | 0.4 | 1 | 1 | 1 |
| 623 | 10 | 262 | 0.4 | 1 | 1 | 1 |
| 624 | 10 | 263 | 0.4 | 1 | 1 | 1 |
| 625 | 10 | 264 | 0.4 | 1 | 1 | 1 |
| 626 | 10 | 265 | 0.4 | 1 | 1 | 1 |
| 627 | 10 | 266 | 0.4 | 1 | 1 | 1 |
| 628 | 10 | 267 | 0.4 | 1 | 1 | 1 |
| 629 | 10 | 268 | 0.4 | 1 | 1 | 1 |
| 630 | 10 | 269 | 0.4 | 1 | 1 | 1 |
| 631 | 10 | 270 | 0.4 | 1 | 1 | 1 |
| 632 | 10 | 271 | 0.4 | 1 | 1 | 1 |
| 633 | 10 | 272 | 0.4 | 1 | 1 | 1 |
| 634 | 10 | 273 | 0.4 | 1 | 1 | 1 |
| 635 | 10 | 274 | 0.4 | 1 | 1 | 1 |
| 636 | 10 | 275 | 0.4 | 1 | 1 | 1 |
| 637 | 10 | 276 | 0.4 | 1 | 1 | 1 |
| 638 | 10 | 277 | 0.4 | 1 | 1 | 1 |
| 639 | 10 | 278 | 0.4 | 1 | 1 | 1 |
| 640 | 10 | 279 | 0.4 | 1 | 1 | 1 |
| 641 | 10 | 280 | 0.4 | 1 | 1 | 1 |
| 642 | 10 | 281 | 0.4 | 1 | 1 | 1 |
| 643 | 10 | 282 | 0.4 | 1 | 1 | 1 |
| 644 | 10 | 283 | 0.4 | 1 | 1 | 1 |
| 645 | 10 | 284 | 0.4 | 1 | 1 | 1 |
| 646 | 10 | 285 | 0.4 | 1 | 1 | 1 |
| 647 | 10 | 286 | 0.4 | 1 | 1 | 1 |
| 648 | 10 | 287 | 0.4 | 1 | 1 | 1 |
| 649 | 10 | 288 | 0.4 | 1 | 1 | 1 |
| 650 | 10 | 289 | 0.4 | 1 | 1 | 1 |
| 651 | 10 | 290 | 0.4 | 1 | 1 | 1 |
| 652 | 10 | 291 | 0.4 | 1 | 1 | 1 |
| 653 | 10 | 292 | 0.4 | 1 | 1 | 1 |
| 654 | 10 | 293 | 0.4 | 1 | 1 | 1 |
| 655 | 10 | 294 | 0.4 | 1 | 1 | 1 |
| 656 | 10 | 295 | 0.4 | 1 | 1 | 1 |
| 657 | 10 | 296 | 0.4 | 1 | 1 | 1 |
| 658 | 10 | 297 | 0.4 | 1 | 1 | 1 |
| 659 | 10 | 298 | 0.4 | 1 | 1 | 1 |
| 660 | 10 | 299 | 0.4 | 1 | 1 | 1 |
| 661 | 10 | 300 | 0.4 | 1 | 1 | 1 |
| 662 | 10 | 301 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 663 | 10 | 302 | 0.4 | 1 | 1 | 1 |
| 664 | 10 | 303 | 0.4 | 1 | 1 | 1 |
| 665 | 10 | 304 | 0.4 | 1 | 1 | 1 |
| 666 | 10 | 305 | 0.4 | 1 | 1 | 1 |
| 667 | 10 | 306 | 0.4 | 1 | 1 | 1 |
| 668 | 10 | 307 | 0.4 | 1 | 1 | 1 |
| 669 | 10 | 308 | 0.4 | 1 | 1 | 1 |
| 670 | 10 | 309 | 0.4 | 1 | 1 | 1 |
| 671 | 10 | 310 | 0.4 | 1 | 1 | 1 |
| 672 | 10 | 311 | 0.4 | 1 | 1 | 1 |
| 673 | 10 | 312 | 0.4 | 1 | 1 | 1 |
| 674 | 10 | 313 | 0.4 | 1 | 1 | 1 |
| 675 | 10 | 314 | 0.4 | 1 | 1 | 1 |
| 676 | 10 | 315 | 0.4 | 1 | 1 | 1 |
| 677 | 10 | 316 | 0.4 | 1 | 1 | 1 |
| 678 | 10 | 317 | 0.4 | 1 | 1 | 1 |
| 679 | 10 | 318 | 0.4 | 1 | 1 | 1 |
| 680 | 10 | 319 | 0.4 | 1 | 1 | 1 |
| 681 | 10 | 320 | 0.4 | 1 | 1 | 1 |
| 682 | 10 | 321 | 0.4 | 1 | 1 | 1 |
| 683 | 10 | 322 | 0.4 | 1 | 1 | 1 |
| 684 | 10 | 323 | 0.4 | 1 | 1 | 1 |
| 685 | 10 | 324 | 0.4 | 1 | 1 | 1 |
| 686 | 10 | 325 | 0.4 | 1 | 1 | 1 |
| 687 | 10 | 326 | 0.4 | 1 | 1 | 1 |
| 688 | 10 | 327 | 0.4 | 1 | 1 | 1 |
| 689 | 10 | 328 | 0.4 | 1 | 1 | 1 |
| 690 | 10 | 329 | 0.4 | 1 | 1 | 1 |
| 691 | 10 | 330 | 0.4 | 1 | 1 | 1 |
| 692 | 10 | 331 | 0.4 | 1 | 1 | 1 |
| 693 | 10 | 332 | 0.4 | 1 | 1 | 1 |
| 694 | 10 | 333 | 0.4 | 1 | 1 | 1 |
| 695 | 10 | 334 | 0.4 | 1 | 1 | 1 |
| 696 | 10 | 335 | 0.4 | 1 | 1 | 1 |
| 697 | 10 | 336 | 0.4 | 1 | 1 | 1 |
| 698 | 10 | 337 | 0.4 | 1 | 1 | 1 |
| 699 | 10 | 338 | 0.4 | 1 | 1 | 1 |
| 700 | 10 | 339 | 0.4 | 1 | 1 | 1 |
| 701 | 10 | 340 | 0.4 | 1 | 1 | 1 |
| 702 | 10 | 341 | 0.4 | 1 | 1 | 1 |
| 703 | 10 | 342 | 0.4 | 1 | 1 | 1 |
| 704 | 10 | 343 | 0.4 | 1 | 1 | 1 |
| 705 | 10 | 344 | 0.4 | 1 | 1 | 1 |
| 706 | 10 | 345 | 0.4 | 1 | 1 | 1 |
| 707 | 10 | 346 | 0.4 | 1 | 1 | 1 |
| 708 | 10 | 347 | 0.4 | 1 | 1 | 1 |
| 709 | 10 | 348 | 0.4 | 1 | 1 | 1 |
| 710 | 10 | 349 | 0.4 | 1 | 1 | 1 |
| 711 | 10 | 350 | 0.4 | 1 | 1 | 1 |
| 712 | 10 | 351 | 0.4 | 1 | 1 | 1 |
| 713 | 10 | 352 | 0.4 | 1 | 1 | 1 |
| 714 | 10 | 353 | 0.4 | 1 | 1 | 1 |
| 715 | 10 | 354 | 0.4 | 1 | 1 | 1 |
| 716 | 10 | 355 | 0.4 | 1 | 1 | 1 |
| 717 | 10 | 356 | 0.4 | 1 | 1 | 1 |
| 718 | 10 | 357 | 0.4 | 1 | 1 | 1 |
| 719 | 10 | 358 | 0.4 | 1 | 1 | 1 |
| 720 | 10 | 359 | 0.4 | 1 | 1 | 1 |
| 721 | 20 | 0 | 0.4 | 1 | 1 | 1 |
| 722 | 20 | 1 | 0.4 | 1 | 1 | 1 |
| 723 | 20 | 2 | 0.4 | 1 | 1 | 1 |
| 724 | 20 | 3 | 0.4 | 1 | 1 | 1 |
| 725 | 20 | 4 | 0.4 | 1 | 1 | 1 |
| 726 | 20 | 5 | 0.4 | 1 | 1 | 1 |
| 727 | 20 | 6 | 0.4 | 3 | 1 | 1 |
| 728 | 20 | 7 | 0.4 | 5 | 1 | 1 |
| 729 | 20 | 8 | 0.4 | 7 | 1 | 1 |
| 730 | 20 | 9 | 0.4 | 10 | 1 | 1 |
| 731 | 20 | 10 | 0.5 | 10 | 1 | 1 |
| 732 | 20 | 11 | 0.7 | 10 | 1 | 1 |
| 733 | 20 | 12 | 1 | 10 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 734 | 20 | 13 | 2 | 10 | 1 | 1 |
| 735 | 20 | 14 | 5 | 7 | 1 | 1 |
| 736 | 20 | 15 | 7 | 7 | 1 | 1 |
| 737 | 20 | 16 | 10 | 9 | 1 | 1 |
| 738 | 20 | 17 | 15 | 10 | 1 | 1 |
| 739 | 20 | 18 | 15 | 10 | 1 | 1 |
| 740 | 20 | 19 | 15 | 10 | 1 | 1 |
| 741 | 20 | 20 | 15 | 10 | 1 | 1 |
| 742 | 20 | 21 | 15 | 10 | 1 | 1 |
| 743 | 20 | 22 | 15 | 10 | 1 | 1 |
| 744 | 20 | 23 | 15 | 10 | 1 | 1 |
| 745 | 20 | 24 | 15 | 10 | 1 | 1 |
| 746 | 20 | 25 | 15 | 10 | 1 | 1 |
| 747 | 20 | 26 | 15 | 10 | 1 | 1 |
| 748 | 20 | 27 | 15 | 10 | 1 | 1 |
| 749 | 20 | 28 | 15 | 10 | 1 | 1 |
| 750 | 20 | 29 | 15 | 10 | 1 | 1 |
| 751 | 20 | 30 | 15 | 10 | 1 | 1 |
| 752 | 20 | 31 | 15 | 10 | 1 | 1 |
| 753 | 20 | 32 | 15 | 10 | 1 | 1 |
| 754 | 20 | 33 | 15 | 10 | 1 | 1 |
| 755 | 20 | 34 | 15 | 10 | 1 | 1 |
| 756 | 20 | 35 | 10 | 10 | 1 | 1 |
| 757 | 20 | 36 | 7 | 10 | 1 | 1 |
| 758 | 20 | 37 | 5 | 7 | 1 | 1 |
| 759 | 20 | 38 | 2 | 3 | 1 | 1 |
| 760 | 20 | 39 | 1 | 1 | 1 | 1 |
| 761 | 20 | 40 | 0.4 | 1 | 1 | 1 |
| 762 | 20 | 41 | 0.4 | 1 | 1 | 1 |
| 763 | 20 | 42 | 0.4 | 1 | 1 | 1 |
| 764 | 20 | 43 | 0.4 | 1 | 1 | 1 |
| 765 | 20 | 44 | 0.4 | 1 | 1 | 1 |
| 766 | 20 | 45 | 0.4 | 1 | 1 | 1 |
| 767 | 20 | 46 | 0.4 | 1 | 1 | 1 |
| 768 | 20 | 47 | 0.4 | 1 | 1 | 1 |
| 769 | 20 | 48 | 0.4 | 1 | 1 | 1 |
| 770 | 20 | 49 | 0.4 | 1 | 1 | 1 |
| 771 | 20 | 50 | 0.4 | 1 | 1 | 1 |
| 772 | 20 | 51 | 0.4 | 1 | 1 | 1 |
| 773 | 20 | 52 | 0.4 | 1 | 1 | 1 |
| 774 | 20 | 53 | 0.4 | 1 | 1 | 1 |
| 775 | 20 | 54 | 0.4 | 1 | 1 | 1 |
| 776 | 20 | 55 | 0.4 | 1 | 1 | 1 |
| 777 | 20 | 56 | 0.4 | 1 | 1 | 1 |
| 778 | 20 | 57 | 0.4 | 1 | 1 | 1 |
| 779 | 20 | 58 | 0.4 | 1 | 1 | 1 |
| 780 | 20 | 59 | 0.4 | 1 | 1 | 1 |
| 781 | 20 | 60 | 0.4 | 1 | 1 | 1 |
| 782 | 20 | 61 | 0.4 | 1 | 1 | 1 |
| 783 | 20 | 62 | 0.4 | 1 | 1 | 1 |
| 784 | 20 | 63 | 0.4 | 1 | 1 | 1 |
| 785 | 20 | 64 | 0.4 | 1 | 1 | 1 |
| 786 | 20 | 65 | 0.4 | 1 | 1 | 1 |
| 787 | 20 | 66 | 0.4 | 1 | 1 | 1 |
| 788 | 20 | 67 | 0.4 | 1 | 1 | 1 |
| 789 | 20 | 68 | 0.4 | 1 | 1 | 1 |
| 790 | 20 | 69 | 0.4 | 1 | 1 | 1 |
| 791 | 20 | 70 | 0.4 | 1 | 1 | 1 |
| 792 | 20 | 71 | 0.4 | 1 | 1 | 1 |
| 793 | 20 | 72 | 0.4 | 1 | 1 | 1 |
| 794 | 20 | 73 | 0.4 | 1 | 1 | 1 |
| 795 | 20 | 74 | 0.4 | 1 | 1 | 1 |
| 796 | 20 | 75 | 0.4 | 1 | 1 | 1 |
| 797 | 20 | 76 | 0.4 | 1 | 1 | 1 |
| 798 | 20 | 77 | 0.4 | 1 | 1 | 1 |
| 799 | 20 | 78 | 0.4 | 1 | 1 | 1 |
| 800 | 20 | 79 | 0.4 | 1 | 1 | 1 |
| 801 | 20 | 80 | 0.4 | 1 | 1 | 1 |
| 802 | 20 | 81 | 0.4 | 1 | 1 | 1 |
| 803 | 20 | 82 | 0.4 | 1 | 1 | 1 |
| 804 | 20 | 83 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 805 | 20 | 84 | 0.4 | 1 | 1 | 1 |
| 806 | 20 | 85 | 0.4 | 1 | 1 | 1 |
| 807 | 20 | 86 | 0.4 | 1 | 1 | 1 |
| 808 | 20 | 87 | 0.4 | 1 | 1 | 1 |
| 809 | 20 | 88 | 0.4 | 1 | 1 | 1 |
| 810 | 20 | 89 | 0.4 | 1 | 1 | 1 |
| 811 | 20 | 90 | 0.4 | 1 | 1 | 1 |
| 812 | 20 | 91 | 0.4 | 1 | 1 | 1 |
| 813 | 20 | 92 | 0.4 | 1 | 1 | 1 |
| 814 | 20 | 93 | 0.4 | 1 | 1 | 1 |
| 815 | 20 | 94 | 0.4 | 1 | 1 | 1 |
| 816 | 20 | 95 | 0.4 | 1 | 1 | 1 |
| 817 | 20 | 96 | 0.4 | 1 | 1 | 1 |
| 818 | 20 | 97 | 0.4 | 1 | 1 | 1 |
| 819 | 20 | 98 | 0.4 | 1 | 1 | 1 |
| 820 | 20 | 99 | 0.4 | 1 | 1 | 1 |
| 821 | 20 | 100 | 0.4 | 1 | 3 | 2 |
| 822 | 20 | 101 | 1 | 3 | 3 | 2 |
| 823 | 20 | 102 | 1.3 | 5 | 3 | 2 |
| 824 | 20 | 103 | 1.7 | 5 | 4 | 2 |
| 825 | 20 | 104 | 2 | 5 | 4 | 2 |
| 826 | 20 | 105 | 2.5 | 5 | 4 | 2 |
| 827 | 20 | 106 | 2.5 | 9 | 4 | 2 |
| 828 | 20 | 107 | 2.5 | 9 | 6 | 2 |
| 829 | 20 | 108 | 3 | 9 | 6 | 2 |
| 830 | 20 | 109 | 3 | 9 | 6 | 2 |
| 831 | 20 | 110 | 3 | 10 | 6 | 3 |
| 832 | 20 | 111 | 3 | 10 | 6 | 3 |
| 833 | 20 | 112 | 5 | 10 | 6 | 3 |
| 834 | 20 | 113 | 5 | 10 | 6 | 3 |
| 835 | 20 | 114 | 3 | 10 | 6 | 3 |
| 836 | 20 | 115 | 3 | 10 | 6 | 3 |
| 837 | 20 | 116 | 3 | 10 | 6 | 3 |
| 838 | 20 | 117 | 3 | 10 | 6 | 3 |
| 839 | 20 | 118 | 3 | 9 | 6 | 2 |
| 840 | 20 | 119 | 3 | 9 | 6 | 2 |
| 841 | 20 | 120 | 3 | 9 | 6 | 2 |
| 842 | 20 | 121 | 2 | 7 | 5 | 2 |
| 843 | 20 | 122 | 2 | 5 | 4 | 2 |
| 844 | 20 | 123 | 2 | 4 | 3 | 2 |
| 845 | 20 | 124 | 0.4 | 4 | 3 | 2 |
| 846 | 20 | 125 | 0.4 | 3 | 3 | 2 |
| 847 | 20 | 126 | 0.4 | 2 | 3 | 2 |
| 848 | 20 | 127 | 0.4 | 1 | 1 | 1 |
| 849 | 20 | 128 | 0.4 | 1 | 1 | 1 |
| 850 | 20 | 129 | 0.4 | 1 | 1 | 1 |
| 851 | 20 | 130 | 0.4 | 1 | 1 | 1 |
| 852 | 20 | 131 | 0.4 | 1 | 1 | 1 |
| 853 | 20 | 132 | 0.4 | 1 | 1 | 1 |
| 854 | 20 | 133 | 0.4 | 1 | 1 | 1 |
| 855 | 20 | 134 | 0.4 | 1 | 1 | 1 |
| 856 | 20 | 135 | 0.4 | 1 | 1 | 1 |
| 857 | 20 | 136 | 0.4 | 1 | 1 | 1 |
| 858 | 20 | 137 | 0.4 | 1 | 1 | 1 |
| 859 | 20 | 138 | 0.4 | 1 | 1 | 1 |
| 860 | 20 | 139 | 0.4 | 1 | 1 | 1 |
| 861 | 20 | 140 | 0.4 | 1 | 1 | 1 |
| 862 | 20 | 141 | 0.4 | 1 | 1 | 1 |
| 863 | 20 | 142 | 0.4 | 1 | 1 | 1 |
| 864 | 20 | 143 | 0.4 | 1 | 1 | 1 |
| 865 | 20 | 144 | 0.4 | 1 | 1 | 1 |
| 866 | 20 | 145 | 0.4 | 1 | 1 | 1 |
| 867 | 20 | 146 | 0.4 | 1 | 1 | 1 |
| 868 | 20 | 147 | 0.4 | 1 | 1 | 1 |
| 869 | 20 | 148 | 0.4 | 1 | 1 | 1 |
| 870 | 20 | 149 | 0.4 | 1 | 1 | 1 |
| 871 | 20 | 150 | 0.4 | 1 | 1 | 1 |
| 872 | 20 | 151 | 0.4 | 1 | 1 | 1 |
| 873 | 20 | 152 | 0.4 | 1 | 1 | 1 |
| 874 | 20 | 153 | 0.4 | 1 | 1 | 1 |
| 875 | 20 | 154 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 876 | 20 | 155 | 0.4 | 1 | 1 | 1 |
| 877 | 20 | 156 | 0.4 | 1 | 1 | 1 |
| 878 | 20 | 157 | 0.4 | 1 | 1 | 1 |
| 879 | 20 | 158 | 0.4 | 1 | 1 | 1 |
| 880 | 20 | 159 | 0.4 | 1 | 1 | 1 |
| 881 | 20 | 160 | 0.4 | 1 | 1 | 1 |
| 882 | 20 | 161 | 0.4 | 1 | 1 | 1 |
| 883 | 20 | 162 | 0.4 | 1 | 1 | 1 |
| 884 | 20 | 163 | 0.4 | 1 | 1 | 1 |
| 885 | 20 | 164 | 0.4 | 1 | 1 | 1 |
| 886 | 20 | 165 | 0.4 | 1 | 1 | 1 |
| 887 | 20 | 166 | 0.4 | 1 | 1 | 1 |
| 888 | 20 | 167 | 0.4 | 1 | 1 | 1 |
| 889 | 20 | 168 | 0.4 | 1 | 1 | 1 |
| 890 | 20 | 169 | 0.4 | 1 | 1 | 1 |
| 891 | 20 | 170 | 0.4 | 1 | 1 | 1 |
| 892 | 20 | 171 | 0.4 | 1 | 1 | 1 |
| 893 | 20 | 172 | 0.4 | 1 | 1 | 1 |
| 894 | 20 | 173 | 0.4 | 1 | 1 | 1 |
| 895 | 20 | 174 | 0.4 | 1 | 1 | 1 |
| 896 | 20 | 175 | 0.4 | 1 | 1 | 1 |
| 897 | 20 | 176 | 0.4 | 1 | 1 | 1 |
| 898 | 20 | 177 | 0.4 | 1 | 1 | 1 |
| 899 | 20 | 178 | 0.4 | 1 | 1 | 1 |
| 900 | 20 | 179 | 0.4 | 1 | 1 | 1 |
| 901 | 20 | 180 | 0.4 | 1 | 1 | 1 |
| 902 | 20 | 181 | 0.4 | 1 | 1 | 1 |
| 903 | 20 | 182 | 0.4 | 1 | 1 | 1 |
| 904 | 20 | 183 | 0.4 | 1 | 1 | 1 |
| 905 | 20 | 184 | 0.4 | 1 | 1 | 1 |
| 906 | 20 | 185 | 0.4 | 1 | 1 | 1 |
| 907 | 20 | 186 | 0.4 | 1 | 1 | 1 |
| 908 | 20 | 187 | 0.4 | 1 | 1 | 1 |
| 909 | 20 | 188 | 0.4 | 1 | 1 | 1 |
| 910 | 20 | 189 | 0.4 | 1 | 1 | 1 |
| 911 | 20 | 190 | 0.4 | 1 | 1 | 1 |
| 912 | 20 | 191 | 0.4 | 1 | 1 | 1 |
| 913 | 20 | 192 | 0.4 | 1 | 1 | 1 |
| 914 | 20 | 193 | 0.4 | 1 | 1 | 1 |
| 915 | 20 | 194 | 0.4 | 1 | 1 | 1 |
| 916 | 20 | 195 | 0.4 | 1 | 1 | 1 |
| 917 | 20 | 196 | 0.4 | 1 | 1 | 1 |
| 918 | 20 | 197 | 0.4 | 1 | 1 | 1 |
| 919 | 20 | 198 | 0.4 | 1 | 1 | 1 |
| 920 | 20 | 199 | 0.4 | 1 | 1 | 1 |
| 921 | 20 | 200 | 0.4 | 1 | 1 | 1 |
| 922 | 20 | 201 | 0.4 | 1 | 1 | 1 |
| 923 | 20 | 202 | 0.4 | 1 | 1 | 1 |
| 924 | 20 | 203 | 0.4 | 1 | 1 | 1 |
| 925 | 20 | 204 | 0.4 | 1 | 1 | 1 |
| 926 | 20 | 205 | 0.4 | 1 | 1 | 1 |
| 927 | 20 | 206 | 0.4 | 1 | 1 | 1 |
| 928 | 20 | 207 | 0.4 | 1 | 1 | 1 |
| 929 | 20 | 208 | 0.4 | 1 | 1 | 1 |
| 930 | 20 | 209 | 0.4 | 1 | 1 | 1 |
| 931 | 20 | 210 | 0.4 | 1 | 1 | 1 |
| 932 | 20 | 211 | 0.4 | 1 | 1 | 1 |
| 933 | 20 | 212 | 0.4 | 1 | 1 | 1 |
| 934 | 20 | 213 | 0.4 | 1 | 1 | 1 |
| 935 | 20 | 214 | 0.4 | 1 | 1 | 1 |
| 936 | 20 | 215 | 0.4 | 1 | 1 | 1 |
| 937 | 20 | 216 | 0.4 | 2 | 2 | 3 |
| 938 | 20 | 217 | 1 | 3 | 3 | 4 |
| 939 | 20 | 218 | 3 | 5 | 4 | 6 |
| 940 | 20 | 219 | 4 | 5 | 4 | 6 |
| 941 | 20 | 220 | 7 | 7 | 4 | 6 |
| 942 | 20 | 221 | 7 | 7 | 4 | 6 |
| 943 | 20 | 222 | 9 | 7 | 4 | 6 |
| 944 | 20 | 223 | 9 | 7 | 4 | 6 |
| 945 | 20 | 224 | 9 | 7 | 4 | 6 |
| 946 | 20 | 225 | 9 | 7 | 4 | 6 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 947 | 20 | 226 | 9 | 7 | 4 | 6 |
| 948 | 20 | 227 | 9 | 7 | 4 | 6 |
| 949 | 20 | 228 | 7 | 7 | 3 | 4 |
| 950 | 20 | 229 | 6 | 5 | 3 | 4 |
| 951 | 20 | 230 | 6 | 4 | 3 | 4 |
| 952 | 20 | 231 | 5 | 3 | 3 | 4 |
| 953 | 20 | 232 | 4 | 2 | 2 | 3 |
| 954 | 20 | 233 | 2 | 1 | 2 | 2 |
| 955 | 20 | 234 | 1 | 1 | 2 | 2 |
| 956 | 20 | 235 | 0.4 | 1 | 1 | 1 |
| 957 | 20 | 236 | 0.4 | 1 | 1 | 1 |
| 958 | 20 | 237 | 0.4 | 1 | 1 | 1 |
| 959 | 20 | 238 | 0.4 | 1 | 1 | 1 |
| 960 | 20 | 239 | 0.4 | 1 | 1 | 1 |
| 961 | 20 | 240 | 0.4 | 1 | 1 | 1 |
| 962 | 20 | 241 | 0.4 | 1 | 1 | 1 |
| 963 | 20 | 242 | 0.4 | 1 | 1 | 1 |
| 964 | 20 | 243 | 0.4 | 1 | 1 | 1 |
| 965 | 20 | 244 | 0.4 | 1 | 1 | 1 |
| 966 | 20 | 245 | 0.4 | 1 | 1 | 1 |
| 967 | 20 | 246 | 0.4 | 1 | 1 | 1 |
| 968 | 20 | 247 | 0.4 | 1 | 1 | 1 |
| 969 | 20 | 248 | 0.4 | 1 | 1 | 1 |
| 970 | 20 | 249 | 0.4 | 1 | 1 | 1 |
| 971 | 20 | 250 | 0.4 | 1 | 1 | 1 |
| 972 | 20 | 251 | 0.4 | 1 | 1 | 1 |
| 973 | 20 | 252 | 0.4 | 1 | 1 | 1 |
| 974 | 20 | 253 | 0.4 | 1 | 1 | 1 |
| 975 | 20 | 254 | 0.4 | 1 | 1 | 1 |
| 976 | 20 | 255 | 0.4 | 1 | 1 | 1 |
| 977 | 20 | 256 | 0.4 | 1 | 1 | 1 |
| 978 | 20 | 257 | 0.4 | 1 | 1 | 1 |
| 979 | 20 | 258 | 0.4 | 1 | 1 | 1 |
| 980 | 20 | 259 | 0.4 | 1 | 1 | 1 |
| 981 | 20 | 260 | 0.4 | 1 | 1 | 1 |
| 982 | 20 | 261 | 0.4 | 1 | 1 | 1 |
| 983 | 20 | 262 | 0.4 | 1 | 1 | 1 |
| 984 | 20 | 263 | 0.4 | 1 | 1 | 1 |
| 985 | 20 | 264 | 0.4 | 1 | 1 | 1 |
| 986 | 20 | 265 | 0.4 | 1 | 1 | 1 |
| 987 | 20 | 266 | 0.4 | 1 | 1 | 1 |
| 988 | 20 | 267 | 0.4 | 1 | 1 | 1 |
| 989 | 20 | 268 | 0.4 | 1 | 1 | 1 |
| 990 | 20 | 269 | 0.4 | 1 | 1 | 1 |
| 991 | 20 | 270 | 0.4 | 1 | 1 | 1 |
| 992 | 20 | 271 | 0.4 | 1 | 1 | 1 |
| 993 | 20 | 272 | 0.4 | 1 | 1 | 1 |
| 994 | 20 | 273 | 0.4 | 1 | 1 | 1 |
| 995 | 20 | 274 | 0.4 | 1 | 1 | 1 |
| 996 | 20 | 275 | 0.4 | 1 | 1 | 1 |
| 997 | 20 | 276 | 0.4 | 1 | 1 | 1 |
| 998 | 20 | 277 | 0.4 | 1 | 1 | 1 |
| 999 | 20 | 278 | 0.4 | 1 | 1 | 1 |
| 1000 | 20 | 279 | 0.4 | 1 | 1 | 1 |
| 1001 | 20 | 280 | 0.4 | 1 | 1 | 1 |
| 1002 | 20 | 281 | 0.4 | 1 | 1 | 1 |
| 1003 | 20 | 282 | 0.4 | 1 | 1 | 1 |
| 1004 | 20 | 283 | 0.4 | 1 | 1 | 1 |
| 1005 | 20 | 284 | 0.4 | 1 | 1 | 1 |
| 1006 | 20 | 285 | 0.4 | 1 | 1 | 1 |
| 1007 | 20 | 286 | 0.4 | 1 | 1 | 1 |
| 1008 | 20 | 287 | 0.4 | 1 | 1 | 1 |
| 1009 | 20 | 288 | 0.4 | 1 | 1 | 1 |
| 1010 | 20 | 289 | 0.4 | 1 | 1 | 1 |
| 1011 | 20 | 290 | 0.4 | 1 | 1 | 1 |
| 1012 | 20 | 291 | 0.4 | 1 | 1 | 1 |
| 1013 | 20 | 292 | 0.4 | 1 | 1 | 1 |
| 1014 | 20 | 293 | 0.4 | 1 | 1 | 1 |
| 1015 | 20 | 294 | 0.4 | 1 | 1 | 1 |
| 1016 | 20 | 295 | 0.4 | 1 | 1 | 1 |
| 1017 | 20 | 296 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1018 | 20 | 297 | 0.4 | 1 | 1 | 1 |
| 1019 | 20 | 298 | 0.4 | 1 | 1 | 1 |
| 1020 | 20 | 299 | 0.4 | 1 | 1 | 1 |
| 1021 | 20 | 300 | 0.4 | 1 | 1 | 1 |
| 1022 | 20 | 301 | 0.4 | 1 | 1 | 1 |
| 1023 | 20 | 302 | 0.4 | 1 | 1 | 1 |
| 1024 | 20 | 303 | 0.4 | 1 | 1 | 1 |
| 1025 | 20 | 304 | 0.4 | 1 | 1 | 1 |
| 1026 | 20 | 305 | 0.4 | 1 | 1 | 1 |
| 1027 | 20 | 306 | 0.4 | 1 | 1 | 1 |
| 1028 | 20 | 307 | 0.4 | 1 | 1 | 1 |
| 1029 | 20 | 308 | 0.4 | 1 | 1 | 1 |
| 1030 | 20 | 309 | 0.4 | 1 | 1 | 1 |
| 1031 | 20 | 310 | 0.4 | 1 | 1 | 1 |
| 1032 | 20 | 311 | 0.4 | 1 | 1 | 1 |
| 1033 | 20 | 312 | 0.4 | 1 | 1 | 1 |
| 1034 | 20 | 313 | 0.4 | 1 | 1 | 1 |
| 1035 | 20 | 314 | 0.4 | 1 | 1 | 1 |
| 1036 | 20 | 315 | 0.4 | 1 | 1 | 1 |
| 1037 | 20 | 316 | 0.4 | 1 | 1 | 1 |
| 1038 | 20 | 317 | 0.4 | 1 | 1 | 1 |
| 1039 | 20 | 318 | 0.4 | 1 | 1 | 1 |
| 1040 | 20 | 319 | 0.4 | 1 | 1 | 1 |
| 1041 | 20 | 320 | 0.4 | 1 | 1 | 1 |
| 1042 | 20 | 321 | 0.4 | 1 | 1 | 1 |
| 1043 | 20 | 322 | 0.4 | 1 | 1 | 1 |
| 1044 | 20 | 323 | 0.4 | 1 | 1 | 1 |
| 1045 | 20 | 324 | 0.4 | 1 | 1 | 1 |
| 1046 | 20 | 325 | 0.4 | 1 | 1 | 1 |
| 1047 | 20 | 326 | 0.4 | 1 | 1 | 1 |
| 1048 | 20 | 327 | 0.4 | 1 | 1 | 1 |
| 1049 | 20 | 328 | 0.4 | 1 | 1 | 1 |
| 1050 | 20 | 329 | 0.4 | 1 | 1 | 1 |
| 1051 | 20 | 330 | 0.4 | 1 | 1 | 1 |
| 1052 | 20 | 331 | 0.4 | 1 | 1 | 1 |
| 1053 | 20 | 332 | 0.4 | 1 | 1 | 1 |
| 1054 | 20 | 333 | 0.4 | 1 | 1 | 1 |
| 1055 | 20 | 334 | 0.4 | 1 | 1 | 1 |
| 1056 | 20 | 335 | 0.4 | 1 | 1 | 1 |
| 1057 | 20 | 336 | 0.4 | 1 | 1 | 1 |
| 1058 | 20 | 337 | 0.4 | 1 | 1 | 1 |
| 1059 | 20 | 338 | 0.4 | 1 | 1 | 1 |
| 1060 | 20 | 339 | 0.4 | 1 | 1 | 1 |
| 1061 | 20 | 340 | 0.4 | 1 | 1 | 1 |
| 1062 | 20 | 341 | 0.4 | 1 | 1 | 1 |
| 1063 | 20 | 342 | 0.4 | 1 | 1 | 1 |
| 1064 | 20 | 343 | 0.4 | 1 | 1 | 1 |
| 1065 | 20 | 344 | 0.4 | 1 | 1 | 1 |
| 1066 | 20 | 345 | 0.4 | 1 | 1 | 1 |
| 1067 | 20 | 346 | 0.4 | 1 | 1 | 1 |
| 1068 | 20 | 347 | 0.4 | 1 | 1 | 1 |
| 1069 | 20 | 348 | 0.4 | 1 | 1 | 1 |
| 1070 | 20 | 349 | 0.4 | 1 | 1 | 1 |
| 1071 | 20 | 350 | 0.4 | 1 | 1 | 1 |
| 1072 | 20 | 351 | 0.4 | 1 | 1 | 1 |
| 1073 | 20 | 352 | 0.4 | 1 | 1 | 1 |
| 1074 | 20 | 353 | 0.4 | 1 | 1 | 1 |
| 1075 | 20 | 354 | 0.4 | 1 | 1 | 1 |
| 1076 | 20 | 355 | 0.4 | 1 | 1 | 1 |
| 1077 | 20 | 356 | 0.4 | 1 | 1 | 1 |
| 1078 | 20 | 357 | 0.4 | 1 | 1 | 1 |
| 1079 | 20 | 358 | 0.4 | 1 | 1 | 1 |
| 1080 | 20 | 359 | 0.4 | 1 | 1 | 1 |
| 1081 | 30 | 0 | 0.4 | 1 | 1 | 1 |
| 1082 | 30 | 1 | 0.4 | 1 | 1 | 1 |
| 1083 | 30 | 2 | 0.4 | 1 | 1 | 1 |
| 1084 | 30 | 3 | 0.4 | 1 | 1 | 1 |
| 1085 | 30 | 4 | 0.4 | 1 | 1 | 1 |
| 1086 | 30 | 5 | 0.4 | 1 | 1 | 1 |
| 1087 | 30 | 6 | 0.4 | 3 | 1 | 1 |
| 1088 | 30 | 7 | 0.4 | 5 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1089 | 30 | 8 | 0.4 | 7 | 1 | 1 |
| 1090 | 30 | 9 | 0.4 | 10 | 1 | 1 |
| 1091 | 30 | 10 | 0.5 | 10 | 1 | 1 |
| 1092 | 30 | 11 | 0.7 | 10 | 1 | 1 |
| 1093 | 30 | 12 | 1 | 10 | 1 | 1 |
| 1094 | 30 | 13 | 2 | 10 | 1 | 1 |
| 1095 | 30 | 14 | 5 | 7 | 1 | 1 |
| 1096 | 30 | 15 | 7 | 7 | 1 | 1 |
| 1097 | 30 | 16 | 10 | 9 | 1 | 1 |
| 1098 | 30 | 17 | 15 | 10 | 1 | 1 |
| 1099 | 30 | 18 | 15 | 10 | 1 | 1 |
| 1100 | 30 | 19 | 15 | 10 | 1 | 1 |
| 1101 | 30 | 20 | 15 | 10 | 1 | 1 |
| 1102 | 30 | 21 | 15 | 10 | 1 | 1 |
| 1103 | 30 | 22 | 15 | 10 | 1 | 1 |
| 1104 | 30 | 23 | 15 | 10 | 1 | 1 |
| 1105 | 30 | 24 | 15 | 10 | 1 | 1 |
| 1106 | 30 | 25 | 15 | 10 | 1 | 1 |
| 1107 | 30 | 26 | 15 | 10 | 1 | 1 |
| 1108 | 30 | 27 | 15 | 10 | 1 | 1 |
| 1109 | 30 | 28 | 15 | 10 | 1 | 1 |
| 1110 | 30 | 29 | 15 | 10 | 1 | 1 |
| 1111 | 30 | 30 | 15 | 10 | 1 | 1 |
| 1112 | 30 | 31 | 15 | 10 | 1 | 1 |
| 1113 | 30 | 32 | 15 | 10 | 1 | 1 |
| 1114 | 30 | 33 | 15 | 10 | 1 | 1 |
| 1115 | 30 | 34 | 15 | 10 | 1 | 1 |
| 1116 | 30 | 35 | 10 | 10 | 1 | 1 |
| 1117 | 30 | 36 | 7 | 10 | 1 | 1 |
| 1118 | 30 | 37 | 5 | 7 | 1 | 1 |
| 1119 | 30 | 38 | 2 | 3 | 1 | 1 |
| 1120 | 30 | 39 | 1 | 1 | 1 | 1 |
| 1121 | 30 | 40 | 0.4 | 1 | 1 | 1 |
| 1122 | 30 | 41 | 0.4 | 1 | 1 | 1 |
| 1123 | 30 | 42 | 0.4 | 1 | 1 | 1 |
| 1124 | 30 | 43 | 0.4 | 1 | 1 | 1 |
| 1125 | 30 | 44 | 0.4 | 1 | 1 | 1 |
| 1126 | 30 | 45 | 0.4 | 1 | 1 | 1 |
| 1127 | 30 | 46 | 0.4 | 1 | 1 | 1 |
| 1128 | 30 | 47 | 0.4 | 1 | 1 | 1 |
| 1129 | 30 | 48 | 0.4 | 1 | 1 | 1 |
| 1130 | 30 | 49 | 0.4 | 1 | 1 | 1 |
| 1131 | 30 | 50 | 0.4 | 1 | 1 | 1 |
| 1132 | 30 | 51 | 0.4 | 1 | 1 | 1 |
| 1133 | 30 | 52 | 0.4 | 1 | 1 | 1 |
| 1134 | 30 | 53 | 0.4 | 1 | 1 | 1 |
| 1135 | 30 | 54 | 0.4 | 1 | 1 | 1 |
| 1136 | 30 | 55 | 0.4 | 1 | 1 | 1 |
| 1137 | 30 | 56 | 0.4 | 1 | 1 | 1 |
| 1138 | 30 | 57 | 0.4 | 1 | 1 | 1 |
| 1139 | 30 | 58 | 0.4 | 1 | 1 | 1 |
| 1140 | 30 | 59 | 0.4 | 1 | 1 | 1 |
| 1141 | 30 | 60 | 0.4 | 1 | 1 | 1 |
| 1142 | 30 | 61 | 0.4 | 1 | 1 | 1 |
| 1143 | 30 | 62 | 0.4 | 1 | 1 | 1 |
| 1144 | 30 | 63 | 0.4 | 1 | 1 | 1 |
| 1145 | 30 | 64 | 0.4 | 1 | 1 | 1 |
| 1146 | 30 | 65 | 0.4 | 1 | 1 | 1 |
| 1147 | 30 | 66 | 0.4 | 1 | 1 | 1 |
| 1148 | 30 | 67 | 0.4 | 1 | 1 | 1 |
| 1149 | 30 | 68 | 0.4 | 1 | 1 | 1 |
| 1150 | 30 | 69 | 0.4 | 1 | 1 | 1 |
| 1151 | 30 | 70 | 0.4 | 1 | 1 | 1 |
| 1152 | 30 | 71 | 0.4 | 1 | 1 | 1 |
| 1153 | 30 | 72 | 0.4 | 1 | 1 | 1 |
| 1154 | 30 | 73 | 0.4 | 1 | 1 | 1 |
| 1155 | 30 | 74 | 0.4 | 1 | 1 | 1 |
| 1156 | 30 | 75 | 0.4 | 1 | 1 | 1 |
| 1157 | 30 | 76 | 0.4 | 1 | 1 | 1 |
| 1158 | 30 | 77 | 0.4 | 1 | 1 | 1 |
| 1159 | 30 | 78 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1160 | 30 | 79 | 0.4 | 1 | 1 | 1 |
| 1161 | 30 | 80 | 0.4 | 1 | 1 | 1 |
| 1162 | 30 | 81 | 0.4 | 1 | 1 | 1 |
| 1163 | 30 | 82 | 0.4 | 1 | 1 | 1 |
| 1164 | 30 | 83 | 0.4 | 1 | 1 | 1 |
| 1165 | 30 | 84 | 0.4 | 1 | 1 | 1 |
| 1166 | 30 | 85 | 0.4 | 1 | 1 | 1 |
| 1167 | 30 | 86 | 0.4 | 1 | 1 | 1 |
| 1168 | 30 | 87 | 0.4 | 1 | 1 | 1 |
| 1169 | 30 | 88 | 0.4 | 1 | 1 | 1 |
| 1170 | 30 | 89 | 0.4 | 1 | 1 | 1 |
| 1171 | 30 | 90 | 0.4 | 1 | 1 | 1 |
| 1172 | 30 | 91 | 0.4 | 1 | 1 | 1 |
| 1173 | 30 | 92 | 0.4 | 1 | 1 | 1 |
| 1174 | 30 | 93 | 0.4 | 1 | 1 | 1 |
| 1175 | 30 | 94 | 0.4 | 1 | 1 | 1 |
| 1176 | 30 | 95 | 0.4 | 1 | 1 | 1 |
| 1177 | 30 | 96 | 0.4 | 1 | 1 | 1 |
| 1178 | 30 | 97 | 0.4 | 1 | 1 | 1 |
| 1179 | 30 | 98 | 0.4 | 1 | 1 | 1 |
| 1180 | 30 | 99 | 0.4 | 1 | 1 | 1 |
| 1181 | 30 | 100 | 0.4 | 1 | 3 | 2 |
| 1182 | 30 | 101 | 1 | 3 | 3 | 2 |
| 1183 | 30 | 102 | 1.3 | 5 | 3 | 2 |
| 1184 | 30 | 103 | 1.7 | 5 | 4 | 2 |
| 1185 | 30 | 104 | 2 | 5 | 4 | 2 |
| 1186 | 30 | 105 | 2.5 | 5 | 4 | 2 |
| 1187 | 30 | 106 | 2.5 | 9 | 4 | 2 |
| 1188 | 30 | 107 | 2.5 | 9 | 6 | 2 |
| 1189 | 30 | 108 | 3 | 9 | 6 | 2 |
| 1190 | 30 | 109 | 3 | 9 | 6 | 2 |
| 1191 | 30 | 110 | 3 | 10 | 6 | 3 |
| 1192 | 30 | 111 | 3 | 10 | 6 | 3 |
| 1193 | 30 | 112 | 5 | 10 | 6 | 3 |
| 1194 | 30 | 113 | 5 | 10 | 6 | 3 |
| 1195 | 30 | 114 | 3 | 10 | 6 | 3 |
| 1196 | 30 | 115 | 3 | 10 | 6 | 3 |
| 1197 | 30 | 116 | 3 | 10 | 6 | 3 |
| 1198 | 30 | 117 | 3 | 10 | 6 | 3 |
| 1199 | 30 | 118 | 3 | 9 | 6 | 2 |
| 1200 | 30 | 119 | 3 | 9 | 6 | 2 |
| 1201 | 30 | 120 | 3 | 9 | 6 | 2 |
| 1202 | 30 | 121 | 2 | 7 | 5 | 2 |
| 1203 | 30 | 122 | 2 | 5 | 4 | 2 |
| 1204 | 30 | 123 | 2 | 4 | 3 | 2 |
| 1205 | 30 | 124 | 0.4 | 4 | 3 | 2 |
| 1206 | 30 | 125 | 0.4 | 3 | 3 | 2 |
| 1207 | 30 | 126 | 0.4 | 2 | 3 | 2 |
| 1208 | 30 | 127 | 0.4 | 1 | 1 | 1 |
| 1209 | 30 | 128 | 0.4 | 1 | 1 | 1 |
| 1210 | 30 | 129 | 0.4 | 1 | 1 | 1 |
| 1211 | 30 | 130 | 0.4 | 1 | 1 | 1 |
| 1212 | 30 | 131 | 0.4 | 1 | 1 | 1 |
| 1213 | 30 | 132 | 0.4 | 1 | 1 | 1 |
| 1214 | 30 | 133 | 0.4 | 1 | 1 | 1 |
| 1215 | 30 | 134 | 0.4 | 1 | 1 | 1 |
| 1216 | 30 | 135 | 0.4 | 1 | 1 | 1 |
| 1217 | 30 | 136 | 0.4 | 1 | 1 | 1 |
| 1218 | 30 | 137 | 0.4 | 1 | 1 | 1 |
| 1219 | 30 | 138 | 0.4 | 1 | 1 | 1 |
| 1220 | 30 | 139 | 0.4 | 1 | 1 | 1 |
| 1221 | 30 | 140 | 0.4 | 1 | 1 | 1 |
| 1222 | 30 | 141 | 0.4 | 1 | 1 | 1 |
| 1223 | 30 | 142 | 0.4 | 1 | 1 | 1 |
| 1224 | 30 | 143 | 0.4 | 1 | 1 | 1 |
| 1225 | 30 | 144 | 0.4 | 1 | 1 | 1 |
| 1226 | 30 | 145 | 0.4 | 1 | 1 | 1 |
| 1227 | 30 | 146 | 0.4 | 1 | 1 | 1 |
| 1228 | 30 | 147 | 0.4 | 1 | 1 | 1 |
| 1229 | 30 | 148 | 0.4 | 1 | 1 | 1 |
| 1230 | 30 | 149 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1231 | 30 | 150 | 0.4 | 1 | 1 | 1 |
| 1232 | 30 | 151 | 0.4 | 1 | 1 | 1 |
| 1233 | 30 | 152 | 0.4 | 1 | 1 | 1 |
| 1234 | 30 | 153 | 0.4 | 1 | 1 | 1 |
| 1235 | 30 | 154 | 0.4 | 1 | 1 | 1 |
| 1236 | 30 | 155 | 0.4 | 1 | 1 | 1 |
| 1237 | 30 | 156 | 0.4 | 1 | 1 | 1 |
| 1238 | 30 | 157 | 0.4 | 1 | 1 | 1 |
| 1239 | 30 | 158 | 0.4 | 1 | 1 | 1 |
| 1240 | 30 | 159 | 0.4 | 1 | 1 | 1 |
| 1241 | 30 | 160 | 0.4 | 1 | 1 | 1 |
| 1242 | 30 | 161 | 0.4 | 1 | 1 | 1 |
| 1243 | 30 | 162 | 0.4 | 1 | 1 | 1 |
| 1244 | 30 | 163 | 0.4 | 1 | 1 | 1 |
| 1245 | 30 | 164 | 0.4 | 1 | 1 | 1 |
| 1246 | 30 | 165 | 0.4 | 1 | 1 | 1 |
| 1247 | 30 | 166 | 0.4 | 1 | 1 | 1 |
| 1248 | 30 | 167 | 0.4 | 1 | 1 | 1 |
| 1249 | 30 | 168 | 0.4 | 1 | 1 | 1 |
| 1250 | 30 | 169 | 0.4 | 1 | 1 | 1 |
| 1251 | 30 | 170 | 0.4 | 1 | 1 | 1 |
| 1252 | 30 | 171 | 0.4 | 1 | 1 | 1 |
| 1253 | 30 | 172 | 0.4 | 1 | 1 | 1 |
| 1254 | 30 | 173 | 0.4 | 1 | 1 | 1 |
| 1255 | 30 | 174 | 0.4 | 1 | 1 | 1 |
| 1256 | 30 | 175 | 0.4 | 1 | 1 | 1 |
| 1257 | 30 | 176 | 0.4 | 1 | 1 | 1 |
| 1258 | 30 | 177 | 0.4 | 1 | 1 | 1 |
| 1259 | 30 | 178 | 0.4 | 1 | 1 | 1 |
| 1260 | 30 | 179 | 0.4 | 1 | 1 | 1 |
| 1261 | 30 | 180 | 0.4 | 1 | 1 | 1 |
| 1262 | 30 | 181 | 0.4 | 1 | 1 | 1 |
| 1263 | 30 | 182 | 0.4 | 1 | 1 | 1 |
| 1264 | 30 | 183 | 0.4 | 1 | 1 | 1 |
| 1265 | 30 | 184 | 0.4 | 1 | 1 | 1 |
| 1266 | 30 | 185 | 0.4 | 1 | 1 | 1 |
| 1267 | 30 | 186 | 0.4 | 1 | 1 | 1 |
| 1268 | 30 | 187 | 0.4 | 1 | 1 | 1 |
| 1269 | 30 | 188 | 0.4 | 1 | 1 | 1 |
| 1270 | 30 | 189 | 0.4 | 1 | 1 | 1 |
| 1271 | 30 | 190 | 0.4 | 1 | 1 | 1 |
| 1272 | 30 | 191 | 0.4 | 1 | 1 | 1 |
| 1273 | 30 | 192 | 0.4 | 1 | 1 | 1 |
| 1274 | 30 | 193 | 0.4 | 1 | 1 | 1 |
| 1275 | 30 | 194 | 0.4 | 1 | 1 | 1 |
| 1276 | 30 | 195 | 0.4 | 1 | 1 | 1 |
| 1277 | 30 | 196 | 0.4 | 1 | 1 | 1 |
| 1278 | 30 | 197 | 0.4 | 1 | 1 | 1 |
| 1279 | 30 | 198 | 0.4 | 1 | 1 | 1 |
| 1280 | 30 | 199 | 0.4 | 1 | 1 | 1 |
| 1281 | 30 | 200 | 0.4 | 1 | 1 | 1 |
| 1282 | 30 | 201 | 0.4 | 1 | 1 | 1 |
| 1283 | 30 | 202 | 0.4 | 1 | 1 | 1 |
| 1284 | 30 | 203 | 0.4 | 1 | 1 | 1 |
| 1285 | 30 | 204 | 0.4 | 1 | 1 | 1 |
| 1286 | 30 | 205 | 0.4 | 1 | 1 | 1 |
| 1287 | 30 | 206 | 0.4 | 1 | 1 | 1 |
| 1288 | 30 | 207 | 0.4 | 1 | 1 | 1 |
| 1289 | 30 | 208 | 0.4 | 1 | 1 | 1 |
| 1290 | 30 | 209 | 0.4 | 1 | 1 | 1 |
| 1291 | 30 | 210 | 0.4 | 1 | 1 | 1 |
| 1292 | 30 | 211 | 0.4 | 1 | 1 | 1 |
| 1293 | 30 | 212 | 0.4 | 1 | 1 | 1 |
| 1294 | 30 | 213 | 0.4 | 1 | 1 | 1 |
| 1295 | 30 | 214 | 0.4 | 1 | 1 | 1 |
| 1296 | 30 | 215 | 0.4 | 1 | 1 | 1 |
| 1297 | 30 | 216 | 0.4 | 2 | 2 | 3 |
| 1298 | 30 | 217 | 1 | 3 | 3 | 4 |
| 1299 | 30 | 218 | 2 | 3 | 3 | 5 |
| 1300 | 30 | 219 | 2 | 3 | 3 | 5 |
| 1301 | 30 | 220 | 2 | 3 | 3 | 5 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1302 | 30 | 221 | 2 | 3 | 3 | 5 |
| 1303 | 30 | 222 | 2 | 3 | 3 | 5 |
| 1304 | 30 | 223 | 2 | 3 | 3 | 5 |
| 1305 | 30 | 224 | 2 | 3 | 3 | 5 |
| 1306 | 30 | 225 | 2 | 3 | 3 | 5 |
| 1307 | 30 | 226 | 2 | 3 | 3 | 5 |
| 1308 | 30 | 227 | 2 | 3 | 3 | 5 |
| 1309 | 30 | 228 | 2 | 3 | 3 | 4 |
| 1310 | 30 | 229 | 2 | 3 | 3 | 4 |
| 1311 | 30 | 230 | 2 | 3 | 3 | 4 |
| 1312 | 30 | 231 | 2 | 3 | 3 | 4 |
| 1313 | 30 | 232 | 2 | 3 | 2 | 3 |
| 1314 | 30 | 233 | 2 | 2 | 2 | 2 |
| 1315 | 30 | 234 | 1 | 1 | 2 | 2 |
| 1316 | 30 | 235 | 0.4 | 1 | 1 | 1 |
| 1317 | 30 | 236 | 0.4 | 1 | 1 | 1 |
| 1318 | 30 | 237 | 0.4 | 1 | 1 | 1 |
| 1319 | 30 | 238 | 0.4 | 1 | 1 | 1 |
| 1320 | 30 | 239 | 0.4 | 1 | 1 | 1 |
| 1321 | 30 | 240 | 0.4 | 1 | 1 | 1 |
| 1322 | 30 | 241 | 0.4 | 1 | 1 | 1 |
| 1323 | 30 | 242 | 0.4 | 1 | 1 | 1 |
| 1324 | 30 | 243 | 0.4 | 1 | 1 | 1 |
| 1325 | 30 | 244 | 0.4 | 1 | 1 | 1 |
| 1326 | 30 | 245 | 0.4 | 1 | 1 | 1 |
| 1327 | 30 | 246 | 0.4 | 1 | 1 | 1 |
| 1328 | 30 | 247 | 0.4 | 1 | 1 | 1 |
| 1329 | 30 | 248 | 0.4 | 1 | 1 | 1 |
| 1330 | 30 | 249 | 0.4 | 1 | 1 | 1 |
| 1331 | 30 | 250 | 0.4 | 1 | 1 | 1 |
| 1332 | 30 | 251 | 0.4 | 1 | 1 | 1 |
| 1333 | 30 | 252 | 0.4 | 1 | 1 | 1 |
| 1334 | 30 | 253 | 0.4 | 1 | 1 | 1 |
| 1335 | 30 | 254 | 0.4 | 1 | 1 | 1 |
| 1336 | 30 | 255 | 0.4 | 1 | 1 | 1 |
| 1337 | 30 | 256 | 0.4 | 1 | 1 | 1 |
| 1338 | 30 | 257 | 0.4 | 1 | 1 | 1 |
| 1339 | 30 | 258 | 0.4 | 1 | 1 | 1 |
| 1340 | 30 | 259 | 0.4 | 1 | 1 | 1 |
| 1341 | 30 | 260 | 0.4 | 1 | 1 | 1 |
| 1342 | 30 | 261 | 0.4 | 1 | 1 | 1 |
| 1343 | 30 | 262 | 0.4 | 1 | 1 | 1 |
| 1344 | 30 | 263 | 0.4 | 1 | 1 | 1 |
| 1345 | 30 | 264 | 0.4 | 1 | 1 | 1 |
| 1346 | 30 | 265 | 0.4 | 1 | 1 | 1 |
| 1347 | 30 | 266 | 0.4 | 1 | 1 | 1 |
| 1348 | 30 | 267 | 0.4 | 1 | 1 | 1 |
| 1349 | 30 | 268 | 0.4 | 1 | 1 | 1 |
| 1350 | 30 | 269 | 0.4 | 1 | 1 | 1 |
| 1351 | 30 | 270 | 0.4 | 1 | 1 | 1 |
| 1352 | 30 | 271 | 0.4 | 1 | 1 | 1 |
| 1353 | 30 | 272 | 0.4 | 1 | 1 | 1 |
| 1354 | 30 | 273 | 0.4 | 1 | 1 | 1 |
| 1355 | 30 | 274 | 0.4 | 1 | 1 | 1 |
| 1356 | 30 | 275 | 0.4 | 1 | 1 | 1 |
| 1357 | 30 | 276 | 0.4 | 1 | 1 | 1 |
| 1358 | 30 | 277 | 0.4 | 1 | 1 | 1 |
| 1359 | 30 | 278 | 0.4 | 1 | 1 | 1 |
| 1360 | 30 | 279 | 0.4 | 1 | 1 | 1 |
| 1361 | 30 | 280 | 0.4 | 1 | 1 | 1 |
| 1362 | 30 | 281 | 0.4 | 1 | 1 | 1 |
| 1363 | 30 | 282 | 0.4 | 1 | 1 | 1 |
| 1364 | 30 | 283 | 0.4 | 1 | 1 | 1 |
| 1365 | 30 | 284 | 0.4 | 1 | 1 | 1 |
| 1366 | 30 | 285 | 0.4 | 1 | 1 | 1 |
| 1367 | 30 | 286 | 0.4 | 1 | 1 | 1 |
| 1368 | 30 | 287 | 0.4 | 1 | 1 | 1 |
| 1369 | 30 | 288 | 0.4 | 1 | 1 | 1 |
| 1370 | 30 | 289 | 0.4 | 1 | 1 | 1 |
| 1371 | 30 | 290 | 0.4 | 1 | 1 | 1 |
| 1372 | 30 | 291 | 0.4 | 1 | 1 | 1 |
| 1373 | 30 | 292 | 0.4 | 1 | 1 | 1 |
| 1374 | 30 | 293 | 0.4 | 1 | 1 | 1 |
| 1375 | 30 | 294 | 0.4 | 1 | 1 | 1 |
| 1376 | 30 | 295 | 0.4 | 1 | 1 | 1 |
| 1377 | 30 | 296 | 0.4 | 1 | 1 | 1 |
| 1378 | 30 | 297 | 0.4 | 1 | 1 | 1 |
| 1379 | 30 | 298 | 0.4 | 1 | 1 | 1 |
| 1380 | 30 | 299 | 0.4 | 1 | 1 | 1 |
| 1381 | 30 | 300 | 0.4 | 1 | 1 | 1 |
| 1382 | 30 | 301 | 0.4 | 1 | 1 | 1 |
| 1383 | 30 | 302 | 0.4 | 1 | 1 | 1 |
| 1384 | 30 | 303 | 0.4 | 1 | 1 | 1 |
| 1385 | 30 | 304 | 0.4 | 1 | 1 | 1 |
| 1386 | 30 | 305 | 0.4 | 1 | 1 | 1 |
| 1387 | 30 | 306 | 0.4 | 1 | 1 | 1 |
| 1388 | 30 | 307 | 0.4 | 1 | 1 | 1 |
| 1389 | 30 | 308 | 0.4 | 1 | 1 | 1 |
| 1390 | 30 | 309 | 0.4 | 1 | 1 | 1 |
| 1391 | 30 | 310 | 0.4 | 1 | 1 | 1 |
| 1392 | 30 | 311 | 0.4 | 1 | 1 | 1 |
| 1393 | 30 | 312 | 0.4 | 1 | 1 | 1 |
| 1394 | 30 | 313 | 0.4 | 1 | 1 | 1 |
| 1395 | 30 | 314 | 0.4 | 1 | 1 | 1 |
| 1396 | 30 | 315 | 0.4 | 1 | 1 | 1 |
| 1397 | 30 | 316 | 0.4 | 1 | 1 | 1 |
| 1398 | 30 | 317 | 0.4 | 1 | 1 | 1 |
| 1399 | 30 | 318 | 0.4 | 1 | 1 | 1 |
| 1400 | 30 | 319 | 0.4 | 1 | 1 | 1 |
| 1401 | 30 | 320 | 0.4 | 1 | 1 | 1 |
| 1402 | 30 | 321 | 0.4 | 1 | 1 | 1 |
| 1403 | 30 | 322 | 0.4 | 1 | 1 | 1 |
| 1404 | 30 | 323 | 0.4 | 1 | 1 | 1 |
| 1405 | 30 | 324 | 0.4 | 1 | 1 | 1 |
| 1406 | 30 | 325 | 0.4 | 1 | 1 | 1 |
| 1407 | 30 | 326 | 0.4 | 1 | 1 | 1 |
| 1408 | 30 | 327 | 0.4 | 1 | 1 | 1 |
| 1409 | 30 | 328 | 0.4 | 1 | 1 | 1 |
| 1410 | 30 | 329 | 0.4 | 1 | 1 | 1 |
| 1411 | 30 | 330 | 0.4 | 1 | 1 | 1 |
| 1412 | 30 | 331 | 0.4 | 1 | 1 | 1 |
| 1413 | 30 | 332 | 0.4 | 1 | 1 | 1 |
| 1414 | 30 | 333 | 0.4 | 1 | 1 | 1 |
| 1415 | 30 | 334 | 0.4 | 1 | 1 | 1 |
| 1416 | 30 | 335 | 0.4 | 1 | 1 | 1 |
| 1417 | 30 | 336 | 0.4 | 1 | 1 | 1 |
| 1418 | 30 | 337 | 0.4 | 1 | 1 | 1 |
| 1419 | 30 | 338 | 0.4 | 1 | 1 | 1 |
| 1420 | 30 | 339 | 0.4 | 1 | 1 | 1 |
| 1421 | 30 | 340 | 0.4 | 1 | 1 | 1 |
| 1422 | 30 | 341 | 0.4 | 1 | 1 | 1 |
| 1423 | 30 | 342 | 0.4 | 1 | 1 | 1 |
| 1424 | 30 | 343 | 0.4 | 1 | 1 | 1 |
| 1425 | 30 | 344 | 0.4 | 1 | 1 | 1 |
| 1426 | 30 | 345 | 0.4 | 1 | 1 | 1 |
| 1427 | 30 | 346 | 0.4 | 1 | 1 | 1 |
| 1428 | 30 | 347 | 0.4 | 1 | 1 | 1 |
| 1429 | 30 | 348 | 0.4 | 1 | 1 | 1 |
| 1430 | 30 | 349 | 0.4 | 1 | 1 | 1 |
| 1431 | 30 | 350 | 0.4 | 1 | 1 | 1 |
| 1432 | 30 | 351 | 0.4 | 1 | 1 | 1 |
| 1433 | 30 | 352 | 0.4 | 1 | 1 | 1 |
| 1434 | 30 | 353 | 0.4 | 1 | 1 | 1 |
| 1435 | 30 | 354 | 0.4 | 1 | 1 | 1 |
| 1436 | 30 | 355 | 0.4 | 1 | 1 | 1 |
| 1437 | 30 | 356 | 0.4 | 1 | 1 | 1 |
| 1438 | 30 | 357 | 0.4 | 1 | 1 | 1 |
| 1439 | 30 | 358 | 0.4 | 1 | 1 | 1 |
| 1440 | 30 | 359 | 0.4 | 1 | 1 | 1 |
| 1441 | 40 | 0 | 0.4 | 1 | 1 | 1 |
| 1442 | 40 | 1 | 0.4 | 1 | 1 | 1 |
| 1443 | 40 | 2 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1444 | 40 | 3 | 0.4 | 1 | 1 | 1 |
| 1445 | 40 | 4 | 0.4 | 1 | 1 | 1 |
| 1446 | 40 | 5 | 0.4 | 1 | 1 | 1 |
| 1447 | 40 | 6 | 0.4 | 3 | 1 | 1 |
| 1448 | 40 | 7 | 0.4 | 5 | 1 | 1 |
| 1449 | 40 | 8 | 0.4 | 7 | 1 | 1 |
| 1450 | 40 | 9 | 0.4 | 10 | 2 | 1 |
| 1451 | 40 | 10 | 0.5 | 10 | 2 | 1 |
| 1452 | 40 | 11 | 0.7 | 10 | 2 | 1 |
| 1453 | 40 | 12 | 1 | 10 | 2 | 4 |
| 1454 | 40 | 13 | 2 | 10 | 2 | 4 |
| 1455 | 40 | 14 | 5 | 7 | 2 | 4 |
| 1456 | 40 | 15 | 7 | 7 | 2 | 4 |
| 1457 | 40 | 16 | 10 | 9 | 2 | 4 |
| 1458 | 40 | 17 | 15 | 10 | 2 | 4 |
| 1459 | 40 | 18 | 15 | 10 | 2 | 4 |
| 1460 | 40 | 19 | 15 | 10 | 2 | 4 |
| 1461 | 40 | 20 | 15 | 10 | 2 | 4 |
| 1462 | 40 | 21 | 15 | 10 | 2 | 4 |
| 1463 | 40 | 22 | 15 | 10 | 2 | 4 |
| 1464 | 40 | 23 | 15 | 10 | 2 | 4 |
| 1465 | 40 | 24 | 15 | 10 | 2 | 4 |
| 1466 | 40 | 25 | 15 | 10 | 2 | 4 |
| 1467 | 40 | 26 | 15 | 10 | 2 | 4 |
| 1468 | 40 | 27 | 15 | 10 | 3 | 4 |
| 1469 | 40 | 28 | 15 | 10 | 3 | 4 |
| 1470 | 40 | 29 | 15 | 10 | 3 | 4 |
| 1471 | 40 | 30 | 15 | 10 | 3 | 4 |
| 1472 | 40 | 31 | 15 | 10 | 3 | 3 |
| 1473 | 40 | 32 | 15 | 10 | 3 | 3 |
| 1474 | 40 | 33 | 15 | 10 | 3 | 3 |
| 1475 | 40 | 34 | 15 | 10 | 3 | 3 |
| 1476 | 40 | 35 | 10 | 10 | 3 | 3 |
| 1477 | 40 | 36 | 7 | 10 | 2 | 3 |
| 1478 | 40 | 37 | 5 | 7 | 2 | 1 |
| 1479 | 40 | 38 | 2 | 3 | 1 | 1 |
| 1480 | 40 | 39 | 1 | 1 | 1 | 1 |
| 1481 | 40 | 40 | 0.4 | 1 | 1 | 1 |
| 1482 | 40 | 41 | 0.4 | 1 | 1 | 1 |
| 1483 | 40 | 42 | 0.4 | 1 | 1 | 1 |
| 1484 | 40 | 43 | 0.4 | 1 | 1 | 1 |
| 1485 | 40 | 44 | 0.4 | 1 | 1 | 1 |
| 1486 | 40 | 45 | 0.4 | 1 | 1 | 1 |
| 1487 | 40 | 46 | 0.4 | 1 | 1 | 1 |
| 1488 | 40 | 47 | 0.4 | 1 | 1 | 1 |
| 1489 | 40 | 48 | 0.4 | 1 | 1 | 1 |
| 1490 | 40 | 49 | 0.4 | 1 | 1 | 1 |
| 1491 | 40 | 50 | 0.4 | 1 | 1 | 1 |
| 1492 | 40 | 51 | 0.4 | 1 | 1 | 1 |
| 1493 | 40 | 52 | 0.4 | 1 | 1 | 1 |
| 1494 | 40 | 53 | 0.4 | 1 | 1 | 1 |
| 1495 | 40 | 54 | 0.4 | 1 | 1 | 1 |
| 1496 | 40 | 55 | 0.4 | 1 | 1 | 1 |
| 1497 | 40 | 56 | 0.4 | 1 | 1 | 1 |
| 1498 | 40 | 57 | 0.4 | 1 | 1 | 1 |
| 1499 | 40 | 58 | 0.4 | 1 | 1 | 1 |
| 1500 | 40 | 59 | 0.4 | 1 | 1 | 1 |
| 1501 | 40 | 60 | 0.4 | 1 | 1 | 1 |
| 1502 | 40 | 61 | 0.4 | 1 | 1 | 1 |
| 1503 | 40 | 62 | 0.4 | 1 | 1 | 1 |
| 1504 | 40 | 63 | 0.4 | 1 | 1 | 1 |
| 1505 | 40 | 64 | 0.4 | 1 | 1 | 1 |
| 1506 | 40 | 65 | 0.4 | 1 | 1 | 1 |
| 1507 | 40 | 66 | 0.4 | 1 | 1 | 1 |
| 1508 | 40 | 67 | 0.4 | 1 | 1 | 1 |
| 1509 | 40 | 68 | 0.4 | 1 | 1 | 1 |
| 1510 | 40 | 69 | 0.4 | 1 | 1 | 1 |
| 1511 | 40 | 70 | 0.4 | 1 | 1 | 1 |
| 1512 | 40 | 71 | 0.4 | 1 | 1 | 1 |
| 1513 | 40 | 72 | 0.4 | 1 | 1 | 1 |
| 1514 | 40 | 73 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1515 | 40 | 74 | 0.4 | 1 | 1 | 1 |
| 1516 | 40 | 75 | 0.4 | 1 | 1 | 1 |
| 1517 | 40 | 76 | 0.4 | 1 | 1 | 1 |
| 1518 | 40 | 77 | 0.4 | 1 | 1 | 1 |
| 1519 | 40 | 78 | 0.4 | 1 | 1 | 1 |
| 1520 | 40 | 79 | 0.4 | 1 | 1 | 1 |
| 1521 | 40 | 80 | 0.4 | 1 | 1 | 1 |
| 1522 | 40 | 81 | 0.4 | 1 | 1 | 1 |
| 1523 | 40 | 82 | 0.4 | 1 | 1 | 1 |
| 1524 | 40 | 83 | 0.4 | 1 | 1 | 1 |
| 1525 | 40 | 84 | 0.4 | 1 | 1 | 1 |
| 1526 | 40 | 85 | 0.4 | 1 | 1 | 1 |
| 1527 | 40 | 86 | 0.4 | 1 | 1 | 1 |
| 1528 | 40 | 87 | 0.4 | 1 | 1 | 1 |
| 1529 | 40 | 88 | 0.4 | 1 | 1 | 1 |
| 1530 | 40 | 89 | 0.4 | 1 | 1 | 1 |
| 1531 | 40 | 90 | 0.4 | 1 | 1 | 1 |
| 1532 | 40 | 91 | 0.4 | 1 | 1 | 1 |
| 1533 | 40 | 92 | 0.4 | 1 | 1 | 1 |
| 1534 | 40 | 93 | 0.4 | 1 | 1 | 1 |
| 1535 | 40 | 94 | 0.4 | 1 | 1 | 1 |
| 1536 | 40 | 95 | 0.4 | 1 | 1 | 1 |
| 1537 | 40 | 96 | 0.4 | 1 | 1 | 1 |
| 1538 | 40 | 97 | 0.4 | 1 | 1 | 1 |
| 1539 | 40 | 98 | 0.4 | 1 | 1 | 1 |
| 1540 | 40 | 99 | 0.4 | 1 | 1 | 1 |
| 1541 | 40 | 100 | 0.4 | 1 | 3 | 2 |
| 1542 | 40 | 101 | 1 | 3 | 3 | 2 |
| 1543 | 40 | 102 | 1.3 | 5 | 3 | 2 |
| 1544 | 40 | 103 | 1.7 | 5 | 4 | 2 |
| 1545 | 40 | 104 | 2 | 5 | 4 | 2 |
| 1546 | 40 | 105 | 2.5 | 5 | 4 | 2 |
| 1547 | 40 | 106 | 2.5 | 9 | 4 | 2 |
| 1548 | 40 | 107 | 2.5 | 9 | 6 | 2 |
| 1549 | 40 | 108 | 3 | 9 | 6 | 2 |
| 1550 | 40 | 109 | 3 | 9 | 6 | 2 |
| 1551 | 40 | 110 | 3 | 10 | 6 | 3 |
| 1552 | 40 | 111 | 3 | 10 | 6 | 3 |
| 1553 | 40 | 112 | 5 | 10 | 6 | 3 |
| 1554 | 40 | 113 | 5 | 10 | 6 | 3 |
| 1555 | 40 | 114 | 3 | 10 | 6 | 3 |
| 1556 | 40 | 115 | 3 | 10 | 6 | 3 |
| 1557 | 40 | 116 | 3 | 10 | 6 | 3 |
| 1558 | 40 | 117 | 3 | 10 | 6 | 3 |
| 1559 | 40 | 118 | 3 | 9 | 6 | 2 |
| 1560 | 40 | 119 | 3 | 9 | 6 | 2 |
| 1561 | 40 | 120 | 3 | 9 | 6 | 2 |
| 1562 | 40 | 121 | 2 | 7 | 5 | 2 |
| 1563 | 40 | 122 | 2 | 5 | 4 | 2 |
| 1564 | 40 | 123 | 2 | 4 | 3 | 2 |
| 1565 | 40 | 124 | 0.4 | 4 | 3 | 2 |
| 1566 | 40 | 125 | 0.4 | 3 | 3 | 2 |
| 1567 | 40 | 126 | 0.4 | 2 | 3 | 2 |
| 1568 | 40 | 127 | 0.4 | 1 | 1 | 1 |
| 1569 | 40 | 128 | 0.4 | 1 | 1 | 1 |
| 1570 | 40 | 129 | 0.4 | 1 | 1 | 1 |
| 1571 | 40 | 130 | 0.4 | 1 | 1 | 1 |
| 1572 | 40 | 131 | 0.4 | 1 | 1 | 1 |
| 1573 | 40 | 132 | 0.4 | 1 | 1 | 1 |
| 1574 | 40 | 133 | 0.4 | 1 | 1 | 1 |
| 1575 | 40 | 134 | 0.4 | 1 | 1 | 1 |
| 1576 | 40 | 135 | 0.4 | 1 | 1 | 1 |
| 1577 | 40 | 136 | 0.4 | 1 | 1 | 1 |
| 1578 | 40 | 137 | 0.4 | 1 | 1 | 1 |
| 1579 | 40 | 138 | 0.4 | 1 | 1 | 1 |
| 1580 | 40 | 139 | 0.4 | 1 | 1 | 1 |
| 1581 | 40 | 140 | 0.4 | 1 | 1 | 1 |
| 1582 | 40 | 141 | 0.4 | 1 | 1 | 1 |
| 1583 | 40 | 142 | 0.4 | 1 | 1 | 1 |
| 1584 | 40 | 143 | 0.4 | 1 | 1 | 1 |
| 1585 | 40 | 144 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1586 | 40 | 145 | 0.4 | 1 | 1 | 1 |
| 1587 | 40 | 146 | 0.4 | 1 | 1 | 1 |
| 1588 | 40 | 147 | 0.4 | 1 | 1 | 1 |
| 1589 | 40 | 148 | 0.4 | 1 | 1 | 1 |
| 1590 | 40 | 149 | 0.4 | 1 | 1 | 1 |
| 1591 | 40 | 150 | 0.4 | 1 | 1 | 1 |
| 1592 | 40 | 151 | 0.4 | 1 | 1 | 1 |
| 1593 | 40 | 152 | 0.4 | 1 | 1 | 1 |
| 1594 | 40 | 153 | 0.4 | 1 | 1 | 1 |
| 1595 | 40 | 154 | 0.4 | 1 | 1 | 1 |
| 1596 | 40 | 155 | 0.4 | 1 | 1 | 1 |
| 1597 | 40 | 156 | 0.4 | 1 | 1 | 1 |
| 1598 | 40 | 157 | 0.4 | 1 | 1 | 1 |
| 1599 | 40 | 158 | 0.4 | 1 | 1 | 1 |
| 1600 | 40 | 159 | 0.4 | 1 | 1 | 1 |
| 1601 | 40 | 160 | 0.4 | 1 | 1 | 1 |
| 1602 | 40 | 161 | 0.4 | 1 | 1 | 1 |
| 1603 | 40 | 162 | 0.4 | 1 | 1 | 1 |
| 1604 | 40 | 163 | 0.4 | 1 | 1 | 1 |
| 1605 | 40 | 164 | 0.4 | 1 | 1 | 1 |
| 1606 | 40 | 165 | 0.4 | 1 | 1 | 1 |
| 1607 | 40 | 166 | 0.4 | 1 | 1 | 1 |
| 1608 | 40 | 167 | 0.4 | 1 | 1 | 1 |
| 1609 | 40 | 168 | 0.4 | 1 | 1 | 1 |
| 1610 | 40 | 169 | 0.4 | 1 | 1 | 1 |
| 1611 | 40 | 170 | 0.4 | 1 | 1 | 1 |
| 1612 | 40 | 171 | 0.4 | 1 | 1 | 1 |
| 1613 | 40 | 172 | 0.4 | 1 | 1 | 1 |
| 1614 | 40 | 173 | 0.4 | 1 | 1 | 1 |
| 1615 | 40 | 174 | 0.4 | 1 | 1 | 1 |
| 1616 | 40 | 175 | 0.4 | 1 | 1 | 1 |
| 1617 | 40 | 176 | 0.4 | 1 | 1 | 1 |
| 1618 | 40 | 177 | 0.4 | 1 | 1 | 1 |
| 1619 | 40 | 178 | 0.4 | 1 | 1 | 1 |
| 1620 | 40 | 179 | 0.4 | 1 | 1 | 1 |
| 1621 | 40 | 180 | 0.4 | 1 | 1 | 1 |
| 1622 | 40 | 181 | 0.4 | 1 | 1 | 1 |
| 1623 | 40 | 182 | 0.4 | 1 | 1 | 1 |
| 1624 | 40 | 183 | 0.4 | 1 | 1 | 1 |
| 1625 | 40 | 184 | 0.4 | 1 | 1 | 1 |
| 1626 | 40 | 185 | 0.4 | 1 | 1 | 1 |
| 1627 | 40 | 186 | 0.4 | 1 | 1 | 1 |
| 1628 | 40 | 187 | 0.4 | 1 | 1 | 1 |
| 1629 | 40 | 188 | 0.4 | 1 | 1 | 1 |
| 1630 | 40 | 189 | 0.4 | 1 | 1 | 1 |
| 1631 | 40 | 190 | 0.4 | 1 | 1 | 1 |
| 1632 | 40 | 191 | 0.4 | 1 | 1 | 1 |
| 1633 | 40 | 192 | 0.4 | 1 | 1 | 1 |
| 1634 | 40 | 193 | 0.4 | 1 | 1 | 1 |
| 1635 | 40 | 194 | 0.4 | 1 | 1 | 1 |
| 1636 | 40 | 195 | 0.4 | 1 | 1 | 1 |
| 1637 | 40 | 196 | 0.4 | 1 | 1 | 1 |
| 1638 | 40 | 197 | 0.4 | 1 | 1 | 1 |
| 1639 | 40 | 198 | 0.4 | 1 | 1 | 1 |
| 1640 | 40 | 199 | 0.4 | 1 | 1 | 1 |
| 1641 | 40 | 200 | 0.4 | 1 | 1 | 1 |
| 1642 | 40 | 201 | 0.4 | 1 | 1 | 1 |
| 1643 | 40 | 202 | 0.4 | 1 | 1 | 1 |
| 1644 | 40 | 203 | 0.4 | 1 | 1 | 1 |
| 1645 | 40 | 204 | 0.4 | 1 | 1 | 1 |
| 1646 | 40 | 205 | 0.4 | 1 | 1 | 1 |
| 1647 | 40 | 206 | 0.4 | 1 | 1 | 1 |
| 1648 | 40 | 207 | 0.4 | 1 | 1 | 1 |
| 1649 | 40 | 208 | 0.4 | 1 | 1 | 1 |
| 1650 | 40 | 209 | 0.4 | 1 | 1 | 1 |
| 1651 | 40 | 210 | 0.4 | 1 | 1 | 1 |
| 1652 | 40 | 211 | 0.4 | 1 | 1 | 1 |
| 1653 | 40 | 212 | 0.4 | 1 | 1 | 1 |
| 1654 | 40 | 213 | 0.4 | 1 | 1 | 1 |
| 1655 | 40 | 214 | 0.4 | 1 | 1 | 1 |
| 1656 | 40 | 215 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1657 | 40 | 216 | 0.4 | 1 | 2 | 3 |
| 1658 | 40 | 217 | 0.4 | 1 | 2 | 3 |
| 1659 | 40 | 218 | 0.4 | 1 | 2 | 3 |
| 1660 | 40 | 219 | 0.4 | 1 | 2 | 3 |
| 1661 | 40 | 220 | 0.4 | 1 | 2 | 3 |
| 1662 | 40 | 221 | 0.4 | 1 | 2 | 3 |
| 1663 | 40 | 222 | 0.4 | 1 | 2 | 3 |
| 1664 | 40 | 223 | 0.4 | 1 | 2 | 3 |
| 1665 | 40 | 224 | 0.4 | 1 | 2 | 3 |
| 1666 | 40 | 225 | 0.4 | 1 | 2 | 3 |
| 1667 | 40 | 226 | 0.4 | 1 | 2 | 3 |
| 1668 | 40 | 227 | 0.4 | 1 | 2 | 3 |
| 1669 | 40 | 228 | 0.4 | 1 | 2 | 3 |
| 1670 | 40 | 229 | 0.4 | 1 | 2 | 3 |
| 1671 | 40 | 230 | 0.4 | 1 | 2 | 3 |
| 1672 | 40 | 231 | 0.4 | 1 | 2 | 3 |
| 1673 | 40 | 232 | 0.4 | 1 | 2 | 3 |
| 1674 | 40 | 233 | 0.4 | 1 | 2 | 2 |
| 1675 | 40 | 234 | 0.4 | 1 | 2 | 2 |
| 1676 | 40 | 235 | 0.4 | 1 | 1 | 1 |
| 1677 | 40 | 236 | 0.4 | 1 | 1 | 1 |
| 1678 | 40 | 237 | 0.4 | 1 | 1 | 1 |
| 1679 | 40 | 238 | 0.4 | 1 | 1 | 1 |
| 1680 | 40 | 239 | 0.4 | 1 | 1 | 1 |
| 1681 | 40 | 240 | 0.4 | 1 | 1 | 1 |
| 1682 | 40 | 241 | 0.4 | 1 | 1 | 1 |
| 1683 | 40 | 242 | 0.4 | 1 | 1 | 1 |
| 1684 | 40 | 243 | 0.4 | 1 | 1 | 1 |
| 1685 | 40 | 244 | 0.4 | 1 | 1 | 1 |
| 1686 | 40 | 245 | 0.4 | 1 | 1 | 1 |
| 1687 | 40 | 246 | 0.4 | 1 | 1 | 1 |
| 1688 | 40 | 247 | 0.4 | 1 | 1 | 1 |
| 1689 | 40 | 248 | 0.4 | 1 | 1 | 1 |
| 1690 | 40 | 249 | 0.4 | 1 | 1 | 1 |
| 1691 | 40 | 250 | 0.4 | 1 | 1 | 1 |
| 1692 | 40 | 251 | 0.4 | 1 | 1 | 1 |
| 1693 | 40 | 252 | 0.4 | 1 | 1 | 1 |
| 1694 | 40 | 253 | 0.4 | 1 | 1 | 1 |
| 1695 | 40 | 254 | 0.4 | 1 | 1 | 1 |
| 1696 | 40 | 255 | 0.4 | 1 | 1 | 1 |
| 1697 | 40 | 256 | 0.4 | 1 | 1 | 1 |
| 1698 | 40 | 257 | 0.4 | 1 | 1 | 1 |
| 1699 | 40 | 258 | 0.4 | 1 | 1 | 1 |
| 1700 | 40 | 259 | 0.4 | 1 | 1 | 1 |
| 1701 | 40 | 260 | 0.4 | 1 | 1 | 1 |
| 1702 | 40 | 261 | 0.4 | 1 | 1 | 1 |
| 1703 | 40 | 262 | 0.4 | 1 | 1 | 1 |
| 1704 | 40 | 263 | 0.4 | 1 | 1 | 1 |
| 1705 | 40 | 264 | 0.4 | 1 | 1 | 1 |
| 1706 | 40 | 265 | 0.4 | 1 | 1 | 1 |
| 1707 | 40 | 266 | 0.4 | 1 | 1 | 1 |
| 1708 | 40 | 267 | 0.4 | 1 | 1 | 1 |
| 1709 | 40 | 268 | 0.4 | 1 | 1 | 1 |
| 1710 | 40 | 269 | 0.4 | 1 | 1 | 1 |
| 1711 | 40 | 270 | 0.4 | 1 | 1 | 1 |
| 1712 | 40 | 271 | 0.4 | 1 | 1 | 1 |
| 1713 | 40 | 272 | 0.4 | 1 | 1 | 1 |
| 1714 | 40 | 273 | 0.4 | 1 | 1 | 1 |
| 1715 | 40 | 274 | 0.4 | 1 | 1 | 1 |
| 1716 | 40 | 275 | 0.4 | 1 | 1 | 1 |
| 1717 | 40 | 276 | 0.4 | 1 | 1 | 1 |
| 1718 | 40 | 277 | 0.4 | 1 | 1 | 1 |
| 1719 | 40 | 278 | 0.4 | 1 | 1 | 1 |
| 1720 | 40 | 279 | 0.4 | 1 | 1 | 1 |
| 1721 | 40 | 280 | 0.4 | 1 | 1 | 1 |
| 1722 | 40 | 281 | 0.4 | 1 | 1 | 1 |
| 1723 | 40 | 282 | 0.4 | 1 | 1 | 1 |
| 1724 | 40 | 283 | 0.4 | 1 | 1 | 1 |
| 1725 | 40 | 284 | 0.4 | 1 | 1 | 1 |
| 1726 | 40 | 285 | 0.4 | 1 | 1 | 1 |
| 1727 | 40 | 286 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1728 | 40 | 287 | 0.4 | 1 | 1 | 1 |
| 1729 | 40 | 288 | 0.4 | 1 | 1 | 1 |
| 1730 | 40 | 289 | 0.4 | 1 | 1 | 1 |
| 1731 | 40 | 290 | 0.4 | 1 | 1 | 1 |
| 1732 | 40 | 291 | 0.4 | 1 | 1 | 1 |
| 1733 | 40 | 292 | 0.4 | 1 | 1 | 1 |
| 1734 | 40 | 293 | 0.4 | 1 | 1 | 1 |
| 1735 | 40 | 294 | 0.4 | 1 | 1 | 1 |
| 1736 | 40 | 295 | 0.4 | 1 | 1 | 1 |
| 1737 | 40 | 296 | 0.4 | 1 | 1 | 1 |
| 1738 | 40 | 297 | 0.4 | 1 | 1 | 1 |
| 1739 | 40 | 298 | 0.4 | 1 | 1 | 1 |
| 1740 | 40 | 299 | 0.4 | 1 | 1 | 1 |
| 1741 | 40 | 300 | 0.4 | 1 | 1 | 1 |
| 1742 | 40 | 301 | 0.4 | 1 | 1 | 1 |
| 1743 | 40 | 302 | 0.4 | 1 | 1 | 1 |
| 1744 | 40 | 303 | 0.4 | 1 | 1 | 1 |
| 1745 | 40 | 304 | 0.4 | 1 | 1 | 1 |
| 1746 | 40 | 305 | 0.4 | 1 | 1 | 1 |
| 1747 | 40 | 306 | 0.4 | 1 | 1 | 1 |
| 1748 | 40 | 307 | 0.4 | 1 | 1 | 1 |
| 1749 | 40 | 308 | 0.4 | 1 | 1 | 1 |
| 1750 | 40 | 309 | 0.4 | 1 | 1 | 1 |
| 1751 | 40 | 310 | 0.4 | 1 | 1 | 1 |
| 1752 | 40 | 311 | 0.4 | 1 | 1 | 1 |
| 1753 | 40 | 312 | 0.4 | 1 | 1 | 1 |
| 1754 | 40 | 313 | 0.4 | 1 | 1 | 1 |
| 1755 | 40 | 314 | 0.4 | 1 | 1 | 1 |
| 1756 | 40 | 315 | 0.4 | 1 | 1 | 1 |
| 1757 | 40 | 316 | 0.4 | 1 | 1 | 1 |
| 1758 | 40 | 317 | 0.4 | 1 | 1 | 1 |
| 1759 | 40 | 318 | 0.4 | 1 | 1 | 1 |
| 1760 | 40 | 319 | 0.4 | 1 | 1 | 1 |
| 1761 | 40 | 320 | 0.4 | 1 | 1 | 1 |
| 1762 | 40 | 321 | 0.4 | 1 | 1 | 1 |
| 1763 | 40 | 322 | 0.4 | 1 | 1 | 1 |
| 1764 | 40 | 323 | 0.4 | 1 | 1 | 1 |
| 1765 | 40 | 324 | 0.4 | 1 | 1 | 1 |
| 1766 | 40 | 325 | 0.4 | 1 | 1 | 1 |
| 1767 | 40 | 326 | 0.4 | 1 | 1 | 1 |
| 1768 | 40 | 327 | 0.4 | 1 | 1 | 1 |
| 1769 | 40 | 328 | 0.4 | 1 | 1 | 1 |
| 1770 | 40 | 329 | 0.4 | 1 | 1 | 1 |
| 1771 | 40 | 330 | 0.4 | 1 | 1 | 1 |
| 1772 | 40 | 331 | 0.4 | 1 | 1 | 1 |
| 1773 | 40 | 332 | 0.4 | 1 | 1 | 1 |
| 1774 | 40 | 333 | 0.4 | 1 | 1 | 1 |
| 1775 | 40 | 334 | 0.4 | 1 | 1 | 1 |
| 1776 | 40 | 335 | 0.4 | 1 | 1 | 1 |
| 1777 | 40 | 336 | 0.4 | 1 | 1 | 1 |
| 1778 | 40 | 337 | 0.4 | 1 | 1 | 1 |
| 1779 | 40 | 338 | 0.4 | 1 | 1 | 1 |
| 1780 | 40 | 339 | 0.4 | 1 | 1 | 1 |
| 1781 | 40 | 340 | 0.4 | 1 | 1 | 1 |
| 1782 | 40 | 341 | 0.4 | 1 | 1 | 1 |
| 1783 | 40 | 342 | 0.4 | 1 | 1 | 1 |
| 1784 | 40 | 343 | 0.4 | 1 | 1 | 1 |
| 1785 | 40 | 344 | 0.4 | 1 | 1 | 1 |
| 1786 | 40 | 345 | 0.4 | 1 | 1 | 1 |
| 1787 | 40 | 346 | 0.4 | 1 | 1 | 1 |
| 1788 | 40 | 347 | 0.4 | 1 | 1 | 1 |
| 1789 | 40 | 348 | 0.4 | 1 | 1 | 1 |
| 1790 | 40 | 349 | 0.4 | 1 | 1 | 1 |
| 1791 | 40 | 350 | 0.4 | 1 | 1 | 1 |
| 1792 | 40 | 351 | 0.4 | 1 | 1 | 1 |
| 1793 | 40 | 352 | 0.4 | 1 | 1 | 1 |
| 1794 | 40 | 353 | 0.4 | 1 | 1 | 1 |
| 1795 | 40 | 354 | 0.4 | 1 | 1 | 1 |
| 1796 | 40 | 355 | 0.4 | 1 | 1 | 1 |
| 1797 | 40 | 356 | 0.4 | 1 | 1 | 1 |
| 1798 | 40 | 357 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1799 | 40 | 358 | 0.4 | 1 | 1 | 1 |
| 1800 | 40 | 359 | 0.4 | 1 | 1 | 1 |
| 1801 | 50 | 0 | 0.4 | 1 | 1 | 1 |
| 1802 | 50 | 1 | 0.4 | 1 | 1 | 1 |
| 1803 | 50 | 2 | 0.4 | 1 | 1 | 1 |
| 1804 | 50 | 3 | 0.4 | 1 | 1 | 1 |
| 1805 | 50 | 4 | 0.4 | 1 | 1 | 1 |
| 1806 | 50 | 5 | 0.4 | 1 | 1 | 1 |
| 1807 | 50 | 6 | 0.4 | 3 | 1 | 1 |
| 1808 | 50 | 7 | 0.4 | 5 | 1 | 1 |
| 1809 | 50 | 8 | 0.4 | 7 | 1 | 1 |
| 1810 | 50 | 9 | 0.4 | 10 | 1 | 1 |
| 1811 | 50 | 10 | 0.5 | 10 | 1 | 1 |
| 1812 | 50 | 11 | 0.7 | 10 | 1 | 1 |
| 1813 | 50 | 12 | 1 | 10 | 1 | 1 |
| 1814 | 50 | 13 | 2 | 10 | 1 | 1 |
| 1815 | 50 | 14 | 5 | 7 | 1 | 1 |
| 1816 | 50 | 15 | 7 | 7 | 1 | 1 |
| 1817 | 50 | 16 | 7 | 7 | 1 | 1 |
| 1818 | 50 | 17 | 7 | 7 | 1 | 1 |
| 1819 | 50 | 18 | 7 | 7 | 2 | 3 |
| 1820 | 50 | 19 | 7 | 7 | 2 | 3 |
| 1821 | 50 | 20 | 7 | 7 | 2 | 3 |
| 1822 | 50 | 21 | 7 | 7 | 2 | 3 |
| 1823 | 50 | 22 | 7 | 7 | 2 | 3 |
| 1824 | 50 | 23 | 7 | 7 | 2 | 3 |
| 1825 | 50 | 24 | 7 | 7 | 2 | 3 |
| 1826 | 50 | 25 | 7 | 7 | 2 | 3 |
| 1827 | 50 | 26 | 7 | 7 | 2 | 3 |
| 1828 | 50 | 27 | 7 | 7 | 2 | 3 |
| 1829 | 50 | 28 | 7 | 7 | 2 | 3 |
| 1830 | 50 | 29 | 7 | 7 | 2 | 3 |
| 1831 | 50 | 30 | 7 | 7 | 2 | 3 |
| 1832 | 50 | 31 | 7 | 7 | 2 | 3 |
| 1833 | 50 | 32 | 7 | 7 | 2 | 3 |
| 1834 | 50 | 33 | 7 | 7 | 2 | 3 |
| 1835 | 50 | 34 | 7 | 7 | 2 | 3 |
| 1836 | 50 | 35 | 7 | 7 | 2 | 3 |
| 1837 | 50 | 36 | 7 | 7 | 2 | 3 |
| 1838 | 50 | 37 | 5 | 7 | 2 | 3 |
| 1839 | 50 | 38 | 2 | 3 | 1 | 1 |
| 1840 | 50 | 39 | 1 | 1 | 1 | 1 |
| 1841 | 50 | 40 | 0.4 | 1 | 1 | 1 |
| 1842 | 50 | 41 | 0.4 | 1 | 1 | 1 |
| 1843 | 50 | 42 | 0.4 | 1 | 1 | 1 |
| 1844 | 50 | 43 | 0.4 | 1 | 1 | 1 |
| 1845 | 50 | 44 | 0.4 | 1 | 1 | 1 |
| 1846 | 50 | 45 | 0.4 | 1 | 1 | 1 |
| 1847 | 50 | 46 | 0.4 | 1 | 1 | 1 |
| 1848 | 50 | 47 | 0.4 | 1 | 1 | 1 |
| 1849 | 50 | 48 | 0.4 | 1 | 1 | 1 |
| 1850 | 50 | 49 | 0.4 | 1 | 1 | 1 |
| 1851 | 50 | 50 | 0.4 | 1 | 1 | 1 |
| 1852 | 50 | 51 | 0.4 | 1 | 1 | 1 |
| 1853 | 50 | 52 | 0.4 | 1 | 1 | 1 |
| 1854 | 50 | 53 | 0.4 | 1 | 1 | 1 |
| 1855 | 50 | 54 | 0.4 | 1 | 1 | 1 |
| 1856 | 50 | 55 | 0.4 | 1 | 1 | 1 |
| 1857 | 50 | 56 | 0.4 | 1 | 1 | 1 |
| 1858 | 50 | 57 | 0.4 | 1 | 1 | 1 |
| 1859 | 50 | 58 | 0.4 | 1 | 1 | 1 |
| 1860 | 50 | 59 | 0.4 | 1 | 1 | 1 |
| 1861 | 50 | 60 | 0.4 | 1 | 1 | 1 |
| 1862 | 50 | 61 | 0.4 | 1 | 1 | 1 |
| 1863 | 50 | 62 | 0.4 | 1 | 1 | 1 |
| 1864 | 50 | 63 | 0.4 | 1 | 1 | 1 |
| 1865 | 50 | 64 | 0.4 | 1 | 1 | 1 |
| 1866 | 50 | 65 | 0.4 | 1 | 1 | 1 |
| 1867 | 50 | 66 | 0.4 | 1 | 1 | 1 |
| 1868 | 50 | 67 | 0.4 | 1 | 1 | 1 |
| 1869 | 50 | 68 | 0.4 | 1 | 1 | 1 |

APPENDIX 1-continued

| Index | Elevation Angle (degrees) | Relative Azimuth (degrees) | Atten-uation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1870 | 50 | 69 | 0.4 | 1 | 1 | 1 |
| 1871 | 50 | 70 | 0.4 | 1 | 1 | 1 |
| 1872 | 50 | 71 | 0.4 | 1 | 1 | 1 |
| 1873 | 50 | 72 | 0.4 | 1 | 1 | 1 |
| 1874 | 50 | 73 | 0.4 | 1 | 1 | 1 |
| 1875 | 50 | 74 | 0.4 | 1 | 1 | 1 |
| 1876 | 50 | 75 | 0.4 | 1 | 1 | 1 |
| 1877 | 50 | 76 | 0.4 | 1 | 1 | 1 |
| 1878 | 50 | 77 | 0.4 | 1 | 1 | 1 |
| 1879 | 50 | 78 | 0.4 | 1 | 1 | 1 |
| 1880 | 50 | 79 | 0.4 | 1 | 1 | 1 |
| 1881 | 50 | 80 | 0.4 | 1 | 1 | 1 |
| 1882 | 50 | 81 | 0.4 | 1 | 1 | 1 |
| 1883 | 50 | 82 | 0.4 | 1 | 1 | 1 |
| 1884 | 50 | 83 | 0.4 | 1 | 1 | 1 |
| 1885 | 50 | 84 | 0.4 | 1 | 1 | 1 |
| 1886 | 50 | 85 | 0.4 | 1 | 1 | 1 |
| 1887 | 50 | 86 | 0.4 | 1 | 1 | 1 |
| 1888 | 50 | 87 | 0.4 | 1 | 1 | 1 |
| 1889 | 50 | 88 | 0.4 | 1 | 1 | 1 |
| 1890 | 50 | 89 | 0.4 | 1 | 1 | 1 |
| 1891 | 50 | 90 | 0.4 | 1 | 1 | 1 |
| 1892 | 50 | 91 | 0.4 | 1 | 1 | 1 |
| 1893 | 50 | 92 | 0.4 | 1 | 1 | 1 |
| 1894 | 50 | 93 | 0.4 | 1 | 1 | 1 |
| 1895 | 50 | 94 | 0.4 | 1 | 1 | 1 |
| 1896 | 50 | 95 | 0.4 | 1 | 1 | 1 |
| 1897 | 50 | 96 | 0.4 | 1 | 1 | 1 |
| 1898 | 50 | 97 | 0.4 | 1 | 1 | 1 |
| 1899 | 50 | 98 | 0.4 | 1 | 1 | 1 |
| 1900 | 50 | 99 | 0.4 | 1 | 1 | 1 |
| 1901 | 50 | 100 | 0.4 | 1 | 1 | 1 |
| 1902 | 50 | 101 | 0.4 | 1 | 1 | 1 |
| 1903 | 50 | 102 | 0.4 | 1 | 1 | 1 |
| 1904 | 50 | 103 | 0.4 | 1 | 1 | 1 |
| 1905 | 50 | 104 | 0.4 | 1 | 1 | 1 |
| 1906 | 50 | 105 | 0.4 | 1 | 1 | 1 |
| 1907 | 50 | 106 | 0.4 | 1 | 1 | 1 |
| 1908 | 50 | 107 | 0.4 | 1 | 1 | 1 |
| 1909 | 50 | 108 | 0.4 | 1 | 1 | 1 |
| 1910 | 50 | 109 | 0.4 | 1 | 1 | 1 |
| 1911 | 50 | 110 | 0.4 | 1 | 1 | 1 |
| 1912 | 50 | 111 | 0.4 | 1 | 1 | 1 |
| 1913 | 50 | 112 | 0.4 | 1 | 1 | 1 |
| 1914 | 50 | 113 | 0.4 | 1 | 1 | 1 |
| 1915 | 50 | 114 | 0.4 | 1 | 1 | 1 |
| 1916 | 50 | 115 | 0.4 | 1 | 1 | 1 |
| 1917 | 50 | 116 | 0.4 | 1 | 1 | 1 |
| 1918 | 50 | 117 | 0.4 | 1 | 1 | 1 |
| 1919 | 50 | 118 | 0.4 | 1 | 1 | 1 |
| 1920 | 50 | 119 | 0.4 | 1 | 1 | 1 |
| 1921 | 50 | 120 | 0.4 | 1 | 1 | 1 |
| 1922 | 50 | 121 | 0.4 | 1 | 1 | 1 |
| 1923 | 50 | 122 | 0.4 | 1 | 1 | 1 |
| 1924 | 50 | 123 | 0.4 | 1 | 1 | 1 |
| 1925 | 50 | 124 | 0.4 | 1 | 1 | 1 |
| 1926 | 50 | 125 | 0.4 | 1 | 1 | 1 |
| 1927 | 50 | 126 | 0.4 | 1 | 1 | 1 |
| 1928 | 50 | 127 | 0.4 | 1 | 1 | 1 |
| 1929 | 50 | 128 | 0.4 | 1 | 1 | 1 |
| 1930 | 50 | 129 | 0.4 | 1 | 1 | 1 |
| 1931 | 50 | 130 | 0.4 | 1 | 1 | 1 |
| 1932 | 50 | 131 | 0.4 | 1 | 1 | 1 |
| 1933 | 50 | 132 | 0.4 | 1 | 1 | 1 |
| 1934 | 50 | 133 | 0.4 | 1 | 1 | 1 |
| 1935 | 50 | 134 | 0.4 | 1 | 1 | 1 |
| 1936 | 50 | 135 | 0.4 | 1 | 1 | 1 |
| 1937 | 50 | 136 | 0.4 | 1 | 1 | 1 |
| 1938 | 50 | 137 | 0.4 | 1 | 1 | 1 |
| 1939 | 50 | 138 | 0.4 | 1 | 1 | 1 |
| 1940 | 50 | 139 | 0.4 | 1 | 1 | 1 |

APPENDIX 1-continued

| Index | Elevation Angle (degrees) | Relative Azimuth (degrees) | Atten-uation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 1941 | 50 | 140 | 0.4 | 1 | 1 | 1 |
| 1942 | 50 | 141 | 0.4 | 1 | 1 | 1 |
| 1943 | 50 | 142 | 0.4 | 1 | 1 | 1 |
| 1944 | 50 | 143 | 0.4 | 1 | 1 | 1 |
| 1945 | 50 | 144 | 0.4 | 1 | 1 | 1 |
| 1946 | 50 | 145 | 0.4 | 1 | 1 | 1 |
| 1947 | 50 | 146 | 0.4 | 1 | 1 | 1 |
| 1948 | 50 | 147 | 0.4 | 1 | 1 | 1 |
| 1949 | 50 | 148 | 0.4 | 1 | 1 | 1 |
| 1950 | 50 | 149 | 0.4 | 1 | 1 | 1 |
| 1951 | 50 | 150 | 0.4 | 1 | 1 | 1 |
| 1952 | 50 | 151 | 0.4 | 1 | 1 | 1 |
| 1953 | 50 | 152 | 0.4 | 1 | 1 | 1 |
| 1954 | 50 | 153 | 0.4 | 1 | 1 | 1 |
| 1955 | 50 | 154 | 0.4 | 1 | 1 | 1 |
| 1956 | 50 | 155 | 0.4 | 1 | 1 | 1 |
| 1957 | 50 | 156 | 0.4 | 1 | 1 | 1 |
| 1958 | 50 | 157 | 0.4 | 1 | 1 | 1 |
| 1959 | 50 | 158 | 0.4 | 1 | 1 | 1 |
| 1960 | 50 | 159 | 0.4 | 1 | 1 | 1 |
| 1961 | 50 | 160 | 0.4 | 1 | 1 | 1 |
| 1962 | 50 | 161 | 0.4 | 1 | 1 | 1 |
| 1963 | 50 | 162 | 0.4 | 1 | 1 | 1 |
| 1964 | 50 | 163 | 0.4 | 1 | 1 | 1 |
| 1965 | 50 | 164 | 0.4 | 1 | 1 | 1 |
| 1966 | 50 | 165 | 0.4 | 1 | 1 | 1 |
| 1967 | 50 | 166 | 0.4 | 1 | 1 | 1 |
| 1968 | 50 | 167 | 0.4 | 1 | 1 | 1 |
| 1969 | 50 | 168 | 0.4 | 1 | 1 | 1 |
| 1970 | 50 | 169 | 0.4 | 1 | 1 | 1 |
| 1971 | 50 | 170 | 0.4 | 1 | 1 | 1 |
| 1972 | 50 | 171 | 0.4 | 1 | 1 | 1 |
| 1973 | 50 | 172 | 0.4 | 1 | 1 | 1 |
| 1974 | 50 | 173 | 0.4 | 1 | 1 | 1 |
| 1975 | 50 | 174 | 0.4 | 1 | 1 | 1 |
| 1976 | 50 | 175 | 0.4 | 1 | 1 | 1 |
| 1977 | 50 | 176 | 0.4 | 1 | 1 | 1 |
| 1978 | 50 | 177 | 0.4 | 1 | 1 | 1 |
| 1979 | 50 | 178 | 0.4 | 1 | 1 | 1 |
| 1980 | 50 | 179 | 0.4 | 1 | 1 | 1 |
| 1981 | 50 | 180 | 0.4 | 1 | 1 | 1 |
| 1982 | 50 | 181 | 0.4 | 1 | 1 | 1 |
| 1983 | 50 | 182 | 0.4 | 1 | 1 | 1 |
| 1984 | 50 | 183 | 0.4 | 1 | 1 | 1 |
| 1985 | 50 | 184 | 0.4 | 1 | 1 | 1 |
| 1986 | 50 | 185 | 0.4 | 1 | 1 | 1 |
| 1987 | 50 | 186 | 0.4 | 1 | 1 | 1 |
| 1988 | 50 | 187 | 0.4 | 1 | 1 | 1 |
| 1989 | 50 | 188 | 0.4 | 1 | 1 | 1 |
| 1990 | 50 | 189 | 0.4 | 1 | 1 | 1 |
| 1991 | 50 | 190 | 0.4 | 1 | 1 | 1 |
| 1992 | 50 | 191 | 0.4 | 1 | 1 | 1 |
| 1993 | 50 | 192 | 0.4 | 1 | 1 | 1 |
| 1994 | 50 | 193 | 0.4 | 1 | 1 | 1 |
| 1995 | 50 | 194 | 0.4 | 1 | 1 | 1 |
| 1996 | 50 | 195 | 0.4 | 1 | 1 | 1 |
| 1997 | 50 | 196 | 0.4 | 1 | 1 | 1 |
| 1998 | 50 | 197 | 0.4 | 1 | 1 | 1 |
| 1999 | 50 | 198 | 0.4 | 1 | 1 | 1 |
| 2000 | 50 | 199 | 0.4 | 1 | 1 | 1 |
| 2001 | 50 | 200 | 0.4 | 1 | 1 | 1 |
| 2002 | 50 | 201 | 0.4 | 1 | 1 | 1 |
| 2003 | 50 | 202 | 0.4 | 1 | 1 | 1 |
| 2004 | 50 | 203 | 0.4 | 1 | 1 | 1 |
| 2005 | 50 | 204 | 0.4 | 1 | 1 | 1 |
| 2006 | 50 | 205 | 0.4 | 1 | 1 | 1 |
| 2007 | 50 | 206 | 0.4 | 1 | 1 | 1 |
| 2008 | 50 | 207 | 0.4 | 1 | 1 | 1 |
| 2009 | 50 | 208 | 0.4 | 1 | 1 | 1 |
| 2010 | 50 | 209 | 0.4 | 1 | 1 | 1 |
| 2011 | 50 | 210 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2012 | 50 | 211 | 0.4 | 1 | 1 | 1 |
| 2013 | 50 | 212 | 0.4 | 1 | 1 | 1 |
| 2014 | 50 | 213 | 0.4 | 1 | 1 | 1 |
| 2015 | 50 | 214 | 0.4 | 1 | 1 | 1 |
| 2016 | 50 | 215 | 0.4 | 1 | 1 | 1 |
| 2017 | 50 | 216 | 0.4 | 1 | 2 | 3 |
| 2018 | 50 | 217 | 0.4 | 1 | 2 | 3 |
| 2019 | 50 | 218 | 0.4 | 1 | 2 | 3 |
| 2020 | 50 | 219 | 0.4 | 1 | 2 | 3 |
| 2021 | 50 | 220 | 0.4 | 1 | 2 | 3 |
| 2022 | 50 | 221 | 0.4 | 1 | 2 | 3 |
| 2023 | 50 | 222 | 0.4 | 1 | 2 | 3 |
| 2024 | 50 | 223 | 0.4 | 1 | 2 | 3 |
| 2025 | 50 | 224 | 0.4 | 1 | 2 | 3 |
| 2026 | 50 | 225 | 0.4 | 1 | 2 | 3 |
| 2027 | 50 | 226 | 0.4 | 1 | 2 | 3 |
| 2028 | 50 | 227 | 0.4 | 1 | 2 | 3 |
| 2029 | 50 | 228 | 0.4 | 1 | 2 | 3 |
| 2030 | 50 | 229 | 0.4 | 1 | 2 | 3 |
| 2031 | 50 | 230 | 0.4 | 1 | 2 | 3 |
| 2032 | 50 | 231 | 0.4 | 1 | 2 | 3 |
| 2033 | 50 | 232 | 0.4 | 1 | 2 | 3 |
| 2034 | 50 | 233 | 0.4 | 1 | 2 | 2 |
| 2035 | 50 | 234 | 0.4 | 1 | 2 | 2 |
| 2036 | 50 | 235 | 0.4 | 1 | 1 | 1 |
| 2037 | 50 | 236 | 0.4 | 1 | 1 | 1 |
| 2038 | 50 | 237 | 0.4 | 1 | 1 | 1 |
| 2039 | 50 | 238 | 0.4 | 1 | 1 | 1 |
| 2040 | 50 | 239 | 0.4 | 1 | 1 | 1 |
| 2041 | 50 | 240 | 0.4 | 1 | 1 | 1 |
| 2042 | 50 | 241 | 0.4 | 1 | 1 | 1 |
| 2043 | 50 | 242 | 0.4 | 1 | 1 | 1 |
| 2044 | 50 | 243 | 0.4 | 1 | 1 | 1 |
| 2045 | 50 | 244 | 0.4 | 1 | 1 | 1 |
| 2046 | 50 | 245 | 0.4 | 1 | 1 | 1 |
| 2047 | 50 | 246 | 0.4 | 1 | 1 | 1 |
| 2048 | 50 | 247 | 0.4 | 1 | 1 | 1 |
| 2049 | 50 | 248 | 0.4 | 1 | 1 | 1 |
| 2050 | 50 | 249 | 0.4 | 1 | 1 | 1 |
| 2051 | 50 | 250 | 0.4 | 1 | 1 | 1 |
| 2052 | 50 | 251 | 0.4 | 1 | 1 | 1 |
| 2053 | 50 | 252 | 0.4 | 1 | 1 | 1 |
| 2054 | 50 | 253 | 0.4 | 1 | 1 | 1 |
| 2055 | 50 | 254 | 0.4 | 1 | 1 | 1 |
| 2056 | 50 | 255 | 0.4 | 1 | 1 | 1 |
| 2057 | 50 | 256 | 0.4 | 1 | 1 | 1 |
| 2058 | 50 | 257 | 0.4 | 1 | 1 | 1 |
| 2059 | 50 | 258 | 0.4 | 1 | 1 | 1 |
| 2060 | 50 | 259 | 0.4 | 1 | 1 | 1 |
| 2061 | 50 | 260 | 0.4 | 1 | 1 | 1 |
| 2062 | 50 | 261 | 0.4 | 1 | 1 | 1 |
| 2063 | 50 | 262 | 0.4 | 1 | 1 | 1 |
| 2064 | 50 | 263 | 0.4 | 1 | 1 | 1 |
| 2065 | 50 | 264 | 0.4 | 1 | 1 | 1 |
| 2066 | 50 | 265 | 0.4 | 1 | 1 | 1 |
| 2067 | 50 | 266 | 0.4 | 1 | 1 | 1 |
| 2068 | 50 | 267 | 0.4 | 1 | 1 | 1 |
| 2069 | 50 | 268 | 0.4 | 1 | 1 | 1 |
| 2070 | 50 | 269 | 0.4 | 1 | 1 | 1 |
| 2071 | 50 | 270 | 0.4 | 1 | 1 | 1 |
| 2072 | 50 | 271 | 0.4 | 1 | 1 | 1 |
| 2073 | 50 | 272 | 0.4 | 1 | 1 | 1 |
| 2074 | 50 | 273 | 0.4 | 1 | 1 | 1 |
| 2075 | 50 | 274 | 0.4 | 1 | 1 | 1 |
| 2076 | 50 | 275 | 0.4 | 1 | 1 | 1 |
| 2077 | 50 | 276 | 0.4 | 1 | 1 | 1 |
| 2078 | 50 | 277 | 0.4 | 1 | 1 | 1 |
| 2079 | 50 | 278 | 0.4 | 1 | 1 | 1 |
| 2080 | 50 | 279 | 0.4 | 1 | 1 | 1 |
| 2081 | 50 | 280 | 0.4 | 1 | 1 | 1 |
| 2082 | 50 | 281 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2083 | 50 | 282 | 0.4 | 1 | 1 | 1 |
| 2084 | 50 | 283 | 0.4 | 1 | 1 | 1 |
| 2085 | 50 | 284 | 0.4 | 1 | 1 | 1 |
| 2086 | 50 | 285 | 0.4 | 1 | 1 | 1 |
| 2087 | 50 | 286 | 0.4 | 1 | 1 | 1 |
| 2088 | 50 | 287 | 0.4 | 1 | 1 | 1 |
| 2089 | 50 | 288 | 0.4 | 1 | 1 | 1 |
| 2090 | 50 | 289 | 0.4 | 1 | 1 | 1 |
| 2091 | 50 | 290 | 0.4 | 1 | 1 | 1 |
| 2092 | 50 | 291 | 0.4 | 1 | 1 | 1 |
| 2093 | 50 | 292 | 0.4 | 1 | 1 | 1 |
| 2094 | 50 | 293 | 0.4 | 1 | 1 | 1 |
| 2095 | 50 | 294 | 0.4 | 1 | 1 | 1 |
| 2096 | 50 | 295 | 0.4 | 1 | 1 | 1 |
| 2097 | 50 | 296 | 0.4 | 1 | 1 | 1 |
| 2098 | 50 | 297 | 0.4 | 1 | 1 | 1 |
| 2099 | 50 | 298 | 0.4 | 1 | 1 | 1 |
| 2100 | 50 | 299 | 0.4 | 1 | 1 | 1 |
| 2101 | 50 | 300 | 0.4 | 1 | 1 | 1 |
| 2102 | 50 | 301 | 0.4 | 1 | 1 | 1 |
| 2103 | 50 | 302 | 0.4 | 1 | 1 | 1 |
| 2104 | 50 | 303 | 0.4 | 1 | 1 | 1 |
| 2105 | 50 | 304 | 0.4 | 1 | 1 | 1 |
| 2106 | 50 | 305 | 0.4 | 1 | 1 | 1 |
| 2107 | 50 | 306 | 0.4 | 1 | 1 | 1 |
| 2108 | 50 | 307 | 0.4 | 1 | 1 | 1 |
| 2109 | 50 | 308 | 0.4 | 1 | 1 | 1 |
| 2110 | 50 | 309 | 0.4 | 1 | 1 | 1 |
| 2111 | 50 | 310 | 0.4 | 1 | 1 | 1 |
| 2112 | 50 | 311 | 0.4 | 1 | 1 | 1 |
| 2113 | 50 | 312 | 0.4 | 1 | 1 | 1 |
| 2114 | 50 | 313 | 0.4 | 1 | 1 | 1 |
| 2115 | 50 | 314 | 0.4 | 1 | 1 | 1 |
| 2116 | 50 | 315 | 0.4 | 1 | 1 | 1 |
| 2117 | 50 | 316 | 0.4 | 1 | 1 | 1 |
| 2118 | 50 | 317 | 0.4 | 1 | 1 | 1 |
| 2119 | 50 | 318 | 0.4 | 1 | 1 | 1 |
| 2120 | 50 | 319 | 0.4 | 1 | 1 | 1 |
| 2121 | 50 | 320 | 0.4 | 1 | 1 | 1 |
| 2122 | 50 | 321 | 0.4 | 1 | 1 | 1 |
| 2123 | 50 | 322 | 0.4 | 1 | 1 | 1 |
| 2124 | 50 | 323 | 0.4 | 1 | 1 | 1 |
| 2125 | 50 | 324 | 0.4 | 1 | 1 | 1 |
| 2126 | 50 | 325 | 0.4 | 1 | 1 | 1 |
| 2127 | 50 | 326 | 0.4 | 1 | 1 | 1 |
| 2128 | 50 | 327 | 0.4 | 1 | 1 | 1 |
| 2129 | 50 | 328 | 0.4 | 1 | 1 | 1 |
| 2130 | 50 | 329 | 0.4 | 1 | 1 | 1 |
| 2131 | 50 | 330 | 0.4 | 1 | 1 | 1 |
| 2132 | 50 | 331 | 0.4 | 1 | 1 | 1 |
| 2133 | 50 | 332 | 0.4 | 1 | 1 | 1 |
| 2134 | 50 | 333 | 0.4 | 1 | 1 | 1 |
| 2135 | 50 | 334 | 0.4 | 1 | 1 | 1 |
| 2136 | 50 | 335 | 0.4 | 1 | 1 | 1 |
| 2137 | 50 | 336 | 0.4 | 1 | 1 | 1 |
| 2138 | 50 | 337 | 0.4 | 1 | 1 | 1 |
| 2139 | 50 | 338 | 0.4 | 1 | 1 | 1 |
| 2140 | 50 | 339 | 0.4 | 1 | 1 | 1 |
| 2141 | 50 | 340 | 0.4 | 1 | 1 | 1 |
| 2142 | 50 | 341 | 0.4 | 1 | 1 | 1 |
| 2143 | 50 | 342 | 0.4 | 1 | 1 | 1 |
| 2144 | 50 | 343 | 0.4 | 1 | 1 | 1 |
| 2145 | 50 | 344 | 0.4 | 1 | 1 | 1 |
| 2146 | 50 | 345 | 0.4 | 1 | 1 | 1 |
| 2147 | 50 | 346 | 0.4 | 1 | 1 | 1 |
| 2148 | 50 | 347 | 0.4 | 1 | 1 | 1 |
| 2149 | 50 | 348 | 0.4 | 1 | 1 | 1 |
| 2150 | 50 | 349 | 0.4 | 1 | 1 | 1 |
| 2151 | 50 | 350 | 0.4 | 1 | 1 | 1 |
| 2152 | 50 | 351 | 0.4 | 1 | 1 | 1 |
| 2153 | 50 | 352 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2154 | 50 | 353 | 0.4 | 1 | 1 | 1 |
| 2155 | 50 | 354 | 0.4 | 1 | 1 | 1 |
| 2156 | 50 | 355 | 0.4 | 1 | 1 | 1 |
| 2157 | 50 | 356 | 0.4 | 1 | 1 | 1 |
| 2158 | 50 | 357 | 0.4 | 1 | 1 | 1 |
| 2159 | 50 | 358 | 0.4 | 1 | 1 | 1 |
| 2160 | 50 | 359 | 0.4 | 1 | 1 | 1 |
| 2161 | 60 | 0 | 0.4 | 1 | 1 | 1 |
| 2162 | 60 | 1 | 0.4 | 1 | 1 | 1 |
| 2163 | 60 | 2 | 0.4 | 1 | 1 | 1 |
| 2164 | 60 | 3 | 0.4 | 1 | 1 | 1 |
| 2165 | 60 | 4 | 0.4 | 1 | 1 | 1 |
| 2166 | 60 | 5 | 0.4 | 1 | 1 | 1 |
| 2167 | 60 | 6 | 0.4 | 1 | 1 | 1 |
| 2168 | 60 | 7 | 0.4 | 1 | 1 | 1 |
| 2169 | 60 | 8 | 0.4 | 1 | 1 | 1 |
| 2170 | 60 | 9 | 0.4 | 1 | 1 | 1 |
| 2171 | 60 | 10 | 0.4 | 1 | 1 | 1 |
| 2172 | 60 | 11 | 0.4 | 1 | 1 | 1 |
| 2173 | 60 | 12 | 0.4 | 1 | 1 | 1 |
| 2174 | 60 | 13 | 0.4 | 1 | 1 | 1 |
| 2175 | 60 | 14 | 0.4 | 1 | 1 | 1 |
| 2176 | 60 | 15 | 0.4 | 1 | 1 | 1 |
| 2177 | 60 | 16 | 0.4 | 1 | 1 | 1 |
| 2178 | 60 | 17 | 0.4 | 1 | 1 | 1 |
| 2179 | 60 | 18 | 0.4 | 1 | 1 | 1 |
| 2180 | 60 | 19 | 0.4 | 1 | 1 | 1 |
| 2181 | 60 | 20 | 0.4 | 1 | 1 | 1 |
| 2182 | 60 | 21 | 0.4 | 1 | 1 | 1 |
| 2183 | 60 | 22 | 0.4 | 1 | 1 | 1 |
| 2184 | 60 | 23 | 0.4 | 1 | 1 | 1 |
| 2185 | 60 | 24 | 0.4 | 1 | 1 | 1 |
| 2186 | 60 | 25 | 0.4 | 1 | 1 | 1 |
| 2187 | 60 | 26 | 0.4 | 1 | 1 | 1 |
| 2188 | 60 | 27 | 0.4 | 1 | 1 | 1 |
| 2189 | 60 | 28 | 0.4 | 1 | 1 | 1 |
| 2190 | 60 | 29 | 0.4 | 1 | 1 | 1 |
| 2191 | 60 | 30 | 0.4 | 1 | 1 | 1 |
| 2192 | 60 | 31 | 0.4 | 1 | 1 | 1 |
| 2193 | 60 | 32 | 0.4 | 1 | 1 | 1 |
| 2194 | 60 | 33 | 0.4 | 1 | 1 | 1 |
| 2195 | 60 | 34 | 0.4 | 1 | 1 | 1 |
| 2196 | 60 | 35 | 0.4 | 1 | 1 | 1 |
| 2197 | 60 | 36 | 0.4 | 1 | 1 | 1 |
| 2198 | 60 | 37 | 0.4 | 1 | 1 | 1 |
| 2199 | 60 | 38 | 0.4 | 1 | 1 | 1 |
| 2200 | 60 | 39 | 0.4 | 1 | 1 | 1 |
| 2201 | 60 | 40 | 0.4 | 1 | 1 | 1 |
| 2202 | 60 | 41 | 0.4 | 1 | 1 | 1 |
| 2203 | 60 | 42 | 0.4 | 1 | 1 | 1 |
| 2204 | 60 | 43 | 0.4 | 1 | 1 | 1 |
| 2205 | 60 | 44 | 0.4 | 1 | 1 | 1 |
| 2206 | 60 | 45 | 0.4 | 1 | 1 | 1 |
| 2207 | 60 | 46 | 0.4 | 1 | 1 | 1 |
| 2208 | 60 | 47 | 0.4 | 1 | 1 | 1 |
| 2209 | 60 | 48 | 0.4 | 1 | 1 | 1 |
| 2210 | 60 | 49 | 0.4 | 1 | 1 | 1 |
| 2211 | 60 | 50 | 0.4 | 1 | 1 | 1 |
| 2212 | 60 | 51 | 0.4 | 1 | 1 | 1 |
| 2213 | 60 | 52 | 0.4 | 1 | 1 | 1 |
| 2214 | 60 | 53 | 0.4 | 1 | 1 | 1 |
| 2215 | 60 | 54 | 0.4 | 1 | 1 | 1 |
| 2216 | 60 | 55 | 0.4 | 1 | 1 | 1 |
| 2217 | 60 | 56 | 0.4 | 1 | 1 | 1 |
| 2218 | 60 | 57 | 0.4 | 1 | 1 | 1 |
| 2219 | 60 | 58 | 0.4 | 1 | 1 | 1 |
| 2220 | 60 | 59 | 0.4 | 1 | 1 | 1 |
| 2221 | 60 | 60 | 0.4 | 1 | 1 | 1 |
| 2222 | 60 | 61 | 0.4 | 1 | 1 | 1 |
| 2223 | 60 | 62 | 0.4 | 1 | 1 | 1 |
| 2224 | 60 | 63 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2225 | 60 | 64 | 0.4 | 1 | 1 | 1 |
| 2226 | 60 | 65 | 0.4 | 1 | 1 | 1 |
| 2227 | 60 | 66 | 0.4 | 1 | 1 | 1 |
| 2228 | 60 | 67 | 0.4 | 1 | 1 | 1 |
| 2229 | 60 | 68 | 0.4 | 1 | 1 | 1 |
| 2230 | 60 | 69 | 0.4 | 1 | 1 | 1 |
| 2231 | 60 | 70 | 0.4 | 1 | 1 | 1 |
| 2232 | 60 | 71 | 0.4 | 1 | 1 | 1 |
| 2233 | 60 | 72 | 0.4 | 1 | 1 | 1 |
| 2234 | 60 | 73 | 0.4 | 1 | 1 | 1 |
| 2235 | 60 | 74 | 0.4 | 1 | 1 | 1 |
| 2236 | 60 | 75 | 0.4 | 1 | 1 | 1 |
| 2237 | 60 | 76 | 0.4 | 1 | 1 | 1 |
| 2238 | 60 | 77 | 0.4 | 1 | 1 | 1 |
| 2239 | 60 | 78 | 0.4 | 1 | 1 | 1 |
| 2240 | 60 | 79 | 0.4 | 1 | 1 | 1 |
| 2241 | 60 | 80 | 0.4 | 1 | 1 | 1 |
| 2242 | 60 | 81 | 0.4 | 1 | 1 | 1 |
| 2243 | 60 | 82 | 0.4 | 1 | 1 | 1 |
| 2244 | 60 | 83 | 0.4 | 1 | 1 | 1 |
| 2245 | 60 | 84 | 0.4 | 1 | 1 | 1 |
| 2246 | 60 | 85 | 0.4 | 1 | 1 | 1 |
| 2247 | 60 | 86 | 0.4 | 1 | 1 | 1 |
| 2248 | 60 | 87 | 0.4 | 1 | 1 | 1 |
| 2249 | 60 | 88 | 0.4 | 1 | 1 | 1 |
| 2250 | 60 | 89 | 0.4 | 1 | 1 | 1 |
| 2251 | 60 | 90 | 0.4 | 1 | 1 | 1 |
| 2252 | 60 | 91 | 0.4 | 1 | 1 | 1 |
| 2253 | 60 | 92 | 0.4 | 1 | 1 | 1 |
| 2254 | 60 | 93 | 0.4 | 1 | 1 | 1 |
| 2255 | 60 | 94 | 0.4 | 1 | 1 | 1 |
| 2256 | 60 | 95 | 0.4 | 1 | 1 | 1 |
| 2257 | 60 | 96 | 0.4 | 1 | 1 | 1 |
| 2258 | 60 | 97 | 0.4 | 1 | 1 | 1 |
| 2259 | 60 | 98 | 0.4 | 1 | 1 | 1 |
| 2260 | 60 | 99 | 0.4 | 1 | 1 | 1 |
| 2261 | 60 | 100 | 0.4 | 1 | 1 | 1 |
| 2262 | 60 | 101 | 0.4 | 1 | 1 | 1 |
| 2263 | 60 | 102 | 0.4 | 1 | 1 | 1 |
| 2264 | 60 | 103 | 0.4 | 1 | 1 | 1 |
| 2265 | 60 | 104 | 0.4 | 1 | 1 | 1 |
| 2266 | 60 | 105 | 0.4 | 1 | 1 | 1 |
| 2267 | 60 | 106 | 0.4 | 1 | 1 | 1 |
| 2268 | 60 | 107 | 0.4 | 1 | 1 | 1 |
| 2269 | 60 | 108 | 0.4 | 1 | 1 | 1 |
| 2270 | 60 | 109 | 0.4 | 1 | 1 | 1 |
| 2271 | 60 | 110 | 0.4 | 1 | 1 | 1 |
| 2272 | 60 | 111 | 0.4 | 1 | 1 | 1 |
| 2273 | 60 | 112 | 0.4 | 1 | 1 | 1 |
| 2274 | 60 | 113 | 0.4 | 1 | 1 | 1 |
| 2275 | 60 | 114 | 0.4 | 1 | 1 | 1 |
| 2276 | 60 | 115 | 0.4 | 1 | 1 | 1 |
| 2277 | 60 | 116 | 0.4 | 1 | 1 | 1 |
| 2278 | 60 | 117 | 0.4 | 1 | 1 | 1 |
| 2279 | 60 | 118 | 0.4 | 1 | 1 | 1 |
| 2280 | 60 | 119 | 0.4 | 1 | 1 | 1 |
| 2281 | 60 | 120 | 0.4 | 1 | 1 | 1 |
| 2282 | 60 | 121 | 0.4 | 1 | 1 | 1 |
| 2283 | 60 | 122 | 0.4 | 1 | 1 | 1 |
| 2284 | 60 | 123 | 0.4 | 1 | 1 | 1 |
| 2285 | 60 | 124 | 0.4 | 1 | 1 | 1 |
| 2286 | 60 | 125 | 0.4 | 1 | 1 | 1 |
| 2287 | 60 | 126 | 0.4 | 1 | 1 | 1 |
| 2288 | 60 | 127 | 0.4 | 1 | 1 | 1 |
| 2289 | 60 | 128 | 0.4 | 1 | 1 | 1 |
| 2290 | 60 | 129 | 0.4 | 1 | 1 | 1 |
| 2291 | 60 | 130 | 0.4 | 1 | 1 | 1 |
| 2292 | 60 | 131 | 0.4 | 1 | 1 | 1 |
| 2293 | 60 | 132 | 0.4 | 1 | 1 | 1 |
| 2294 | 60 | 133 | 0.4 | 1 | 1 | 1 |
| 2295 | 60 | 134 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2296 | 60 | 135 | 0.4 | 1 | 1 | 1 |
| 2297 | 60 | 136 | 0.4 | 1 | 1 | 1 |
| 2298 | 60 | 137 | 0.4 | 1 | 1 | 1 |
| 2299 | 60 | 138 | 0.4 | 1 | 1 | 1 |
| 2300 | 60 | 139 | 0.4 | 1 | 1 | 1 |
| 2301 | 60 | 140 | 0.4 | 1 | 1 | 1 |
| 2302 | 60 | 141 | 0.4 | 1 | 1 | 1 |
| 2303 | 60 | 142 | 0.4 | 1 | 1 | 1 |
| 2304 | 60 | 143 | 0.4 | 1 | 1 | 1 |
| 2305 | 60 | 144 | 0.4 | 1 | 1 | 1 |
| 2306 | 60 | 145 | 0.4 | 1 | 1 | 1 |
| 2307 | 60 | 146 | 0.4 | 1 | 1 | 1 |
| 2308 | 60 | 147 | 0.4 | 1 | 1 | 1 |
| 2309 | 60 | 148 | 0.4 | 1 | 1 | 1 |
| 2310 | 60 | 149 | 0.4 | 1 | 1 | 1 |
| 2311 | 60 | 150 | 0.4 | 1 | 1 | 1 |
| 2312 | 60 | 151 | 0.4 | 1 | 1 | 1 |
| 2313 | 60 | 152 | 0.4 | 1 | 1 | 1 |
| 2314 | 60 | 153 | 0.4 | 1 | 1 | 1 |
| 2315 | 60 | 154 | 0.4 | 1 | 1 | 1 |
| 2316 | 60 | 155 | 0.4 | 1 | 1 | 1 |
| 2317 | 60 | 156 | 0.4 | 1 | 1 | 1 |
| 2318 | 60 | 157 | 0.4 | 1 | 1 | 1 |
| 2319 | 60 | 158 | 0.4 | 1 | 1 | 1 |
| 2320 | 60 | 159 | 0.4 | 1 | 1 | 1 |
| 2321 | 60 | 160 | 0.4 | 1 | 1 | 1 |
| 2322 | 60 | 161 | 0.4 | 1 | 1 | 1 |
| 2323 | 60 | 162 | 0.4 | 1 | 1 | 1 |
| 2324 | 60 | 163 | 0.4 | 1 | 1 | 1 |
| 2325 | 60 | 164 | 0.4 | 1 | 1 | 1 |
| 2326 | 60 | 165 | 0.4 | 1 | 1 | 1 |
| 2327 | 60 | 166 | 0.4 | 1 | 1 | 1 |
| 2328 | 60 | 167 | 0.4 | 1 | 1 | 1 |
| 2329 | 60 | 168 | 0.4 | 1 | 1 | 1 |
| 2330 | 60 | 169 | 0.4 | 1 | 1 | 1 |
| 2331 | 60 | 170 | 0.4 | 1 | 1 | 1 |
| 2332 | 60 | 171 | 0.4 | 1 | 1 | 1 |
| 2333 | 60 | 172 | 0.4 | 1 | 1 | 1 |
| 2334 | 60 | 173 | 0.4 | 1 | 1 | 1 |
| 2335 | 60 | 174 | 0.4 | 1 | 1 | 1 |
| 2336 | 60 | 175 | 0.4 | 1 | 1 | 1 |
| 2337 | 60 | 176 | 0.4 | 1 | 1 | 1 |
| 2338 | 60 | 177 | 0.4 | 1 | 1 | 1 |
| 2339 | 60 | 178 | 0.4 | 1 | 1 | 1 |
| 2340 | 60 | 179 | 0.4 | 1 | 1 | 1 |
| 2341 | 60 | 180 | 0.4 | 1 | 1 | 1 |
| 2342 | 60 | 181 | 0.4 | 1 | 1 | 1 |
| 2343 | 60 | 182 | 0.4 | 1 | 1 | 1 |
| 2344 | 60 | 183 | 0.4 | 1 | 1 | 1 |
| 2345 | 60 | 184 | 0.4 | 1 | 1 | 1 |
| 2346 | 60 | 185 | 0.4 | 1 | 1 | 1 |
| 2347 | 60 | 186 | 0.4 | 1 | 1 | 1 |
| 2348 | 60 | 187 | 0.4 | 1 | 1 | 1 |
| 2349 | 60 | 188 | 0.4 | 1 | 1 | 1 |
| 2350 | 60 | 189 | 0.4 | 1 | 1 | 1 |
| 2351 | 60 | 190 | 0.4 | 1 | 1 | 1 |
| 2352 | 60 | 191 | 0.4 | 1 | 1 | 1 |
| 2353 | 60 | 192 | 0.4 | 1 | 1 | 1 |
| 2354 | 60 | 193 | 0.4 | 1 | 1 | 1 |
| 2355 | 60 | 194 | 0.4 | 1 | 1 | 1 |
| 2356 | 60 | 195 | 0.4 | 1 | 1 | 1 |
| 2357 | 60 | 196 | 0.4 | 1 | 1 | 1 |
| 2358 | 60 | 197 | 0.4 | 1 | 1 | 1 |
| 2359 | 60 | 198 | 0.4 | 1 | 1 | 1 |
| 2360 | 60 | 199 | 0.4 | 1 | 1 | 1 |
| 2361 | 60 | 200 | 0.4 | 1 | 1 | 1 |
| 2362 | 60 | 201 | 0.4 | 1 | 1 | 1 |
| 2363 | 60 | 202 | 0.4 | 1 | 1 | 1 |
| 2364 | 60 | 203 | 0.4 | 1 | 1 | 1 |
| 2365 | 60 | 204 | 0.4 | 1 | 1 | 1 |
| 2366 | 60 | 205 | 0.4 | 1 | 1 | 1 |
| 2367 | 60 | 206 | 0.4 | 1 | 1 | 1 |
| 2368 | 60 | 207 | 0.4 | 1 | 1 | 1 |
| 2369 | 60 | 208 | 0.4 | 1 | 1 | 1 |
| 2370 | 60 | 209 | 0.4 | 1 | 1 | 1 |
| 2371 | 60 | 210 | 0.4 | 1 | 1 | 1 |
| 2372 | 60 | 211 | 0.4 | 1 | 1 | 1 |
| 2373 | 60 | 212 | 0.4 | 1 | 1 | 1 |
| 2374 | 60 | 213 | 0.4 | 1 | 1 | 1 |
| 2375 | 60 | 214 | 0.4 | 1 | 1 | 1 |
| 2376 | 60 | 215 | 0.4 | 1 | 1 | 1 |
| 2377 | 60 | 216 | 0.4 | 1 | 1 | 1 |
| 2378 | 60 | 217 | 0.4 | 1 | 1 | 1 |
| 2379 | 60 | 218 | 0.4 | 1 | 1 | 1 |
| 2380 | 60 | 219 | 0.4 | 1 | 1 | 1 |
| 2381 | 60 | 220 | 0.4 | 1 | 1 | 1 |
| 2382 | 60 | 221 | 0.4 | 1 | 1 | 1 |
| 2383 | 60 | 222 | 0.4 | 1 | 1 | 1 |
| 2384 | 60 | 223 | 0.4 | 1 | 1 | 1 |
| 2385 | 60 | 224 | 0.4 | 1 | 1 | 1 |
| 2386 | 60 | 225 | 0.4 | 1 | 1 | 1 |
| 2387 | 60 | 226 | 0.4 | 1 | 1 | 1 |
| 2388 | 60 | 227 | 0.4 | 1 | 1 | 1 |
| 2389 | 60 | 228 | 0.4 | 1 | 1 | 1 |
| 2390 | 60 | 229 | 0.4 | 1 | 1 | 1 |
| 2391 | 60 | 230 | 0.4 | 1 | 1 | 1 |
| 2392 | 60 | 231 | 0.4 | 1 | 1 | 1 |
| 2393 | 60 | 232 | 0.4 | 1 | 1 | 1 |
| 2394 | 60 | 233 | 0.4 | 1 | 1 | 1 |
| 2395 | 60 | 234 | 0.4 | 1 | 1 | 1 |
| 2396 | 60 | 235 | 0.4 | 1 | 1 | 1 |
| 2397 | 60 | 236 | 0.4 | 1 | 1 | 1 |
| 2398 | 60 | 237 | 0.4 | 1 | 1 | 1 |
| 2399 | 60 | 238 | 0.4 | 1 | 1 | 1 |
| 2400 | 60 | 239 | 0.4 | 1 | 1 | 1 |
| 2401 | 60 | 240 | 0.4 | 1 | 1 | 1 |
| 2402 | 60 | 241 | 0.4 | 1 | 1 | 1 |
| 2403 | 60 | 242 | 0.4 | 1 | 1 | 1 |
| 2404 | 60 | 243 | 0.4 | 1 | 1 | 1 |
| 2405 | 60 | 244 | 0.4 | 1 | 1 | 1 |
| 2406 | 60 | 245 | 0.4 | 1 | 1 | 1 |
| 2407 | 60 | 246 | 0.4 | 1 | 1 | 1 |
| 2408 | 60 | 247 | 0.4 | 1 | 1 | 1 |
| 2409 | 60 | 248 | 0.4 | 1 | 1 | 1 |
| 2410 | 60 | 249 | 0.4 | 1 | 1 | 1 |
| 2411 | 60 | 250 | 0.4 | 1 | 1 | 1 |
| 2412 | 60 | 251 | 0.4 | 1 | 1 | 1 |
| 2413 | 60 | 252 | 0.4 | 1 | 1 | 1 |
| 2414 | 60 | 253 | 0.4 | 1 | 1 | 1 |
| 2415 | 60 | 254 | 0.4 | 1 | 1 | 1 |
| 2416 | 60 | 255 | 0.4 | 1 | 1 | 1 |
| 2417 | 60 | 256 | 0.4 | 1 | 1 | 1 |
| 2418 | 60 | 257 | 0.4 | 1 | 1 | 1 |
| 2419 | 60 | 258 | 0.4 | 1 | 1 | 1 |
| 2420 | 60 | 259 | 0.4 | 1 | 1 | 1 |
| 2421 | 60 | 260 | 0.4 | 1 | 1 | 1 |
| 2422 | 60 | 261 | 0.4 | 1 | 1 | 1 |
| 2423 | 60 | 262 | 0.4 | 1 | 1 | 1 |
| 2424 | 60 | 263 | 0.4 | 1 | 1 | 1 |
| 2425 | 60 | 264 | 0.4 | 1 | 1 | 1 |
| 2426 | 60 | 265 | 0.4 | 1 | 1 | 1 |
| 2427 | 60 | 266 | 0.4 | 1 | 1 | 1 |
| 2428 | 60 | 267 | 0.4 | 1 | 1 | 1 |
| 2429 | 60 | 268 | 0.4 | 1 | 1 | 1 |
| 2430 | 60 | 269 | 0.4 | 1 | 1 | 1 |
| 2431 | 60 | 270 | 0.4 | 1 | 1 | 1 |
| 2432 | 60 | 271 | 0.4 | 1 | 1 | 1 |
| 2433 | 60 | 272 | 0.4 | 1 | 1 | 1 |
| 2434 | 60 | 273 | 0.4 | 1 | 1 | 1 |
| 2435 | 60 | 274 | 0.4 | 1 | 1 | 1 |
| 2436 | 60 | 275 | 0.4 | 1 | 1 | 1 |
| 2437 | 60 | 276 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2438 | 60 | 277 | 0.4 | 1 | 1 | 1 |
| 2439 | 60 | 278 | 0.4 | 1 | 1 | 1 |
| 2440 | 60 | 279 | 0.4 | 1 | 1 | 1 |
| 2441 | 60 | 280 | 0.4 | 1 | 1 | 1 |
| 2442 | 60 | 281 | 0.4 | 1 | 1 | 1 |
| 2443 | 60 | 282 | 0.4 | 1 | 1 | 1 |
| 2444 | 60 | 283 | 0.4 | 1 | 1 | 1 |
| 2445 | 60 | 284 | 0.4 | 1 | 1 | 1 |
| 2446 | 60 | 285 | 0.4 | 1 | 1 | 1 |
| 2447 | 60 | 286 | 0.4 | 1 | 1 | 1 |
| 2448 | 60 | 287 | 0.4 | 1 | 1 | 1 |
| 2449 | 60 | 288 | 0.4 | 1 | 1 | 1 |
| 2450 | 60 | 289 | 0.4 | 1 | 1 | 1 |
| 2451 | 60 | 290 | 0.4 | 1 | 1 | 1 |
| 2452 | 60 | 291 | 0.4 | 1 | 1 | 1 |
| 2453 | 60 | 292 | 0.4 | 1 | 1 | 1 |
| 2454 | 60 | 293 | 0.4 | 1 | 1 | 1 |
| 2455 | 60 | 294 | 0.4 | 1 | 1 | 1 |
| 2456 | 60 | 295 | 0.4 | 1 | 1 | 1 |
| 2457 | 60 | 296 | 0.4 | 1 | 1 | 1 |
| 2458 | 60 | 297 | 0.4 | 1 | 1 | 1 |
| 2459 | 60 | 298 | 0.4 | 1 | 1 | 1 |
| 2460 | 60 | 299 | 0.4 | 1 | 1 | 1 |
| 2461 | 60 | 300 | 0.4 | 1 | 1 | 1 |
| 2462 | 60 | 301 | 0.4 | 1 | 1 | 1 |
| 2463 | 60 | 302 | 0.4 | 1 | 1 | 1 |
| 2464 | 60 | 303 | 0.4 | 1 | 1 | 1 |
| 2465 | 60 | 304 | 0.4 | 1 | 1 | 1 |
| 2466 | 60 | 305 | 0.4 | 1 | 1 | 1 |
| 2467 | 60 | 306 | 0.4 | 1 | 1 | 1 |
| 2468 | 60 | 307 | 0.4 | 1 | 1 | 1 |
| 2469 | 60 | 308 | 0.4 | 1 | 1 | 1 |
| 2470 | 60 | 309 | 0.4 | 1 | 1 | 1 |
| 2471 | 60 | 310 | 0.4 | 1 | 1 | 1 |
| 2472 | 60 | 311 | 0.4 | 1 | 1 | 1 |
| 2473 | 60 | 312 | 0.4 | 1 | 1 | 1 |
| 2474 | 60 | 313 | 0.4 | 1 | 1 | 1 |
| 2475 | 60 | 314 | 0.4 | 1 | 1 | 1 |
| 2476 | 60 | 315 | 0.4 | 1 | 1 | 1 |
| 2477 | 60 | 316 | 0.4 | 1 | 1 | 1 |
| 2478 | 60 | 317 | 0.4 | 1 | 1 | 1 |
| 2479 | 60 | 318 | 0.4 | 1 | 1 | 1 |
| 2480 | 60 | 319 | 0.4 | 1 | 1 | 1 |
| 2481 | 60 | 320 | 0.4 | 1 | 1 | 1 |
| 2482 | 60 | 321 | 0.4 | 1 | 1 | 1 |
| 2483 | 60 | 322 | 0.4 | 1 | 1 | 1 |
| 2484 | 60 | 323 | 0.4 | 1 | 1 | 1 |
| 2485 | 60 | 324 | 0.4 | 1 | 1 | 1 |
| 2486 | 60 | 325 | 0.4 | 1 | 1 | 1 |
| 2487 | 60 | 326 | 0.4 | 1 | 1 | 1 |
| 2488 | 60 | 327 | 0.4 | 1 | 1 | 1 |
| 2489 | 60 | 328 | 0.4 | 1 | 1 | 1 |
| 2490 | 60 | 329 | 0.4 | 1 | 1 | 1 |
| 2491 | 60 | 330 | 0.4 | 1 | 1 | 1 |
| 2492 | 60 | 331 | 0.4 | 1 | 1 | 1 |
| 2493 | 60 | 332 | 0.4 | 1 | 1 | 1 |
| 2494 | 60 | 333 | 0.4 | 1 | 1 | 1 |
| 2495 | 60 | 334 | 0.4 | 1 | 1 | 1 |
| 2496 | 60 | 335 | 0.4 | 1 | 1 | 1 |
| 2497 | 60 | 336 | 0.4 | 1 | 1 | 1 |
| 2498 | 60 | 337 | 0.4 | 1 | 1 | 1 |
| 2499 | 60 | 338 | 0.4 | 1 | 1 | 1 |
| 2500 | 60 | 339 | 0.4 | 1 | 1 | 1 |
| 2501 | 60 | 340 | 0.4 | 1 | 1 | 1 |
| 2502 | 60 | 341 | 0.4 | 1 | 1 | 1 |
| 2503 | 60 | 342 | 0.4 | 1 | 1 | 1 |
| 2504 | 60 | 343 | 0.4 | 1 | 1 | 1 |
| 2505 | 60 | 344 | 0.4 | 1 | 1 | 1 |
| 2506 | 60 | 345 | 0.4 | 1 | 1 | 1 |
| 2507 | 60 | 346 | 0.4 | 1 | 1 | 1 |
| 2508 | 60 | 347 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2509 | 60 | 348 | 0.4 | 1 | 1 | 1 |
| 2510 | 60 | 349 | 0.4 | 1 | 1 | 1 |
| 2511 | 60 | 350 | 0.4 | 1 | 1 | 1 |
| 2512 | 60 | 351 | 0.4 | 1 | 1 | 1 |
| 2513 | 60 | 352 | 0.4 | 1 | 1 | 1 |
| 2514 | 60 | 353 | 0.4 | 1 | 1 | 1 |
| 2515 | 60 | 354 | 0.4 | 1 | 1 | 1 |
| 2516 | 60 | 355 | 0.4 | 1 | 1 | 1 |
| 2517 | 60 | 356 | 0.4 | 1 | 1 | 1 |
| 2518 | 60 | 357 | 0.4 | 1 | 1 | 1 |
| 2519 | 60 | 358 | 0.4 | 1 | 1 | 1 |
| 2520 | 60 | 359 | 0.4 | 1 | 1 | 1 |
| 2521 | 70 | 0 | 0.4 | 1 | 1 | 1 |
| 2522 | 70 | 1 | 0.4 | 1 | 1 | 1 |
| 2523 | 70 | 2 | 0.4 | 1 | 1 | 1 |
| 2524 | 70 | 3 | 0.4 | 1 | 1 | 1 |
| 2525 | 70 | 4 | 0.4 | 1 | 1 | 1 |
| 2526 | 70 | 5 | 0.4 | 1 | 1 | 1 |
| 2527 | 70 | 6 | 0.4 | 1 | 1 | 1 |
| 2528 | 70 | 7 | 0.4 | 1 | 1 | 1 |
| 2529 | 70 | 8 | 0.4 | 1 | 1 | 1 |
| 2530 | 70 | 9 | 0.4 | 1 | 1 | 1 |
| 2531 | 70 | 10 | 0.4 | 1 | 1 | 1 |
| 2532 | 70 | 11 | 0.4 | 1 | 1 | 1 |
| 2533 | 70 | 12 | 0.4 | 1 | 1 | 1 |
| 2534 | 70 | 13 | 0.4 | 1 | 1 | 1 |
| 2535 | 70 | 14 | 0.4 | 1 | 1 | 1 |
| 2536 | 70 | 15 | 0.4 | 1 | 1 | 1 |
| 2537 | 70 | 16 | 0.4 | 1 | 1 | 1 |
| 2538 | 70 | 17 | 0.4 | 1 | 1 | 1 |
| 2539 | 70 | 18 | 0.4 | 1 | 1 | 1 |
| 2540 | 70 | 19 | 0.4 | 1 | 1 | 1 |
| 2541 | 70 | 20 | 0.4 | 1 | 1 | 1 |
| 2542 | 70 | 21 | 0.4 | 1 | 1 | 1 |
| 2543 | 70 | 22 | 0.4 | 1 | 1 | 1 |
| 2544 | 70 | 23 | 0.4 | 1 | 1 | 1 |
| 2545 | 70 | 24 | 0.4 | 1 | 1 | 1 |
| 2546 | 70 | 25 | 0.4 | 1 | 1 | 1 |
| 2547 | 70 | 26 | 0.4 | 1 | 1 | 1 |
| 2548 | 70 | 27 | 0.4 | 1 | 1 | 1 |
| 2549 | 70 | 28 | 0.4 | 1 | 1 | 1 |
| 2550 | 70 | 29 | 0.4 | 1 | 1 | 1 |
| 2551 | 70 | 30 | 0.4 | 1 | 1 | 1 |
| 2552 | 70 | 31 | 0.4 | 1 | 1 | 1 |
| 2553 | 70 | 32 | 0.4 | 1 | 1 | 1 |
| 2554 | 70 | 33 | 0.4 | 1 | 1 | 1 |
| 2555 | 70 | 34 | 0.4 | 1 | 1 | 1 |
| 2556 | 70 | 35 | 0.4 | 1 | 1 | 1 |
| 2557 | 70 | 36 | 0.4 | 1 | 1 | 1 |
| 2558 | 70 | 37 | 0.4 | 1 | 1 | 1 |
| 2559 | 70 | 38 | 0.4 | 1 | 1 | 1 |
| 2560 | 70 | 39 | 0.4 | 1 | 1 | 1 |
| 2561 | 70 | 40 | 0.4 | 1 | 1 | 1 |
| 2562 | 70 | 41 | 0.4 | 1 | 1 | 1 |
| 2563 | 70 | 42 | 0.4 | 1 | 1 | 1 |
| 2564 | 70 | 43 | 0.4 | 1 | 1 | 1 |
| 2565 | 70 | 44 | 0.4 | 1 | 1 | 1 |
| 2566 | 70 | 45 | 0.4 | 1 | 1 | 1 |
| 2567 | 70 | 46 | 0.4 | 1 | 1 | 1 |
| 2568 | 70 | 47 | 0.4 | 1 | 1 | 1 |
| 2569 | 70 | 48 | 0.4 | 1 | 1 | 1 |
| 2570 | 70 | 49 | 0.4 | 1 | 1 | 1 |
| 2571 | 70 | 50 | 0.4 | 1 | 1 | 1 |
| 2572 | 70 | 51 | 0.4 | 1 | 1 | 1 |
| 2573 | 70 | 52 | 0.4 | 1 | 1 | 1 |
| 2574 | 70 | 53 | 0.4 | 1 | 1 | 1 |
| 2575 | 70 | 54 | 0.4 | 1 | 1 | 1 |
| 2576 | 70 | 55 | 0.4 | 1 | 1 | 1 |
| 2577 | 70 | 56 | 0.4 | 1 | 1 | 1 |
| 2578 | 70 | 57 | 0.4 | 1 | 1 | 1 |
| 2579 | 70 | 58 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2580 | 70 | 59 | 0.4 | 1 | 1 | 1 |
| 2581 | 70 | 60 | 0.4 | 1 | 1 | 1 |
| 2582 | 70 | 61 | 0.4 | 1 | 1 | 1 |
| 2583 | 70 | 62 | 0.4 | 1 | 1 | 1 |
| 2584 | 70 | 63 | 0.4 | 1 | 1 | 1 |
| 2585 | 70 | 64 | 0.4 | 1 | 1 | 1 |
| 2586 | 70 | 65 | 0.4 | 1 | 1 | 1 |
| 2587 | 70 | 66 | 0.4 | 1 | 1 | 1 |
| 2588 | 70 | 67 | 0.4 | 1 | 1 | 1 |
| 2589 | 70 | 68 | 0.4 | 1 | 1 | 1 |
| 2590 | 70 | 69 | 0.4 | 1 | 1 | 1 |
| 2591 | 70 | 70 | 0.4 | 1 | 1 | 1 |
| 2592 | 70 | 71 | 0.4 | 1 | 1 | 1 |
| 2593 | 70 | 72 | 0.4 | 1 | 1 | 1 |
| 2594 | 70 | 73 | 0.4 | 1 | 1 | 1 |
| 2595 | 70 | 74 | 0.4 | 1 | 1 | 1 |
| 2596 | 70 | 75 | 0.4 | 1 | 1 | 1 |
| 2597 | 70 | 76 | 0.4 | 1 | 1 | 1 |
| 2598 | 70 | 77 | 0.4 | 1 | 1 | 1 |
| 2599 | 70 | 78 | 0.4 | 1 | 1 | 1 |
| 2600 | 70 | 79 | 0.4 | 1 | 1 | 1 |
| 2601 | 70 | 80 | 0.4 | 1 | 1 | 1 |
| 2602 | 70 | 81 | 0.4 | 1 | 1 | 1 |
| 2603 | 70 | 82 | 0.4 | 1 | 1 | 1 |
| 2604 | 70 | 83 | 0.4 | 1 | 1 | 1 |
| 2605 | 70 | 84 | 0.4 | 1 | 1 | 1 |
| 2606 | 70 | 85 | 0.4 | 1 | 1 | 1 |
| 2607 | 70 | 86 | 0.4 | 1 | 1 | 1 |
| 2608 | 70 | 87 | 0.4 | 1 | 1 | 1 |
| 2609 | 70 | 88 | 0.4 | 1 | 1 | 1 |
| 2610 | 70 | 89 | 0.4 | 1 | 1 | 1 |
| 2611 | 70 | 90 | 0.4 | 1 | 1 | 1 |
| 2612 | 70 | 91 | 0.4 | 1 | 1 | 1 |
| 2613 | 70 | 92 | 0.4 | 1 | 1 | 1 |
| 2614 | 70 | 93 | 0.4 | 1 | 1 | 1 |
| 2615 | 70 | 94 | 0.4 | 1 | 1 | 1 |
| 2616 | 70 | 95 | 0.4 | 1 | 1 | 1 |
| 2617 | 70 | 96 | 0.4 | 1 | 1 | 1 |
| 2618 | 70 | 97 | 0.4 | 1 | 1 | 1 |
| 2619 | 70 | 98 | 0.4 | 1 | 1 | 1 |
| 2620 | 70 | 99 | 0.4 | 1 | 1 | 1 |
| 2621 | 70 | 100 | 0.4 | 1 | 1 | 1 |
| 2622 | 70 | 101 | 0.4 | 1 | 1 | 1 |
| 2623 | 70 | 102 | 0.4 | 1 | 1 | 1 |
| 2624 | 70 | 103 | 0.4 | 1 | 1 | 1 |
| 2625 | 70 | 104 | 0.4 | 1 | 1 | 1 |
| 2626 | 70 | 105 | 0.4 | 1 | 1 | 1 |
| 2627 | 70 | 106 | 0.4 | 1 | 1 | 1 |
| 2628 | 70 | 107 | 0.4 | 1 | 1 | 1 |
| 2629 | 70 | 108 | 0.4 | 1 | 1 | 1 |
| 2630 | 70 | 109 | 0.4 | 1 | 1 | 1 |
| 2631 | 70 | 110 | 0.4 | 1 | 1 | 1 |
| 2632 | 70 | 111 | 0.4 | 1 | 1 | 1 |
| 2633 | 70 | 112 | 0.4 | 1 | 1 | 1 |
| 2634 | 70 | 113 | 0.4 | 1 | 1 | 1 |
| 2635 | 70 | 114 | 0.4 | 1 | 1 | 1 |
| 2636 | 70 | 115 | 0.4 | 1 | 1 | 1 |
| 2637 | 70 | 116 | 0.4 | 1 | 1 | 1 |
| 2638 | 70 | 117 | 0.4 | 1 | 1 | 1 |
| 2639 | 70 | 118 | 0.4 | 1 | 1 | 1 |
| 2640 | 70 | 119 | 0.4 | 1 | 1 | 1 |
| 2641 | 70 | 120 | 0.4 | 1 | 1 | 1 |
| 2642 | 70 | 121 | 0.4 | 1 | 1 | 1 |
| 2643 | 70 | 122 | 0.4 | 1 | 1 | 1 |
| 2644 | 70 | 123 | 0.4 | 1 | 1 | 1 |
| 2645 | 70 | 124 | 0.4 | 1 | 1 | 1 |
| 2646 | 70 | 125 | 0.4 | 1 | 1 | 1 |
| 2647 | 70 | 126 | 0.4 | 1 | 1 | 1 |
| 2648 | 70 | 127 | 0.4 | 1 | 1 | 1 |
| 2649 | 70 | 128 | 0.4 | 1 | 1 | 1 |
| 2650 | 70 | 129 | 0.4 | 1 | 1 | 1 |
| 2651 | 70 | 130 | 0.4 | 1 | 1 | 1 |
| 2652 | 70 | 131 | 0.4 | 1 | 1 | 1 |
| 2653 | 70 | 132 | 0.4 | 1 | 1 | 1 |
| 2654 | 70 | 133 | 0.4 | 1 | 1 | 1 |
| 2655 | 70 | 134 | 0.4 | 1 | 1 | 1 |
| 2656 | 70 | 135 | 0.4 | 1 | 1 | 1 |
| 2657 | 70 | 136 | 0.4 | 1 | 1 | 1 |
| 2658 | 70 | 137 | 0.4 | 1 | 1 | 1 |
| 2659 | 70 | 138 | 0.4 | 1 | 1 | 1 |
| 2660 | 70 | 139 | 0.4 | 1 | 1 | 1 |
| 2661 | 70 | 140 | 0.4 | 1 | 1 | 1 |
| 2662 | 70 | 141 | 0.4 | 1 | 1 | 1 |
| 2663 | 70 | 142 | 0.4 | 1 | 1 | 1 |
| 2664 | 70 | 143 | 0.4 | 1 | 1 | 1 |
| 2665 | 70 | 144 | 0.4 | 1 | 1 | 1 |
| 2666 | 70 | 145 | 0.4 | 1 | 1 | 1 |
| 2667 | 70 | 146 | 0.4 | 1 | 1 | 1 |
| 2668 | 70 | 147 | 0.4 | 1 | 1 | 1 |
| 2669 | 70 | 148 | 0.4 | 1 | 1 | 1 |
| 2670 | 70 | 149 | 0.4 | 1 | 1 | 1 |
| 2671 | 70 | 150 | 0.4 | 1 | 1 | 1 |
| 2672 | 70 | 151 | 0.4 | 1 | 1 | 1 |
| 2673 | 70 | 152 | 0.4 | 1 | 1 | 1 |
| 2674 | 70 | 153 | 0.4 | 1 | 1 | 1 |
| 2675 | 70 | 154 | 0.4 | 1 | 1 | 1 |
| 2676 | 70 | 155 | 0.4 | 1 | 1 | 1 |
| 2677 | 70 | 156 | 0.4 | 1 | 1 | 1 |
| 2678 | 70 | 157 | 0.4 | 1 | 1 | 1 |
| 2679 | 70 | 158 | 0.4 | 1 | 1 | 1 |
| 2680 | 70 | 159 | 0.4 | 1 | 1 | 1 |
| 2681 | 70 | 160 | 0.4 | 1 | 1 | 1 |
| 2682 | 70 | 161 | 0.4 | 1 | 1 | 1 |
| 2683 | 70 | 162 | 0.4 | 1 | 1 | 1 |
| 2684 | 70 | 163 | 0.4 | 1 | 1 | 1 |
| 2685 | 70 | 164 | 0.4 | 1 | 1 | 1 |
| 2686 | 70 | 165 | 0.4 | 1 | 1 | 1 |
| 2687 | 70 | 166 | 0.4 | 1 | 1 | 1 |
| 2688 | 70 | 167 | 0.4 | 1 | 1 | 1 |
| 2689 | 70 | 168 | 0.4 | 1 | 1 | 1 |
| 2690 | 70 | 169 | 0.4 | 1 | 1 | 1 |
| 2691 | 70 | 170 | 0.4 | 1 | 1 | 1 |
| 2692 | 70 | 171 | 0.4 | 1 | 1 | 1 |
| 2693 | 70 | 172 | 0.4 | 1 | 1 | 1 |
| 2694 | 70 | 173 | 0.4 | 1 | 1 | 1 |
| 2695 | 70 | 174 | 0.4 | 1 | 1 | 1 |
| 2696 | 70 | 175 | 0.4 | 1 | 1 | 1 |
| 2697 | 70 | 176 | 0.4 | 1 | 1 | 1 |
| 2698 | 70 | 177 | 0.4 | 1 | 1 | 1 |
| 2699 | 70 | 178 | 0.4 | 1 | 1 | 1 |
| 2700 | 70 | 179 | 0.4 | 1 | 1 | 1 |
| 2701 | 70 | 180 | 0.4 | 1 | 1 | 1 |
| 2702 | 70 | 181 | 0.4 | 1 | 1 | 1 |
| 2703 | 70 | 182 | 0.4 | 1 | 1 | 1 |
| 2704 | 70 | 183 | 0.4 | 1 | 1 | 1 |
| 2705 | 70 | 184 | 0.4 | 1 | 1 | 1 |
| 2706 | 70 | 185 | 0.4 | 1 | 1 | 1 |
| 2707 | 70 | 186 | 0.4 | 1 | 1 | 1 |
| 2708 | 70 | 187 | 0.4 | 1 | 1 | 1 |
| 2709 | 70 | 188 | 0.4 | 1 | 1 | 1 |
| 2710 | 70 | 189 | 0.4 | 1 | 1 | 1 |
| 2711 | 70 | 190 | 0.4 | 1 | 1 | 1 |
| 2712 | 70 | 191 | 0.4 | 1 | 1 | 1 |
| 2713 | 70 | 192 | 0.4 | 1 | 1 | 1 |
| 2714 | 70 | 193 | 0.4 | 1 | 1 | 1 |
| 2715 | 70 | 194 | 0.4 | 1 | 1 | 1 |
| 2716 | 70 | 195 | 0.4 | 1 | 1 | 1 |
| 2717 | 70 | 196 | 0.4 | 1 | 1 | 1 |
| 2718 | 70 | 197 | 0.4 | 1 | 1 | 1 |
| 2719 | 70 | 198 | 0.4 | 1 | 1 | 1 |
| 2720 | 70 | 199 | 0.4 | 1 | 1 | 1 |
| 2721 | 70 | 200 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2722 | 70 | 201 | 0.4 | 1 | 1 | 1 |
| 2723 | 70 | 202 | 0.4 | 1 | 1 | 1 |
| 2724 | 70 | 203 | 0.4 | 1 | 1 | 1 |
| 2725 | 70 | 204 | 0.4 | 1 | 1 | 1 |
| 2726 | 70 | 205 | 0.4 | 1 | 1 | 1 |
| 2727 | 70 | 206 | 0.4 | 1 | 1 | 1 |
| 2728 | 70 | 207 | 0.4 | 1 | 1 | 1 |
| 2729 | 70 | 208 | 0.4 | 1 | 1 | 1 |
| 2730 | 70 | 209 | 0.4 | 1 | 1 | 1 |
| 2731 | 70 | 210 | 0.4 | 1 | 1 | 1 |
| 2732 | 70 | 211 | 0.4 | 1 | 1 | 1 |
| 2733 | 70 | 212 | 0.4 | 1 | 1 | 1 |
| 2734 | 70 | 213 | 0.4 | 1 | 1 | 1 |
| 2735 | 70 | 214 | 0.4 | 1 | 1 | 1 |
| 2736 | 70 | 215 | 0.4 | 1 | 1 | 1 |
| 2737 | 70 | 216 | 0.4 | 1 | 1 | 1 |
| 2738 | 70 | 217 | 0.4 | 1 | 1 | 1 |
| 2739 | 70 | 218 | 0.4 | 1 | 1 | 1 |
| 2740 | 70 | 219 | 0.4 | 1 | 1 | 1 |
| 2741 | 70 | 220 | 0.4 | 1 | 1 | 1 |
| 2742 | 70 | 221 | 0.4 | 1 | 1 | 1 |
| 2743 | 70 | 222 | 0.4 | 1 | 1 | 1 |
| 2744 | 70 | 223 | 0.4 | 1 | 1 | 1 |
| 2745 | 70 | 224 | 0.4 | 1 | 1 | 1 |
| 2746 | 70 | 225 | 0.4 | 1 | 1 | 1 |
| 2747 | 70 | 226 | 0.4 | 1 | 1 | 1 |
| 2748 | 70 | 227 | 0.4 | 1 | 1 | 1 |
| 2749 | 70 | 228 | 0.4 | 1 | 1 | 1 |
| 2750 | 70 | 229 | 0.4 | 1 | 1 | 1 |
| 2751 | 70 | 230 | 0.4 | 1 | 1 | 1 |
| 2752 | 70 | 231 | 0.4 | 1 | 1 | 1 |
| 2753 | 70 | 232 | 0.4 | 1 | 1 | 1 |
| 2754 | 70 | 233 | 0.4 | 1 | 1 | 1 |
| 2755 | 70 | 234 | 0.4 | 1 | 1 | 1 |
| 2756 | 70 | 235 | 0.4 | 1 | 1 | 1 |
| 2757 | 70 | 236 | 0.4 | 1 | 1 | 1 |
| 2758 | 70 | 237 | 0.4 | 1 | 1 | 1 |
| 2759 | 70 | 238 | 0.4 | 1 | 1 | 1 |
| 2760 | 70 | 239 | 0.4 | 1 | 1 | 1 |
| 2761 | 70 | 240 | 0.4 | 1 | 1 | 1 |
| 2762 | 70 | 241 | 0.4 | 1 | 1 | 1 |
| 2763 | 70 | 242 | 0.4 | 1 | 1 | 1 |
| 2764 | 70 | 243 | 0.4 | 1 | 1 | 1 |
| 2765 | 70 | 244 | 0.4 | 1 | 1 | 1 |
| 2766 | 70 | 245 | 0.4 | 1 | 1 | 1 |
| 2767 | 70 | 246 | 0.4 | 1 | 1 | 1 |
| 2768 | 70 | 247 | 0.4 | 1 | 1 | 1 |
| 2769 | 70 | 248 | 0.4 | 1 | 1 | 1 |
| 2770 | 70 | 249 | 0.4 | 1 | 1 | 1 |
| 2771 | 70 | 250 | 0.4 | 1 | 1 | 1 |
| 2772 | 70 | 251 | 0.4 | 1 | 1 | 1 |
| 2773 | 70 | 252 | 0.4 | 1 | 1 | 1 |
| 2774 | 70 | 253 | 0.4 | 1 | 1 | 1 |
| 2775 | 70 | 254 | 0.4 | 1 | 1 | 1 |
| 2776 | 70 | 255 | 0.4 | 1 | 1 | 1 |
| 2777 | 70 | 256 | 0.4 | 1 | 1 | 1 |
| 2778 | 70 | 257 | 0.4 | 1 | 1 | 1 |
| 2779 | 70 | 258 | 0.4 | 1 | 1 | 1 |
| 2780 | 70 | 259 | 0.4 | 1 | 1 | 1 |
| 2781 | 70 | 260 | 0.4 | 1 | 1 | 1 |
| 2782 | 70 | 261 | 0.4 | 1 | 1 | 1 |
| 2783 | 70 | 262 | 0.4 | 1 | 1 | 1 |
| 2784 | 70 | 263 | 0.4 | 1 | 1 | 1 |
| 2785 | 70 | 264 | 0.4 | 1 | 1 | 1 |
| 2786 | 70 | 265 | 0.4 | 1 | 1 | 1 |
| 2787 | 70 | 266 | 0.4 | 1 | 1 | 1 |
| 2788 | 70 | 267 | 0.4 | 1 | 1 | 1 |
| 2789 | 70 | 268 | 0.4 | 1 | 1 | 1 |
| 2790 | 70 | 269 | 0.4 | 1 | 1 | 1 |
| 2791 | 70 | 270 | 0.4 | 1 | 1 | 1 |
| 2792 | 70 | 271 | 0.4 | 1 | 1 | 1 |
| 2793 | 70 | 272 | 0.4 | 1 | 1 | 1 |
| 2794 | 70 | 273 | 0.4 | 1 | 1 | 1 |
| 2795 | 70 | 274 | 0.4 | 1 | 1 | 1 |
| 2796 | 70 | 275 | 0.4 | 1 | 1 | 1 |
| 2797 | 70 | 276 | 0.4 | 1 | 1 | 1 |
| 2798 | 70 | 277 | 0.4 | 1 | 1 | 1 |
| 2799 | 70 | 278 | 0.4 | 1 | 1 | 1 |
| 2800 | 70 | 279 | 0.4 | 1 | 1 | 1 |
| 2801 | 70 | 280 | 0.4 | 1 | 1 | 1 |
| 2802 | 70 | 281 | 0.4 | 1 | 1 | 1 |
| 2803 | 70 | 282 | 0.4 | 1 | 1 | 1 |
| 2804 | 70 | 283 | 0.4 | 1 | 1 | 1 |
| 2805 | 70 | 284 | 0.4 | 1 | 1 | 1 |
| 2806 | 70 | 285 | 0.4 | 1 | 1 | 1 |
| 2807 | 70 | 286 | 0.4 | 1 | 1 | 1 |
| 2808 | 70 | 287 | 0.4 | 1 | 1 | 1 |
| 2809 | 70 | 288 | 0.4 | 1 | 1 | 1 |
| 2810 | 70 | 289 | 0.4 | 1 | 1 | 1 |
| 2811 | 70 | 290 | 0.4 | 1 | 1 | 1 |
| 2812 | 70 | 291 | 0.4 | 1 | 1 | 1 |
| 2813 | 70 | 292 | 0.4 | 1 | 1 | 1 |
| 2814 | 70 | 293 | 0.4 | 1 | 1 | 1 |
| 2815 | 70 | 294 | 0.4 | 1 | 1 | 1 |
| 2816 | 70 | 295 | 0.4 | 1 | 1 | 1 |
| 2817 | 70 | 296 | 0.4 | 1 | 1 | 1 |
| 2818 | 70 | 297 | 0.4 | 1 | 1 | 1 |
| 2819 | 70 | 298 | 0.4 | 1 | 1 | 1 |
| 2820 | 70 | 299 | 0.4 | 1 | 1 | 1 |
| 2821 | 70 | 300 | 0.4 | 1 | 1 | 1 |
| 2822 | 70 | 301 | 0.4 | 1 | 1 | 1 |
| 2823 | 70 | 302 | 0.4 | 1 | 1 | 1 |
| 2824 | 70 | 303 | 0.4 | 1 | 1 | 1 |
| 2825 | 70 | 304 | 0.4 | 1 | 1 | 1 |
| 2826 | 70 | 305 | 0.4 | 1 | 1 | 1 |
| 2827 | 70 | 306 | 0.4 | 1 | 1 | 1 |
| 2828 | 70 | 307 | 0.4 | 1 | 1 | 1 |
| 2829 | 70 | 308 | 0.4 | 1 | 1 | 1 |
| 2830 | 70 | 309 | 0.4 | 1 | 1 | 1 |
| 2831 | 70 | 310 | 0.4 | 1 | 1 | 1 |
| 2832 | 70 | 311 | 0.4 | 1 | 1 | 1 |
| 2833 | 70 | 312 | 0.4 | 1 | 1 | 1 |
| 2834 | 70 | 313 | 0.4 | 1 | 1 | 1 |
| 2835 | 70 | 314 | 0.4 | 1 | 1 | 1 |
| 2836 | 70 | 315 | 0.4 | 1 | 1 | 1 |
| 2837 | 70 | 316 | 0.4 | 1 | 1 | 1 |
| 2838 | 70 | 317 | 0.4 | 1 | 1 | 1 |
| 2839 | 70 | 318 | 0.4 | 1 | 1 | 1 |
| 2840 | 70 | 319 | 0.4 | 1 | 1 | 1 |
| 2841 | 70 | 320 | 0.4 | 1 | 1 | 1 |
| 2842 | 70 | 321 | 0.4 | 1 | 1 | 1 |
| 2843 | 70 | 322 | 0.4 | 1 | 1 | 1 |
| 2844 | 70 | 323 | 0.4 | 1 | 1 | 1 |
| 2845 | 70 | 324 | 0.4 | 1 | 1 | 1 |
| 2846 | 70 | 325 | 0.4 | 1 | 1 | 1 |
| 2847 | 70 | 326 | 0.4 | 1 | 1 | 1 |
| 2848 | 70 | 327 | 0.4 | 1 | 1 | 1 |
| 2849 | 70 | 328 | 0.4 | 1 | 1 | 1 |
| 2850 | 70 | 329 | 0.4 | 1 | 1 | 1 |
| 2851 | 70 | 330 | 0.4 | 1 | 1 | 1 |
| 2852 | 70 | 331 | 0.4 | 1 | 1 | 1 |
| 2853 | 70 | 332 | 0.4 | 1 | 1 | 1 |
| 2854 | 70 | 333 | 0.4 | 1 | 1 | 1 |
| 2855 | 70 | 334 | 0.4 | 1 | 1 | 1 |
| 2856 | 70 | 335 | 0.4 | 1 | 1 | 1 |
| 2857 | 70 | 336 | 0.4 | 1 | 1 | 1 |
| 2858 | 70 | 337 | 0.4 | 1 | 1 | 1 |
| 2859 | 70 | 338 | 0.4 | 1 | 1 | 1 |
| 2860 | 70 | 339 | 0.4 | 1 | 1 | 1 |
| 2861 | 70 | 340 | 0.4 | 1 | 1 | 1 |
| 2862 | 70 | 341 | 0.4 | 1 | 1 | 1 |
| 2863 | 70 | 342 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2864 | 70 | 343 | 0.4 | 1 | 1 | 1 |
| 2865 | 70 | 344 | 0.4 | 1 | 1 | 1 |
| 2866 | 70 | 345 | 0.4 | 1 | 1 | 1 |
| 2867 | 70 | 346 | 0.4 | 1 | 1 | 1 |
| 2868 | 70 | 347 | 0.4 | 1 | 1 | 1 |
| 2869 | 70 | 348 | 0.4 | 1 | 1 | 1 |
| 2870 | 70 | 349 | 0.4 | 1 | 1 | 1 |
| 2871 | 70 | 350 | 0.4 | 1 | 1 | 1 |
| 2872 | 70 | 351 | 0.4 | 1 | 1 | 1 |
| 2873 | 70 | 352 | 0.4 | 1 | 1 | 1 |
| 2874 | 70 | 353 | 0.4 | 1 | 1 | 1 |
| 2875 | 70 | 354 | 0.4 | 1 | 1 | 1 |
| 2876 | 70 | 355 | 0.4 | 1 | 1 | 1 |
| 2877 | 70 | 356 | 0.4 | 1 | 1 | 1 |
| 2878 | 70 | 357 | 0.4 | 1 | 1 | 1 |
| 2879 | 70 | 358 | 0.4 | 1 | 1 | 1 |
| 2880 | 70 | 359 | 0.4 | 1 | 1 | 1 |
| 2881 | 80 | 0 | 0.4 | 1 | 1 | 1 |
| 2882 | 80 | 1 | 0.4 | 1 | 1 | 1 |
| 2883 | 80 | 2 | 0.4 | 1 | 1 | 1 |
| 2884 | 80 | 3 | 0.4 | 1 | 1 | 1 |
| 2885 | 80 | 4 | 0.4 | 1 | 1 | 1 |
| 2886 | 80 | 5 | 0.4 | 1 | 1 | 1 |
| 2887 | 80 | 6 | 0.4 | 1 | 1 | 1 |
| 2888 | 80 | 7 | 0.4 | 1 | 1 | 1 |
| 2889 | 80 | 8 | 0.4 | 1 | 1 | 1 |
| 2890 | 80 | 9 | 0.4 | 1 | 1 | 1 |
| 2891 | 80 | 10 | 0.4 | 1 | 1 | 1 |
| 2892 | 80 | 11 | 0.4 | 1 | 1 | 1 |
| 2893 | 80 | 12 | 0.4 | 1 | 1 | 1 |
| 2894 | 80 | 13 | 0.4 | 1 | 1 | 1 |
| 2895 | 80 | 14 | 0.4 | 1 | 1 | 1 |
| 2896 | 80 | 15 | 0.4 | 1 | 1 | 1 |
| 2897 | 80 | 16 | 0.4 | 1 | 1 | 1 |
| 2898 | 80 | 17 | 0.4 | 1 | 1 | 1 |
| 2899 | 80 | 18 | 0.4 | 1 | 1 | 1 |
| 2900 | 80 | 19 | 0.4 | 1 | 1 | 1 |
| 2901 | 80 | 20 | 0.4 | 1 | 1 | 1 |
| 2902 | 80 | 21 | 0.4 | 1 | 1 | 1 |
| 2903 | 80 | 22 | 0.4 | 1 | 1 | 1 |
| 2904 | 80 | 23 | 0.4 | 1 | 1 | 1 |
| 2905 | 80 | 24 | 0.4 | 1 | 1 | 1 |
| 2906 | 80 | 25 | 0.4 | 1 | 1 | 1 |
| 2907 | 80 | 26 | 0.4 | 1 | 1 | 1 |
| 2908 | 80 | 27 | 0.4 | 1 | 1 | 1 |
| 2909 | 80 | 28 | 0.4 | 1 | 1 | 1 |
| 2910 | 80 | 29 | 0.4 | 1 | 1 | 1 |
| 2911 | 80 | 30 | 0.4 | 1 | 1 | 1 |
| 2912 | 80 | 31 | 0.4 | 1 | 1 | 1 |
| 2913 | 80 | 32 | 0.4 | 1 | 1 | 1 |
| 2914 | 80 | 33 | 0.4 | 1 | 1 | 1 |
| 2915 | 80 | 34 | 0.4 | 1 | 1 | 1 |
| 2916 | 80 | 35 | 0.4 | 1 | 1 | 1 |
| 2917 | 80 | 36 | 0.4 | 1 | 1 | 1 |
| 2918 | 80 | 37 | 0.4 | 1 | 1 | 1 |
| 2919 | 80 | 38 | 0.4 | 1 | 1 | 1 |
| 2920 | 80 | 39 | 0.4 | 1 | 1 | 1 |
| 2921 | 80 | 40 | 0.4 | 1 | 1 | 1 |
| 2922 | 80 | 41 | 0.4 | 1 | 1 | 1 |
| 2923 | 80 | 42 | 0.4 | 1 | 1 | 1 |
| 2924 | 80 | 43 | 0.4 | 1 | 1 | 1 |
| 2925 | 80 | 44 | 0.4 | 1 | 1 | 1 |
| 2926 | 80 | 45 | 0.4 | 1 | 1 | 1 |
| 2927 | 80 | 46 | 0.4 | 1 | 1 | 1 |
| 2928 | 80 | 47 | 0.4 | 1 | 1 | 1 |
| 2929 | 80 | 48 | 0.4 | 1 | 1 | 1 |
| 2930 | 80 | 49 | 0.4 | 1 | 1 | 1 |
| 2931 | 80 | 50 | 0.4 | 1 | 1 | 1 |
| 2932 | 80 | 51 | 0.4 | 1 | 1 | 1 |
| 2933 | 80 | 52 | 0.4 | 1 | 1 | 1 |
| 2934 | 80 | 53 | 0.4 | 1 | 1 | 1 |

APPENDIX 1-continued

| Index | Elevation Angle (degrees) | Relative Azimuth (degrees) | At-tenu-ation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 2935 | 80 | 54 | 0.4 | 1 | 1 | 1 |
| 2936 | 80 | 55 | 0.4 | 1 | 1 | 1 |
| 2937 | 80 | 56 | 0.4 | 1 | 1 | 1 |
| 2938 | 80 | 57 | 0.4 | 1 | 1 | 1 |
| 2939 | 80 | 58 | 0.4 | 1 | 1 | 1 |
| 2940 | 80 | 59 | 0.4 | 1 | 1 | 1 |
| 2941 | 80 | 60 | 0.4 | 1 | 1 | 1 |
| 2942 | 80 | 61 | 0.4 | 1 | 1 | 1 |
| 2943 | 80 | 62 | 0.4 | 1 | 1 | 1 |
| 2944 | 80 | 63 | 0.4 | 1 | 1 | 1 |
| 2945 | 80 | 64 | 0.4 | 1 | 1 | 1 |
| 2946 | 80 | 65 | 0.4 | 1 | 1 | 1 |
| 2947 | 80 | 66 | 0.4 | 1 | 1 | 1 |
| 2948 | 80 | 67 | 0.4 | 1 | 1 | 1 |
| 2949 | 80 | 68 | 0.4 | 1 | 1 | 1 |
| 2950 | 80 | 69 | 0.4 | 1 | 1 | 1 |
| 2951 | 80 | 70 | 0.4 | 1 | 1 | 1 |
| 2952 | 80 | 71 | 0.4 | 1 | 1 | 1 |
| 2953 | 80 | 72 | 0.4 | 1 | 1 | 1 |
| 2954 | 80 | 73 | 0.4 | 1 | 1 | 1 |
| 2955 | 80 | 74 | 0.4 | 1 | 1 | 1 |
| 2956 | 80 | 75 | 0.4 | 1 | 1 | 1 |
| 2957 | 80 | 76 | 0.4 | 1 | 1 | 1 |
| 2958 | 80 | 77 | 0.4 | 1 | 1 | 1 |
| 2959 | 80 | 78 | 0.4 | 1 | 1 | 1 |
| 2960 | 80 | 79 | 0.4 | 1 | 1 | 1 |
| 2961 | 80 | 80 | 0.4 | 1 | 1 | 1 |
| 2962 | 80 | 81 | 0.4 | 1 | 1 | 1 |
| 2963 | 80 | 82 | 0.4 | 1 | 1 | 1 |
| 2964 | 80 | 83 | 0.4 | 1 | 1 | 1 |
| 2965 | 80 | 84 | 0.4 | 1 | 1 | 1 |
| 2966 | 80 | 85 | 0.4 | 1 | 1 | 1 |
| 2967 | 80 | 86 | 0.4 | 1 | 1 | 1 |
| 2968 | 80 | 87 | 0.4 | 1 | 1 | 1 |
| 2969 | 80 | 88 | 0.4 | 1 | 1 | 1 |
| 2970 | 80 | 89 | 0.4 | 1 | 1 | 1 |
| 2971 | 80 | 90 | 0.4 | 1 | 1 | 1 |
| 2972 | 80 | 91 | 0.4 | 1 | 1 | 1 |
| 2973 | 80 | 92 | 0.4 | 1 | 1 | 1 |
| 2974 | 80 | 93 | 0.4 | 1 | 1 | 1 |
| 2975 | 80 | 94 | 0.4 | 1 | 1 | 1 |
| 2976 | 80 | 95 | 0.4 | 1 | 1 | 1 |
| 2977 | 80 | 96 | 0.4 | 1 | 1 | 1 |
| 2978 | 80 | 97 | 0.4 | 1 | 1 | 1 |
| 2979 | 80 | 98 | 0.4 | 1 | 1 | 1 |
| 2980 | 80 | 99 | 0.4 | 1 | 1 | 1 |
| 2981 | 80 | 100 | 0.4 | 1 | 1 | 1 |
| 2982 | 80 | 101 | 0.4 | 1 | 1 | 1 |
| 2983 | 80 | 102 | 0.4 | 1 | 1 | 1 |
| 2984 | 80 | 103 | 0.4 | 1 | 1 | 1 |
| 2985 | 80 | 104 | 0.4 | 1 | 1 | 1 |
| 2986 | 80 | 105 | 0.4 | 1 | 1 | 1 |
| 2987 | 80 | 106 | 0.4 | 1 | 1 | 1 |
| 2988 | 80 | 107 | 0.4 | 1 | 1 | 1 |
| 2989 | 80 | 108 | 0.4 | 1 | 1 | 1 |
| 2990 | 80 | 109 | 0.4 | 1 | 1 | 1 |
| 2991 | 80 | 110 | 0.4 | 1 | 1 | 1 |
| 2992 | 80 | 111 | 0.4 | 1 | 1 | 1 |
| 2993 | 80 | 112 | 0.4 | 1 | 1 | 1 |
| 2994 | 80 | 113 | 0.4 | 1 | 1 | 1 |
| 2995 | 80 | 114 | 0.4 | 1 | 1 | 1 |
| 2996 | 80 | 115 | 0.4 | 1 | 1 | 1 |
| 2997 | 80 | 116 | 0.4 | 1 | 1 | 1 |
| 2998 | 80 | 117 | 0.4 | 1 | 1 | 1 |
| 2999 | 80 | 118 | 0.4 | 1 | 1 | 1 |
| 3000 | 80 | 119 | 0.4 | 1 | 1 | 1 |
| 3001 | 80 | 120 | 0.4 | 1 | 1 | 1 |
| 3002 | 80 | 121 | 0.4 | 1 | 1 | 1 |
| 3003 | 80 | 122 | 0.4 | 1 | 1 | 1 |
| 3004 | 80 | 123 | 0.4 | 1 | 1 | 1 |
| 3005 | 80 | 124 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 3006 | 80 | 125 | 0.4 | 1 | 1 | 1 |
| 3007 | 80 | 126 | 0.4 | 1 | 1 | 1 |
| 3008 | 80 | 127 | 0.4 | 1 | 1 | 1 |
| 3009 | 80 | 128 | 0.4 | 1 | 1 | 1 |
| 3010 | 80 | 129 | 0.4 | 1 | 1 | 1 |
| 3011 | 80 | 130 | 0.4 | 1 | 1 | 1 |
| 3012 | 80 | 131 | 0.4 | 1 | 1 | 1 |
| 3013 | 80 | 132 | 0.4 | 1 | 1 | 1 |
| 3014 | 80 | 133 | 0.4 | 1 | 1 | 1 |
| 3015 | 80 | 134 | 0.4 | 1 | 1 | 1 |
| 3016 | 80 | 135 | 0.4 | 1 | 1 | 1 |
| 3017 | 80 | 136 | 0.4 | 1 | 1 | 1 |
| 3018 | 80 | 137 | 0.4 | 1 | 1 | 1 |
| 3019 | 80 | 138 | 0.4 | 1 | 1 | 1 |
| 3020 | 80 | 139 | 0.4 | 1 | 1 | 1 |
| 3021 | 80 | 140 | 0.4 | 1 | 1 | 1 |
| 3022 | 80 | 141 | 0.4 | 1 | 1 | 1 |
| 3023 | 80 | 142 | 0.4 | 1 | 1 | 1 |
| 3024 | 80 | 143 | 0.4 | 1 | 1 | 1 |
| 3025 | 80 | 144 | 0.4 | 1 | 1 | 1 |
| 3026 | 80 | 145 | 0.4 | 1 | 1 | 1 |
| 3027 | 80 | 146 | 0.4 | 1 | 1 | 1 |
| 3028 | 80 | 147 | 0.4 | 1 | 1 | 1 |
| 3029 | 80 | 148 | 0.4 | 1 | 1 | 1 |
| 3030 | 80 | 149 | 0.4 | 1 | 1 | 1 |
| 3031 | 80 | 150 | 0.4 | 1 | 1 | 1 |
| 3032 | 80 | 151 | 0.4 | 1 | 1 | 1 |
| 3033 | 80 | 152 | 0.4 | 1 | 1 | 1 |
| 3034 | 80 | 153 | 0.4 | 1 | 1 | 1 |
| 3035 | 80 | 154 | 0.4 | 1 | 1 | 1 |
| 3036 | 80 | 155 | 0.4 | 1 | 1 | 1 |
| 3037 | 80 | 156 | 0.4 | 1 | 1 | 1 |
| 3038 | 80 | 157 | 0.4 | 1 | 1 | 1 |
| 3039 | 80 | 158 | 0.4 | 1 | 1 | 1 |
| 3040 | 80 | 159 | 0.4 | 1 | 1 | 1 |
| 3041 | 80 | 160 | 0.4 | 1 | 1 | 1 |
| 3042 | 80 | 161 | 0.4 | 1 | 1 | 1 |
| 3043 | 80 | 162 | 0.4 | 1 | 1 | 1 |
| 3044 | 80 | 163 | 0.4 | 1 | 1 | 1 |
| 3045 | 80 | 164 | 0.4 | 1 | 1 | 1 |
| 3046 | 80 | 165 | 0.4 | 1 | 1 | 1 |
| 3047 | 80 | 166 | 0.4 | 1 | 1 | 1 |
| 3048 | 80 | 167 | 0.4 | 1 | 1 | 1 |
| 3049 | 80 | 168 | 0.4 | 1 | 1 | 1 |
| 3050 | 80 | 169 | 0.4 | 1 | 1 | 1 |
| 3051 | 80 | 170 | 0.4 | 1 | 1 | 1 |
| 3052 | 80 | 171 | 0.4 | 1 | 1 | 1 |
| 3053 | 80 | 172 | 0.4 | 1 | 1 | 1 |
| 3054 | 80 | 173 | 0.4 | 1 | 1 | 1 |
| 3055 | 80 | 174 | 0.4 | 1 | 1 | 1 |
| 3056 | 80 | 175 | 0.4 | 1 | 1 | 1 |
| 3057 | 80 | 176 | 0.4 | 1 | 1 | 1 |
| 3058 | 80 | 177 | 0.4 | 1 | 1 | 1 |
| 3059 | 80 | 178 | 0.4 | 1 | 1 | 1 |
| 3060 | 80 | 179 | 0.4 | 1 | 1 | 1 |
| 3061 | 80 | 180 | 0.4 | 1 | 1 | 1 |
| 3062 | 80 | 181 | 0.4 | 1 | 1 | 1 |
| 3063 | 80 | 182 | 0.4 | 1 | 1 | 1 |
| 3064 | 80 | 183 | 0.4 | 1 | 1 | 1 |
| 3065 | 80 | 184 | 0.4 | 1 | 1 | 1 |
| 3066 | 80 | 185 | 0.4 | 1 | 1 | 1 |
| 3067 | 80 | 186 | 0.4 | 1 | 1 | 1 |
| 3068 | 80 | 187 | 0.4 | 1 | 1 | 1 |
| 3069 | 80 | 188 | 0.4 | 1 | 1 | 1 |
| 3070 | 80 | 189 | 0.4 | 1 | 1 | 1 |
| 3071 | 80 | 190 | 0.4 | 1 | 1 | 1 |
| 3072 | 80 | 191 | 0.4 | 1 | 1 | 1 |
| 3073 | 80 | 192 | 0.4 | 1 | 1 | 1 |
| 3074 | 80 | 193 | 0.4 | 1 | 1 | 1 |
| 3075 | 80 | 194 | 0.4 | 1 | 1 | 1 |
| 3076 | 80 | 195 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 3077 | 80 | 196 | 0.4 | 1 | 1 | 1 |
| 3078 | 80 | 197 | 0.4 | 1 | 1 | 1 |
| 3079 | 80 | 198 | 0.4 | 1 | 1 | 1 |
| 3080 | 80 | 199 | 0.4 | 1 | 1 | 1 |
| 3081 | 80 | 200 | 0.4 | 1 | 1 | 1 |
| 3082 | 80 | 201 | 0.4 | 1 | 1 | 1 |
| 3083 | 80 | 202 | 0.4 | 1 | 1 | 1 |
| 3084 | 80 | 203 | 0.4 | 1 | 1 | 1 |
| 3085 | 80 | 204 | 0.4 | 1 | 1 | 1 |
| 3086 | 80 | 205 | 0.4 | 1 | 1 | 1 |
| 3087 | 80 | 206 | 0.4 | 1 | 1 | 1 |
| 3088 | 80 | 207 | 0.4 | 1 | 1 | 1 |
| 3089 | 80 | 208 | 0.4 | 1 | 1 | 1 |
| 3090 | 80 | 209 | 0.4 | 1 | 1 | 1 |
| 3091 | 80 | 210 | 0.4 | 1 | 1 | 1 |
| 3092 | 80 | 211 | 0.4 | 1 | 1 | 1 |
| 3093 | 80 | 212 | 0.4 | 1 | 1 | 1 |
| 3094 | 80 | 213 | 0.4 | 1 | 1 | 1 |
| 3095 | 80 | 214 | 0.4 | 1 | 1 | 1 |
| 3096 | 80 | 215 | 0.4 | 1 | 1 | 1 |
| 3097 | 80 | 216 | 0.4 | 1 | 1 | 1 |
| 3098 | 80 | 217 | 0.4 | 1 | 1 | 1 |
| 3099 | 80 | 218 | 0.4 | 1 | 1 | 1 |
| 3100 | 80 | 219 | 0.4 | 1 | 1 | 1 |
| 3101 | 80 | 220 | 0.4 | 1 | 1 | 1 |
| 3102 | 80 | 221 | 0.4 | 1 | 1 | 1 |
| 3103 | 80 | 222 | 0.4 | 1 | 1 | 1 |
| 3104 | 80 | 223 | 0.4 | 1 | 1 | 1 |
| 3105 | 80 | 224 | 0.4 | 1 | 1 | 1 |
| 3106 | 80 | 225 | 0.4 | 1 | 1 | 1 |
| 3107 | 80 | 226 | 0.4 | 1 | 1 | 1 |
| 3108 | 80 | 227 | 0.4 | 1 | 1 | 1 |
| 3109 | 80 | 228 | 0.4 | 1 | 1 | 1 |
| 3110 | 80 | 229 | 0.4 | 1 | 1 | 1 |
| 3111 | 80 | 230 | 0.4 | 1 | 1 | 1 |
| 3112 | 80 | 231 | 0.4 | 1 | 1 | 1 |
| 3113 | 80 | 232 | 0.4 | 1 | 1 | 1 |
| 3114 | 80 | 233 | 0.4 | 1 | 1 | 1 |
| 3115 | 80 | 234 | 0.4 | 1 | 1 | 1 |
| 3116 | 80 | 235 | 0.4 | 1 | 1 | 1 |
| 3117 | 80 | 236 | 0.4 | 1 | 1 | 1 |
| 3118 | 80 | 237 | 0.4 | 1 | 1 | 1 |
| 3119 | 80 | 238 | 0.4 | 1 | 1 | 1 |
| 3120 | 80 | 239 | 0.4 | 1 | 1 | 1 |
| 3121 | 80 | 240 | 0.4 | 1 | 1 | 1 |
| 3122 | 80 | 241 | 0.4 | 1 | 1 | 1 |
| 3123 | 80 | 242 | 0.4 | 1 | 1 | 1 |
| 3124 | 80 | 243 | 0.4 | 1 | 1 | 1 |
| 3125 | 80 | 244 | 0.4 | 1 | 1 | 1 |
| 3126 | 80 | 245 | 0.4 | 1 | 1 | 1 |
| 3127 | 80 | 246 | 0.4 | 1 | 1 | 1 |
| 3128 | 80 | 247 | 0.4 | 1 | 1 | 1 |
| 3129 | 80 | 248 | 0.4 | 1 | 1 | 1 |
| 3130 | 80 | 249 | 0.4 | 1 | 1 | 1 |
| 3131 | 80 | 250 | 0.4 | 1 | 1 | 1 |
| 3132 | 80 | 251 | 0.4 | 1 | 1 | 1 |
| 3133 | 80 | 252 | 0.4 | 1 | 1 | 1 |
| 3134 | 80 | 253 | 0.4 | 1 | 1 | 1 |
| 3135 | 80 | 254 | 0.4 | 1 | 1 | 1 |
| 3136 | 80 | 255 | 0.4 | 1 | 1 | 1 |
| 3137 | 80 | 256 | 0.4 | 1 | 1 | 1 |
| 3138 | 80 | 257 | 0.4 | 1 | 1 | 1 |
| 3139 | 80 | 258 | 0.4 | 1 | 1 | 1 |
| 3140 | 80 | 259 | 0.4 | 1 | 1 | 1 |
| 3141 | 80 | 260 | 0.4 | 1 | 1 | 1 |
| 3142 | 80 | 261 | 0.4 | 1 | 1 | 1 |
| 3143 | 80 | 262 | 0.4 | 1 | 1 | 1 |
| 3144 | 80 | 263 | 0.4 | 1 | 1 | 1 |
| 3145 | 80 | 264 | 0.4 | 1 | 1 | 1 |
| 3146 | 80 | 265 | 0.4 | 1 | 1 | 1 |
| 3147 | 80 | 266 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 3148 | 80 | 267 | 0.4 | 1 | 1 | 1 |
| 3149 | 80 | 268 | 0.4 | 1 | 1 | 1 |
| 3150 | 80 | 269 | 0.4 | 1 | 1 | 1 |
| 3151 | 80 | 270 | 0.4 | 1 | 1 | 1 |
| 3152 | 80 | 271 | 0.4 | 1 | 1 | 1 |
| 3153 | 80 | 272 | 0.4 | 1 | 1 | 1 |
| 3154 | 80 | 273 | 0.4 | 1 | 1 | 1 |
| 3155 | 80 | 274 | 0.4 | 1 | 1 | 1 |
| 3156 | 80 | 275 | 0.4 | 1 | 1 | 1 |
| 3157 | 80 | 276 | 0.4 | 1 | 1 | 1 |
| 3158 | 80 | 277 | 0.4 | 1 | 1 | 1 |
| 3159 | 80 | 278 | 0.4 | 1 | 1 | 1 |
| 3160 | 80 | 279 | 0.4 | 1 | 1 | 1 |
| 3161 | 80 | 280 | 0.4 | 1 | 1 | 1 |
| 3162 | 80 | 281 | 0.4 | 1 | 1 | 1 |
| 3163 | 80 | 282 | 0.4 | 1 | 1 | 1 |
| 3164 | 80 | 283 | 0.4 | 1 | 1 | 1 |
| 3165 | 80 | 284 | 0.4 | 1 | 1 | 1 |
| 3166 | 80 | 285 | 0.4 | 1 | 1 | 1 |
| 3167 | 80 | 286 | 0.4 | 1 | 1 | 1 |
| 3168 | 80 | 287 | 0.4 | 1 | 1 | 1 |
| 3169 | 80 | 288 | 0.4 | 1 | 1 | 1 |
| 3170 | 80 | 289 | 0.4 | 1 | 1 | 1 |
| 3171 | 80 | 290 | 0.4 | 1 | 1 | 1 |
| 3172 | 80 | 291 | 0.4 | 1 | 1 | 1 |
| 3173 | 80 | 292 | 0.4 | 1 | 1 | 1 |
| 3174 | 80 | 293 | 0.4 | 1 | 1 | 1 |
| 3175 | 80 | 294 | 0.4 | 1 | 1 | 1 |
| 3176 | 80 | 295 | 0.4 | 1 | 1 | 1 |
| 3177 | 80 | 296 | 0.4 | 1 | 1 | 1 |
| 3178 | 80 | 297 | 0.4 | 1 | 1 | 1 |
| 3179 | 80 | 298 | 0.4 | 1 | 1 | 1 |
| 3180 | 80 | 299 | 0.4 | 1 | 1 | 1 |
| 3181 | 80 | 300 | 0.4 | 1 | 1 | 1 |
| 3182 | 80 | 301 | 0.4 | 1 | 1 | 1 |
| 3183 | 80 | 302 | 0.4 | 1 | 1 | 1 |
| 3184 | 80 | 303 | 0.4 | 1 | 1 | 1 |
| 3185 | 80 | 304 | 0.4 | 1 | 1 | 1 |
| 3186 | 80 | 305 | 0.4 | 1 | 1 | 1 |
| 3187 | 80 | 306 | 0.4 | 1 | 1 | 1 |
| 3188 | 80 | 307 | 0.4 | 1 | 1 | 1 |
| 3189 | 80 | 308 | 0.4 | 1 | 1 | 1 |
| 3190 | 80 | 309 | 0.4 | 1 | 1 | 1 |
| 3191 | 80 | 310 | 0.4 | 1 | 1 | 1 |
| 3192 | 80 | 311 | 0.4 | 1 | 1 | 1 |
| 3193 | 80 | 312 | 0.4 | 1 | 1 | 1 |
| 3194 | 80 | 313 | 0.4 | 1 | 1 | 1 |
| 3195 | 80 | 314 | 0.4 | 1 | 1 | 1 |
| 3196 | 80 | 315 | 0.4 | 1 | 1 | 1 |
| 3197 | 80 | 316 | 0.4 | 1 | 1 | 1 |
| 3198 | 80 | 317 | 0.4 | 1 | 1 | 1 |
| 3199 | 80 | 318 | 0.4 | 1 | 1 | 1 |
| 3200 | 80 | 319 | 0.4 | 1 | 1 | 1 |
| 3201 | 80 | 320 | 0.4 | 1 | 1 | 1 |
| 3202 | 80 | 321 | 0.4 | 1 | 1 | 1 |
| 3203 | 80 | 322 | 0.4 | 1 | 1 | 1 |
| 3204 | 80 | 323 | 0.4 | 1 | 1 | 1 |
| 3205 | 80 | 324 | 0.4 | 1 | 1 | 1 |
| 3206 | 80 | 325 | 0.4 | 1 | 1 | 1 |
| 3207 | 80 | 326 | 0.4 | 1 | 1 | 1 |
| 3208 | 80 | 327 | 0.4 | 1 | 1 | 1 |
| 3209 | 80 | 328 | 0.4 | 1 | 1 | 1 |
| 3210 | 80 | 329 | 0.4 | 1 | 1 | 1 |
| 3211 | 80 | 330 | 0.4 | 1 | 1 | 1 |
| 3212 | 80 | 331 | 0.4 | 1 | 1 | 1 |
| 3213 | 80 | 332 | 0.4 | 1 | 1 | 1 |
| 3214 | 80 | 333 | 0.4 | 1 | 1 | 1 |
| 3215 | 80 | 334 | 0.4 | 1 | 1 | 1 |
| 3216 | 80 | 335 | 0.4 | 1 | 1 | 1 |
| 3217 | 80 | 336 | 0.4 | 1 | 1 | 1 |
| 3218 | 80 | 337 | 0.4 | 1 | 1 | 1 |

APPENDIX 1-continued

| Index | Elevation Angle (degrees) | Relative Azimuth (degrees) | Attenuation (dB) | Carrier Phase disruption rating (1-10) 1 = low 10 = high | Roll sensitivity (1-10) 1 = low 10 = high | Pitch Sensitivity (1-10) 1 = low 10 = high |
|---|---|---|---|---|---|---|
| 3219 | 80 | 338 | 0.4 | 1 | 1 | 1 |
| 3220 | 80 | 339 | 0.4 | 1 | 1 | 1 |
| 3221 | 80 | 340 | 0.4 | 1 | 1 | 1 |
| 3222 | 80 | 341 | 0.4 | 1 | 1 | 1 |
| 3223 | 80 | 342 | 0.4 | 1 | 1 | 1 |
| 3224 | 80 | 343 | 0.4 | 1 | 1 | 1 |
| 3225 | 80 | 344 | 0.4 | 1 | 1 | 1 |
| 3226 | 80 | 345 | 0.4 | 1 | 1 | 1 |
| 3227 | 80 | 346 | 0.4 | 1 | 1 | 1 |
| 3228 | 80 | 347 | 0.4 | 1 | 1 | 1 |
| 3229 | 80 | 348 | 0.4 | 1 | 1 | 1 |
| 3230 | 80 | 349 | 0.4 | 1 | 1 | 1 |
| 3231 | 80 | 350 | 0.4 | 1 | 1 | 1 |
| 3232 | 80 | 351 | 0.4 | 1 | 1 | 1 |
| 3233 | 80 | 352 | 0.4 | 1 | 1 | 1 |
| 3234 | 80 | 353 | 0.4 | 1 | 1 | 1 |
| 3235 | 80 | 354 | 0.4 | 1 | 1 | 1 |
| 3236 | 80 | 355 | 0.4 | 1 | 1 | 1 |
| 3237 | 80 | 356 | 0.4 | 1 | 1 | 1 |
| 3238 | 80 | 357 | 0.4 | 1 | 1 | 1 |
| 3239 | 80 | 358 | 0.4 | 1 | 1 | 1 |
| 3240 | 80 | 359 | 0.4 | 1 | 1 | 1 |

What is claimed is:

1. A method for mitigating blockages in a line of sight between an antenna carried on a mobile platform, and a remotely located communications device, the method comprising:

supporting the antenna on a support component; and using a processing system to determine if a line of sight between the antenna and the communications device is at least partially blocked;

creating a blockage database of information indicative of blockage information relating to blockages caused by structures being carried on said mobile platform, with a line of sight to said communications device, depending on one of a location, a direction of travel and an attitude of said mobile platform, and said blockage database having at least one alternative location for said antenna being carried on said mobile platform that restores an unimpeded line of sight from said antenna to said communications device when said antenna is physically moved, with respect to said mobile platform, to said one alternative location;

using the processing system to access said blockage database to determine if said line of sight blockage between said antenna and said communications device can be mitigated by moving said antenna from an existing position to a different position, relative to said mobile platform; and causing said antenna to be physically moved from said existing position to said alternative position obtained from said blockage database, to mitigate said line of sight blockage and to improve antenna performance.

2. The method of claim 1, further comprising monitoring a position and a heading of said mobile platform and informing said processing system of said position and said heading of said mobile platform.

3. The method of claim 1, further comprising periodically using said processing system to check if a communications link between said antenna and said remote signal device can be improved by re-positioning said antenna.

4. The method of claim 1, further comprising moving said antenna in an orbital fashion between said existing and said specific alternative positions.

5. The method of claim 1, further comprising using said processing system in connection with a decision tree to select said alternative position when a plurality of different antenna positions are obtained from said blockage database, wherein said alternative position represents an optimum position for use.

6. A method for mitigating blockages in a line of sight between an antenna carried on a mobile platform, and an orbiting satellite, the method comprising:

supporting the antenna on a support component; and using a processing system to determine that a line of sight between the antenna and the satellite is at least partially blocked by an existing structure being carried on said mobile platform;

causing the processing system to access a satellite position database to obtain information on a position of the satellite that is to be tracked with said antenna;

causing the processing system to access information on the mobile platform's current attitude and location;

causing the processing system to access a blockage database containing information of known blockages of said antenna when said mobile platform is orientated at one or more known locations and attitudes;

using the processing system, the information from the satellite position database, the information concerning the mobile platform's current attitude and location, and the information from the blockage database to determine a new position for said antenna that mitigates said line-of-sight blockage between said antenna and said satellite caused by said existing structure on said mobile platform; and physically moving said antenna from a current position to said new position.

7. A method for mitigating blockages in a line of sight between an antenna carried on a mobile marine vessel, and an orbiting satellite, the method comprising:

supporting the antenna on a support component; and using a processing system to determine that a line of sight between the antenna and the satellite is at least partially blocked by an existing structure being carried on said mobile marine vessel;

causing the processing system to access a satellite position database to obtain information on a position of the satellite that is to be tracked with said antenna;

causing the processing system to access information concerning yaw, pitch and roll of the marine vessel, and a current latitude and longitude of said marine vessel;

causing the processing system to access a blockage database containing a look-up table of known blockages of said antenna caused by said existing structure, relative to specific locations and attitudes of said marine vessel, when said marine vessel is orientated at a known location and a known attitude;

using the processing system, the information from the satellite position database, the information concerning the marine vessel's current attitude and location, and the information from the blockage database to determine a new position for said antenna that mitigates said line-of-sight blockage between said antenna and said satellite caused by said existing structure on said mobile marine vessel; and causing the processor to use a motor to physically move said antenna from a current position to said new position to ameliorate said blockage caused by said existing structure on said mobile marine vessel.

8. The method of claim 7, wherein the antenna is moved by the motor linearly along an X-axis and a Y-axis, to reposition said antenna at said new position.

9. The method of claim 7, wherein the antenna is moved by the motor in a circular arc, to reposition said antenna at said new position.

* * * * *